United States Patent
Kondo et al.

(10) Patent No.: US 9,602,020 B2
(45) Date of Patent: Mar. 21, 2017

(54) POWER CONVERSION DEVICE

(71) Applicant: Mitsubishi Electric Corporation, Chiyoda-ku (JP)

(72) Inventors: Ryota Kondo, Chiyoda-ku (JP); Takaaki Takahara, Chiyoda-ku (JP); Satoshi Murakami, Chiyoda-ku (JP); Masaki Yamada, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 29 days.

(21) Appl. No.: 14/407,224

(22) PCT Filed: May 30, 2013

(86) PCT No.: PCT/JP2013/003418
§ 371 (c)(1),
(2) Date: Dec. 11, 2014

(87) PCT Pub. No.: WO2014/013663
PCT Pub. Date: Jan. 23, 2014

(65) Prior Publication Data
US 2015/0171763 A1    Jun. 18, 2015

(30) Foreign Application Priority Data

Jul. 19, 2012   (JP) ................. 2012-160787

(51) Int. Cl.
*H02M 3/158*   (2006.01)
*H02M 5/458*   (2006.01)
(Continued)

(52) U.S. Cl.
CPC ............. *H02M 5/458* (2013.01); *H02M 1/32* (2013.01); *H02M 1/4225* (2013.01);
(Continued)

(58) Field of Classification Search
CPC ............... H02M 3/158; H02M 3/1588; H02M 2001/0022; Y02B 70/1466; G05F 5/00
(Continued)

(56) References Cited

U.S. PATENT DOCUMENTS

| 8,351,232 B2 * | 1/2013 | Zhang | H02M 1/4225 323/283 |
| 9,007,042 B2 * | 4/2015 | Okuda | H02M 3/158 323/271 |
| 2013/0002215 A1 | 1/2013 | Ikeda et al. | |

FOREIGN PATENT DOCUMENTS

| JP | 2008-141901 A | 6/2008 |
| JP | 2012-016075 A | 1/2012 |

(Continued)

OTHER PUBLICATIONS

International Search Report issued Aug. 27, 2013 in PCT/JP2013/003418 Filed May 30, 2013.
(Continued)

*Primary Examiner* — Gary L Laxton
(74) *Attorney, Agent, or Firm* — Oblon, McClelland, Maier & Neustadt, L.L.P.

(57) ABSTRACT

A power conversion device includes a half bridge type inverter circuit that includes semiconductor elements, and a DC capacitor and that is connected to a positive side bus of the AC power supply, a smoothing capacitor, a semiconductor element that is connected between the semiconductor element and a positive side of the smoothing capacitor, and a semiconductor element that is connected between the semiconductor element and a negative side of the smoothing capacitor, in which turning-on and turning-off of the semiconductor element are controlled so that a DC voltage of the DC capacitor tracks a target voltage, and turning-on and turning-off of the semiconductor elements are controlled so that a DC voltage of the smoothing capacitor tracks a target (Continued)

voltage and thus an input power factor from the AC power supply is adjusted.

19 Claims, 48 Drawing Sheets

(51) Int. Cl.
    *H02M 1/32*     (2007.01)
    *H02M 7/483*    (2007.01)
    *H02M 1/42*     (2007.01)

(52) U.S. Cl.
    CPC .......... *H02M 7/483* (2013.01); *H02M 1/4208* (2013.01); *H02M 1/4233* (2013.01); *Y02B 70/126* (2013.01)

(58) Field of Classification Search
    USPC ........................................ 323/225, 271, 282
    See application file for complete search history.

(56) References Cited

FOREIGN PATENT DOCUMENTS

| | | |
|---|---|---|
| JP | 2012-075263 A | 4/2012 |
| WO | WO 2012/014912 A1 | 2/2012 |

OTHER PUBLICATIONS

Office Action mailed Jun. 30, 2016, in Chinese Patent Application No. 201380038278.1 (with English-language translation).

\* cited by examiner

POWER CONVERSION DEVICE

TECHNICAL FIELD

The present invention relates to a power conversion device which obtains a desired DC voltage by superimposing an output of an AC side of a single-phase inverter on a power supply output.

BACKGROUND ART

A power conversion device of the related art includes an AC power supply, a reactor connected to the AC power supply, abridge rectifying circuit, a smoothing capacitor, a two-way switch connected between AC input terminals of the bridge rectifying circuit, first to fourth auxiliary switches connected in series between DC output terminals, and a capacitor. Control is performed so that two auxiliary switches are turned on until the two-way switch is turned off after the two-way switch is turned on and thus the capacitor is charged. Next, the two auxiliary switches are turned off, and the capacitor is controlled to be discharged by turning on the remaining two auxiliary switches while the two-way switch is turned off. By performing such control, noise generation is minimized by preventing a rapid change in a voltage applied to the reactor, and zero-current switching and zero-voltage switching of the two-way switch are realized. Thus, it is possible to reduce noise and loss (for example, refer to Patent Document 1).

PRIOR ART DOCUMENT

Patent Document

Patent Document 1: JP-A-2008-141901 (pages 6 to 9, and FIGS. 1 to 7)

DISCLOSURE OF THE INVENTION

Problem to be Solved by the Invention

In the power conversion device of the related art, it is desirable to satisfy high power factor control, charge and discharge control of the capacitor connected to the auxiliary switch, and a function of preventing a rapid change in a voltage applied to the reactor, and also it is desirable to further miniaturize the power conversion device. However, in a case where the number of semiconductor elements such as semiconductor switches or diodes is reduced in order to miniaturize the power conversion device, for example, in a case where the two-way switch is omitted, the high power factor control cannot be satisfied. In addition, if the auxiliary switch is omitted, the function of the capacitor preventing a rapid change in a voltage applied to the reactor cannot be satisfied. For this reason, there is a problem in that semiconductor elements cannot be omitted any longer.

This invention has been made in order to solve the above-described problem, to constitute a power conversion device with a small number of semiconductor switches to realize high power factor control, charge and discharge control of a capacitor, and to have a function of preventing a rapid change in a voltage applied to a reactor.

SUMMARY OF THE INVENTION

A power conversion device according to this invention includes a rectifying circuit that rectifies an input from an AC power supply, a half bridge type inverter circuit that includes a first semiconductor switch, a second semiconductor switch, and a DC capacitor, in which a connection point between the first semiconductor switch and the second semiconductor switch is connected to a bus of the AC power supply; a smoothing capacitor that smooths an output voltage; a third semiconductor switch that is connected between the first semiconductor switch of a positive side of the inverter circuit and a positive side of the smoothing capacitor; a fourth semiconductor switch that is connected between the second semiconductor switch of a negative side of the inverter circuit and a negative side of the smoothing capacitor; and a control circuit that controls turning-on and turning-off of the first to fourth semiconductor switches, in which the control circuit controls turning-on and turning-off of the fourth semiconductor switch so that a DC voltage of the DC capacitor tracks a target voltage of the DC capacitor, and controls turning-on and turning-off of the first semiconductor switch and the second semiconductor switch so that a DC voltage of the smoothing capacitor tracks a target voltage of the smoothing capacitor and thus an input power factor from the AC power supply is adjusted.

Advantage of the Invention

The power conversion device according to this invention includes a rectifying circuit that rectifies an input from an AC power supply; a half bridge type inverter circuit that includes a first semiconductor switch, a second semiconductor switch, and a DC capacitor, in which a connection point between the first semiconductor switch and the second semiconductor switch is connected to a bus of the AC power supply; a smoothing capacitor that smooths an output voltage; a third semiconductor switch that is connected between the first semiconductor switch of a positive side of the inverter circuit and a positive side of the smoothing capacitor; a fourth semiconductor switch that is connected between the second semiconductor switch of a negative side of the inverter circuit and a negative side of the smoothing capacitor; and a control circuit that controls turning-on and turning-off of the first to fourth semiconductor switches, in which the control circuit controls turning-on and turning-off of the fourth semiconductor switch so that a DC voltage of the DC capacitor tracks a target voltage of the DC capacitor, and controls turning-on and turning-off of the first semiconductor switch and the second semiconductor switch so that a DC voltage of the smoothing capacitor tracks a target voltage of the smoothing capacitor and thus an input power factor from the AC power supply is adjusted. Therefore, it is possible to realize high power factor control, charge and discharge control of a capacitor, and a rapid change in a voltage applied to a reactor even by using a small number of semiconductor switches. For this reason, it is possible to realize miniaturization of a power conversion device and a light weight power conversion device.

DESCRIPTION OF EMBODIMENTS

Embodiment 1

Figure 1:
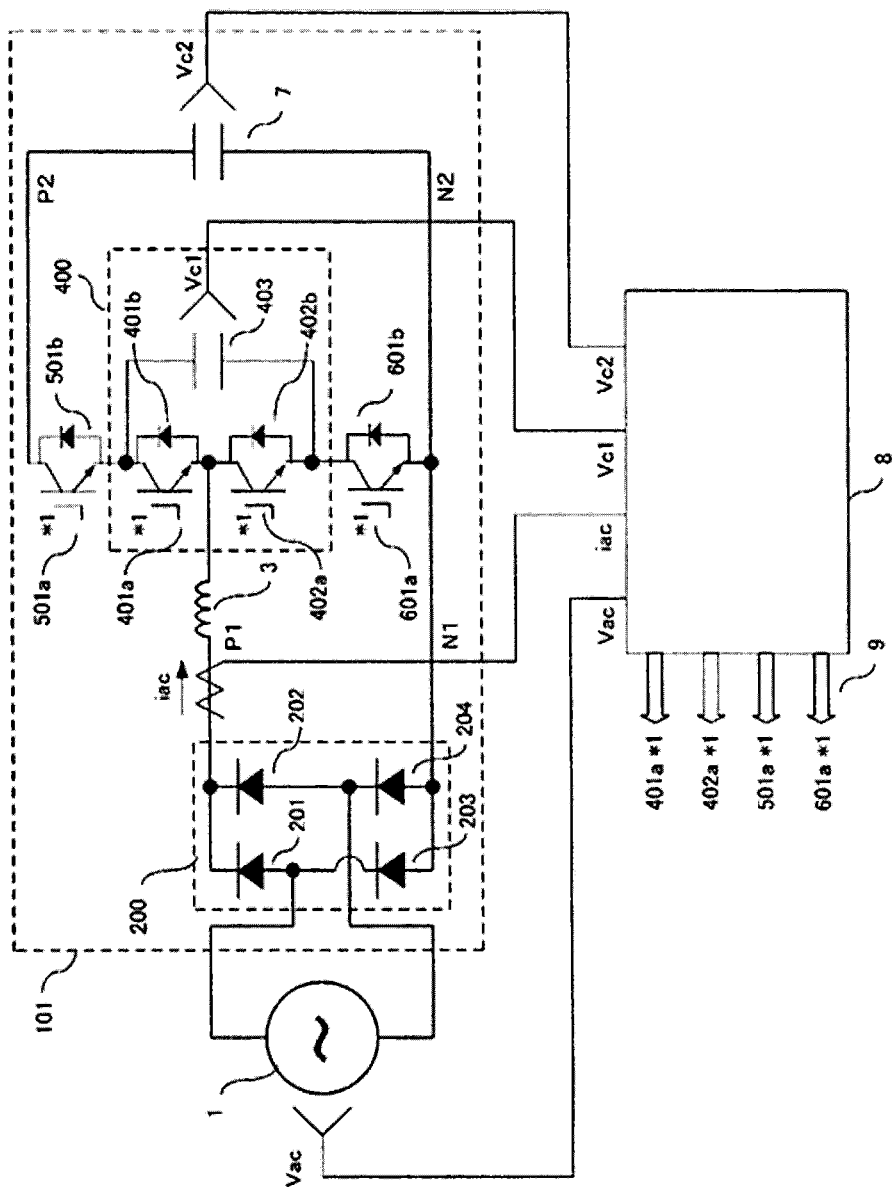
FIG. 1 is a diagram showing a configuration of a power conversion device according to Embodiment 1 of the present invention.

Hereinafter, a power conversion device according to Embodiment 1 of this invention will be described. FIG. 1 is a schematic configuration diagram of a power conversion device in Embodiment 1. As illustrated in FIG. 1, the power conversion device includes a main circuit 101 which converts AC power of an AC power supply 1 into DC power which is then output, and a control circuit 8. The main circuit 101 includes a diode rectifying circuit 200 which rectifies an AC voltage which is input from the AC power supply 1, a reactor 3 which functions as a current limiting circuit, an inverter circuit 400 having a half bridge configuration, a semiconductor switch 501a, a semiconductor switch 601a, and a smoothing capacitor 7 which smoothes an output voltage.

The diode rectifying circuit 200 is connected between a positive side bus P1 and a negative side bus N1 of the AC power supply 1. A terminal of the diode rectifying circuit 200 on the positive side bus P1 side is connected to the reactor 3, and an AC side terminal of the bridge type inverter circuit 400 is connected to a rear stage of the reactor 3. The inverter circuit 400 is an inverter having a half bridge configuration including semiconductor switches 401a and 402a such as two insulated gate bipolar transistors (IGBTs), and a DC capacitor 403. The semiconductor switch 401a is a positive side first semiconductor switch of the inverter circuit 400, and the semiconductor switch 402a is a negative side second semiconductor switch of the inverter circuit 400. In addition, a connection point (an AC side terminal) between the semiconductor switch 401a and the semiconductor switch 402a is connected to the positive side bus P1 of the AC power supply 1.

The semiconductor switch 501a which is a third semiconductor switch is connected between the positive side semiconductor switch 401a of the inverter circuit 400 and a positive side P2 of the smoothing capacitor 7. The semiconductor switch 601a which is a fourth semiconductor switch is connected between the negative side semiconductor switch 402a of the inverter circuit 400 and a negative side N2 of the smoothing capacitor 7. In addition, the semiconductor switches 401a and 402a are semiconductor switches constituting the inverter circuit 400, and the semiconductor switches 501a and 601a are semiconductor switches not constituting the inverter circuit 400. The negative side N2 of the smoothing capacitor 7 is directly connected to a terminal of the diode rectifying circuit 200 on the negative side bus N1 side.

The semiconductor switches 401a and 402a are respectively connected inversely in parallel to diodes 401b and 402b. In addition, the semiconductor switch 501a is a semiconductor switch element such as an IGBT which is connected inversely in parallel to a diode 501b, and, similarly, the semiconductor switch 601a is a semiconductor switch element such as an IGBT which is connected inversely in parallel to a diode 601b. Further, the semiconductor switches 401a, 402a, 501a and 601a may be semiconductor switch elements other than the IGBTs, and may be a metal oxide semiconductor field effect transistor (MOSFET) in which a diode is embedded between a source and a drain, or the like. Furthermore, the semiconductor switch 401a and the semiconductor switch 501a may be omitted, and only the diodes 401b and 501b may be used.

In addition, the power conversion device includes a voltmeter which measures a DC voltage Vc1 of the DC capacitor 403 of the inverter circuit 400, a voltmeter which measures a DC voltage Vc2 of the smoothing capacitor 7, a voltmeter which measures an AC voltage Vac from the AC power supply 1, and an ammeter which measures an AC current Iac therefrom.

The control circuit 8 controls turning-on and turning-off of the semiconductor switches 401a, 402a, 501a and 601a. The control circuit 8 generates gate signals 9 applied to the semiconductor switches 401a and 402a of the inverter circuit 400 or the semiconductor switches 501a and 601a, and performs output control on the inverter circuit 400 and the semiconductor switches 501a and 601a, on the basis of the DC voltage Vc1 of the DC capacitor 403 of the inverter circuit 400, the DC voltage Vc2 of the smoothing capacitor 7, and the AC voltage Vac and the AC current Iac from the AC power supply 1. Therefore, the DC voltage Vc2 of the smoothing capacitor 7 is maintained to be a given target voltage Vc2*, the AC current Iac from the AC power supply 1 is maintained in a high power factor, and the voltage Vc1 of the DC capacitor 403 is maintained to be a given target voltage (a command value Vc1*).

More specifically, the control circuit 8 controls of turning-on and turning-off of the semiconductor switch 601a so that the DC voltage Vc1 of the DC capacitor 403 tracks the command value Vc1* of the DC capacitor 403, and controls turning-on and turning-off of the semiconductor switches 401a and 402a so that the DC voltage Vc2 of the smoothing capacitor 7 tracks the target voltage Vc2* of the smoothing capacitor 7 so as to adjust an input power factor from the AC power supply 1, thereby improving the input power factor. A load (not illustrated) is connected to the smoothing capacitor 7, and the DC voltage Vc2 is lower than the target voltage Vc2* at a normal time. The control circuit 8 performs output control on the inverter circuit 400 and the semiconductor switches 501a and 601a so that AC power from the AC power supply 1 is converted into DC power which is then supplied to the smoothing capacitor 7.

Figure 4:
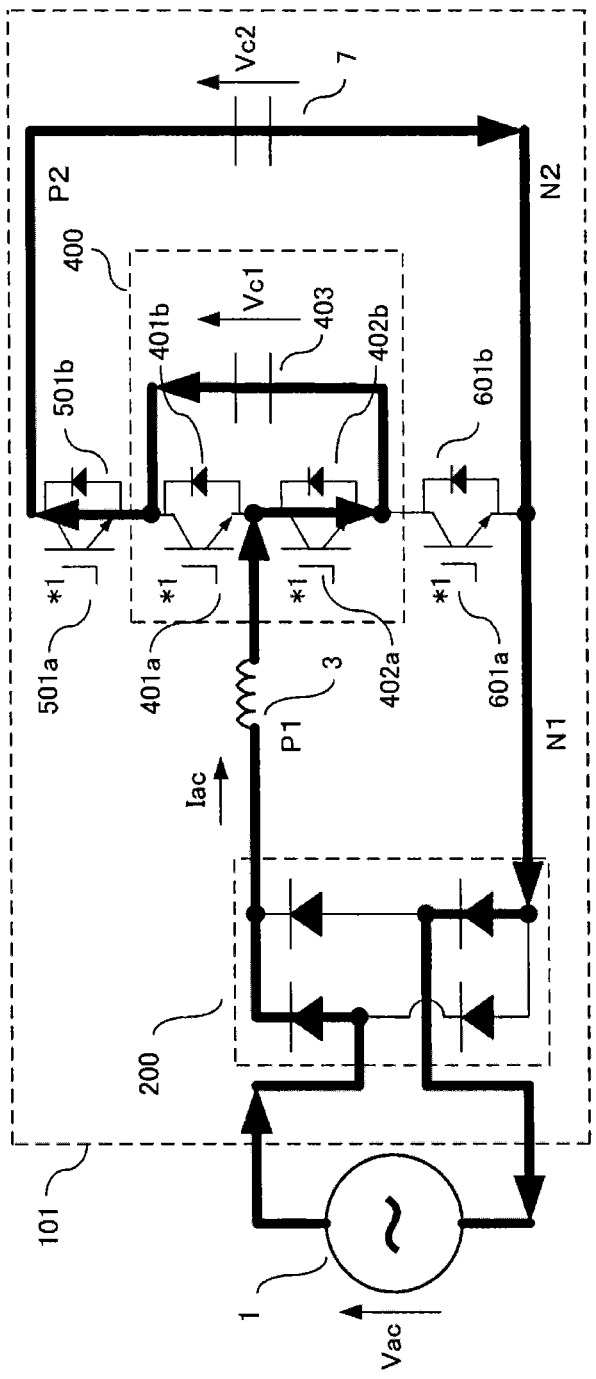
FIG. 4 is a current path diagram illustrating an operation of the power conversion device according to Embodiment 1 of the present invention.
Figure 5:
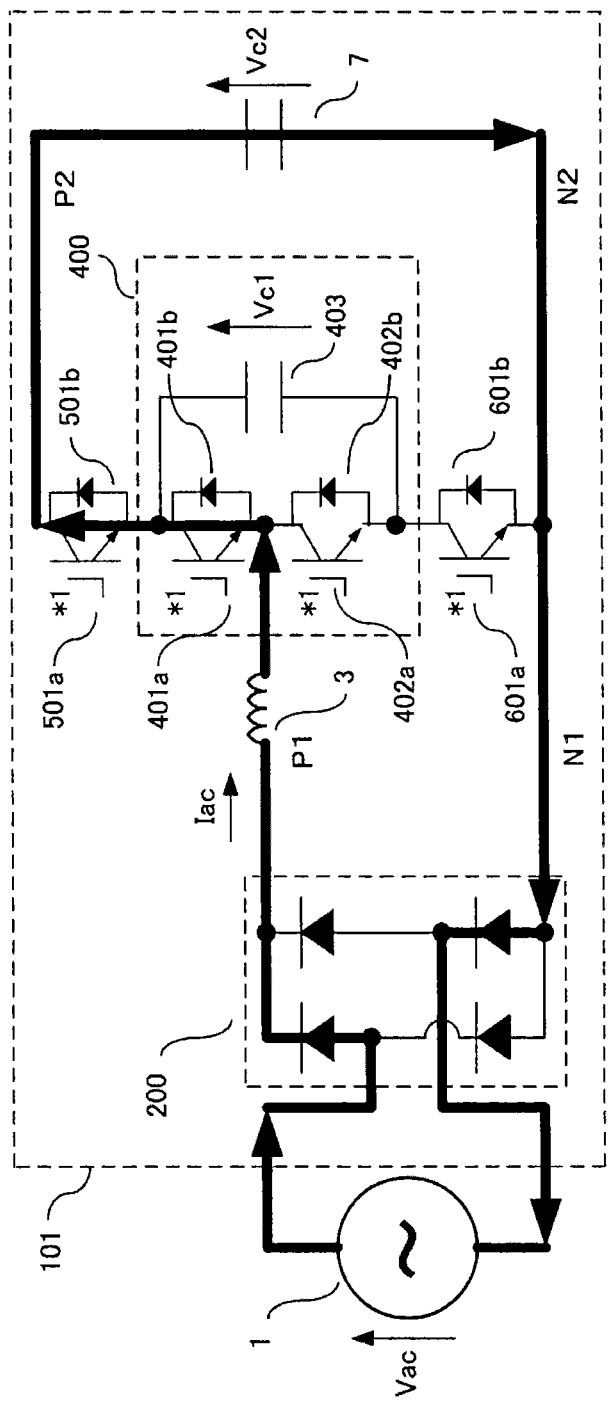
FIG. 5 is a current path diagram illustrating an operation of the power conversion device according to Embodiment 1 of the present invention.
Figure 6:
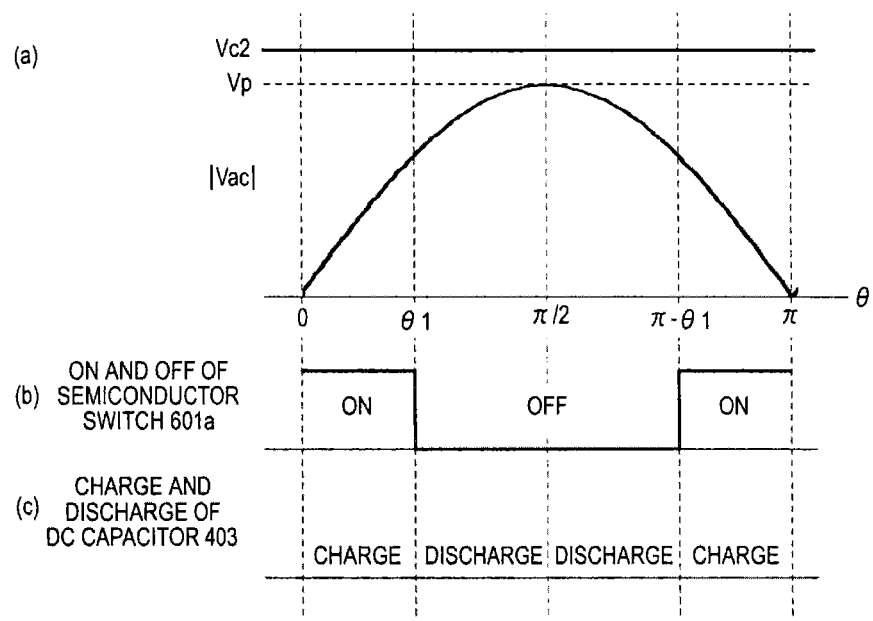
FIG. 6 illustrates waveforms of respective parts and charge and discharge of a DC capacitor of an inverter circuit, for explaining an operation of the power conversion device according to Embodiment 1 of the present invention.

An operation of the power conversion device with the configuration, that is, an operation of outputting DC power to the smoothing capacitor 7 will be described with reference to the drawings. FIGS. 2 to 5 are current path diagrams illustrating an operation of the power conversion device. In FIGS. 2 to 5, a circuit configuration is the same as that of FIG. 1, and a path along which a current flows is indicated by bold lines. In addition, FIG. 6 illustrates waveforms of the respective parts and charge and discharge of the DC capacitor 403 of the inverter circuit 400, for explaining an operation of the power conversion device. In FIG. 6, FIG. 6(a) illustrates a voltage waveform of the AC voltage Vac, FIG. 6(b) illustrates turned-on and turned-off states of the semiconductor switch 601a, and FIG. 6(c) illustrates charge and discharge states of the DC capacitor 403.

In addition, the DC voltage Vc2 of the smoothing capacitor 7 in the output stage is higher than a peak voltage Vp of the AC voltage Vac of the AC power supply 1, and FIG. 6 illustrates a state in which the DC voltage Vc2 of the smoothing capacitor 7 is controlled to be a given target voltage Vc2*. As mentioned above, the target voltage Vc2* of the DC voltage of the smoothing capacitor 7 is set to be higher than the DC voltage Vc1 of the DC capacitor 403 at all times by the control circuit 8. This setting prevents power from leaking from the DC capacitor 403 of the inverter circuit 400 to the smoothing capacitor 7, and thus it is possible to stably control the power conversion device.

The AC voltage Vac which is output from the AC power supply 1 undergoes full-wave rectification in the diode rectifying circuit 200 and thus operates at a cycle which is twice the AC cycle of the AC power supply 1. The inverter circuit 400 controls and outputs the AC current Iac through pulse width modulation (PWM) control so that an input power factor from the AC power supply 1 becomes about 1, and superimposes a generated voltage of the AC side on the AC voltage Vac which is output from the AC power supply 1. The control of the AC current Iac so that the input power factor from the AC power supply 1 becomes about 1 is simply referred to as current control.

A voltage phase of the AC power supply 1 is set to θ, and a description will be made of operations of the four semiconductor switches 401a, 402a, 501a and 601a in a case of 0≤θ<π in which a polarity of the AC voltage Vac is positive. Since full-wave rectification is performed by the diode rectifying circuit 200, also in a case of π<θ≤2π in which a polarity of the AC voltage is negative, the same operation as in a case of the positive polarity range 0≤θ<π is performed.

Figure 2:
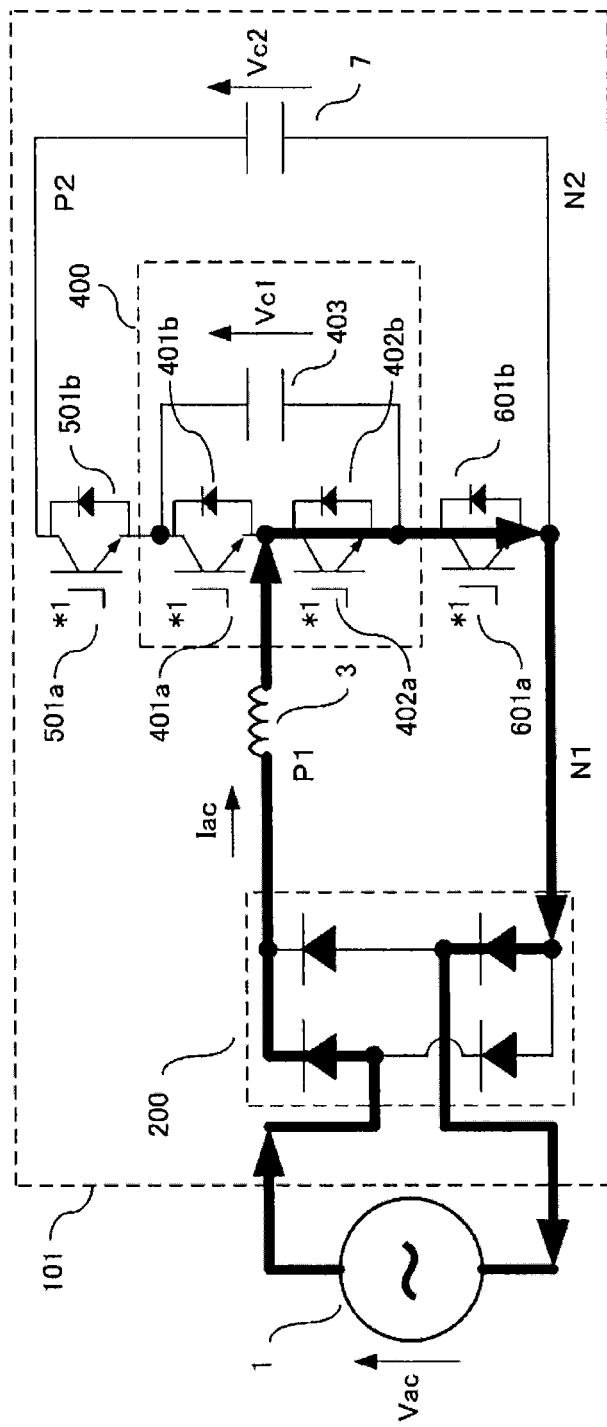
FIG. 2 is a current path diagram illustrating an operation of the power conversion device according to Embodiment 1 of the present invention.
Figure 3:
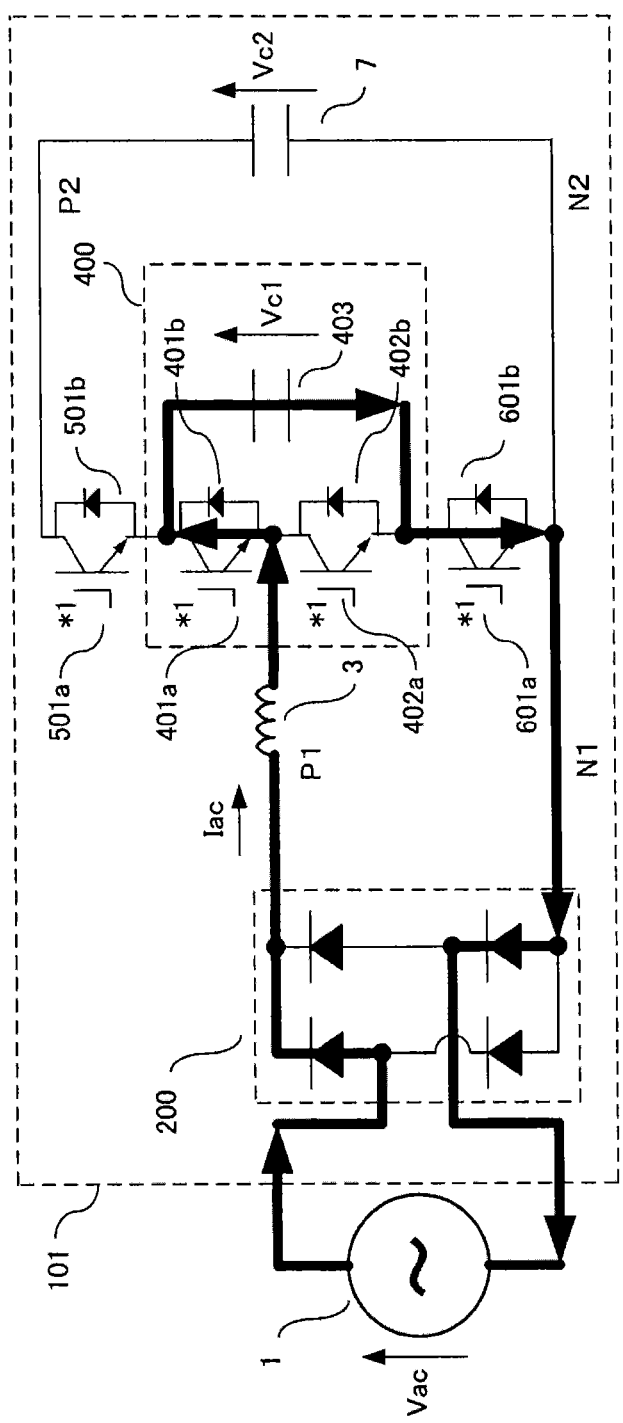
FIG. 3 is a current path diagram illustrating an operation of the power conversion device according to Embodiment 1 of the present invention.

In a case where the semiconductor switches 402a and 601a are turned on, and the semiconductor switches 401a and 501a are turned off, as illustrated in FIG. 2, the AC current Iac flows so as to bypass the DC capacitor 403. In a case where the semiconductor switches 401a and 601a are turned on, and the semiconductor switches 402a and 501a are turned off, as illustrated in FIG. 3, the AC current Iac flows so as to charge the DC capacitor 403. In addition, in a case where the semiconductor switches 402a and 501a are turned on, and the semiconductor switches 401a and 601a are turned off, as illustrated in FIG. 4, the AC current Iac flows so as to discharge the DC capacitor 403. In a case where the semiconductor switches 401a and 501a are turned on, and the semiconductor switches 402a and 601a are turned off, as illustrated in FIG. 5, the AC current Iac flows so as to bypass the DC capacitor 403. As mentioned above, the control circuit 8 controls the semiconductor switches 501a and 601a to change the turned-on and turned-off states once at a ¼ cycle of the AC voltage Vac of the AC power supply 1.

Through combinations of turning-on control and turning-off control of the four semiconductor switches, the semiconductor switches 401a, 402a, 501a and 601a are controlled so that the inverter circuit 400 is PWM-controlled (controlled with PWM control). Therefore, the DC capacitor 403 is charged and discharged, and thus the current control is performed. In addition, when a current which flows through the semiconductor switches 401a and 501a flows from an emitter to a collector, the semiconductor switch elements may be turned off so that the current flows through the diodes 401b and 501b which are connected inversely in parallel thereto.

As illustrated in FIG. 6, the smoothing capacitor 7 is bypassed when the semiconductor switch 601a is in a turned-on state (fixed to a turned-on state) and the semiconductor switch 501a is in a turned-off state (fixed to a turned-off state) in a phase range (predetermined phase range) of ±θ1 (θ1 is referred to as an On phase) centering on the zero-cross phase (θ=0 or π) of the AC voltage Vac of the AC power supply 1. At this time, as illustrated in FIG. 2, the AC current Iac from the AC power supply 1 is limited by the reactor 3 so as to be input to the inverter circuit 400, and then returns to the AC power supply 1 through the semiconductor switch 601a. The reactor 3 is excited in the operation mode of FIG. 2, and the excitation of the reactor 3 is reset in the operation mode of FIG. 3. In addition, in a case of the operation mode of FIG. 2, the DC capacitor 403 is bypassed, and in a case of the operation mode of FIG. 3, the DC capacitor 403 is charged. Therefore, the inverter circuit 400 is PWM-controlled through a combination of the operation mode of FIG. 2 and the operation mode of FIG. 3. Thus, the DC capacitor 403 can be charged and the current control can be performed.

Next, as illustrated in FIG. 6, DC power is output to the smoothing capacitor 7 when the semiconductor switch 601a is in a turned-off state and the semiconductor switch 501a is in a turned-on state in phase ranges other than the phase range ±θ1 centering on the zero-cross phase of the AC voltage Vac of the AC power supply 1. At this time, as illustrated in FIG. 4, the AC current Iac from the AC power supply 1 is limited by the reactor 3 so as to be input to the inverter circuit 400, then charges the smoothing capacitor 7 through the semiconductor switch 501a, and returns to the AC power supply 1. The inverter circuit 400 outputs a voltage (Vc2*−Vac), adds the output voltage (Vc2*−Vac) of the inverter circuit 400 to the AC power supply 1 by repeating the operation mode of FIG. 4 and the operation mode of FIG. 5, and controls the DC voltage Vc2 of the smoothing capacitor 7 to reach the target voltage Vc2* which is higher than the peak voltage of the AC power supply 1.

In the inverter circuit 400, the reactor 3 is excited in the operation mode of FIG. 4, and the excitation of the reactor 3 is reset in the operation of FIG. 5. In addition, in a case of the operation mode of FIG. 4, the DC capacitor 403 is discharged, and in a case of the operation mode of FIG. 5, the DC capacitor 403 is bypassed. Therefore, the inverter circuit 400 is PWM-controlled through a combination of the operation mode of FIG. 4 and the operation mode of FIG. 5. Thus, the current control can be performed.

As mentioned above, the control of the semiconductor switches 501a and 601a changes at the zero-cross phase (θ=0 or π) ±θ1 of the voltage phase θ of the AC voltage Vac of the AC power supply 1, and the smoothing capacitor 7 is bypassed when the semiconductor switch 601a is in a turned-on state and the semiconductor switch 501a is in a turned-off state only in the phase range ±θ1 centering on the zero-cross phase. At this time, the control circuit 8 controls the inverter circuit 400 to generate substantially the same voltage as the AC voltage Vac having a reverse polarity, and also controls and outputs the AC current Iac so that the input power factor becomes about 1 to charge the DC capacitor 403.

In addition, the control circuit 8 controls the inverter circuit 400 to maintain the DC voltage Vc2 of the smoothing capacitor 7 to be the target voltage Vc2* when the semiconductor switch 501a is in a turned-on state and the semiconductor switch 601a is in a turned-off state in the phase ranges other than the phase range ±θ1 centering on the zero-cross phase, and controls and outputs the AC current Iac so that the input power factor becomes about 1. At this time, the inverter circuit 400 generates a difference voltage (Vc2*−Vac) between the DC voltage of the smoothing capacitor 7 and the AC power supply, and the DC capacitor 403 is discharged. Further, an On period in which the semiconductor switch 601a is turned on centers on the zero-cross phase (θ=0 or π), but may be shifted toward either side in a phase range including the zero-cross phase.

In addition, an On period of the semiconductor switch 601a may be set so that energy of charge and energy of discharge of the DC capacitor 403 of the inverter circuit 400 are the same as each other, and the On phase θ1 may be determined. If the energy of charge and the energy of discharge of the DC capacitor 403 of the inverter circuit 400 is the same as each other, Equation (1) is established. Here, Vp indicates a peak voltage of the AC voltage Vac, and Ip indicates a peak current of the AC current Iac.

[Math. 1]

$$\int_0^{\theta 1} V_p \sin\theta \cdot I_p \sin\theta d\theta = \int_{\theta 1}^{\pi}(V^*_{C2} - V_p \sin\theta) \cdot I_p \sin\theta 1 d\theta \quad (1)$$

Here, if Vac=Vp·sin θ, and Iac=Ip·sin θ, a relational expression between the target voltage Vc2* and the peak voltage Vp is given as in Equation (2).

[Math. 2]

$$V^*_{C2} = \frac{V_p \cdot \pi}{4\cos\theta 1} \quad (2)$$

However, a lower limit value of the target voltage Vc2* becomes the peak voltage Vp by the diode rectifying circuit 200, and thus if the On phase θ1 is set which causes the target voltage Vc2* to be equal to or lower than the peak voltage Vp, this leads to an inoperable condition. As mentioned above, the target voltage Vc2* of the smoothing capacitor 7 is defined by the On phase θ1 and can thus be controlled by changing the On phase θ1. In addition, the DC voltage Vc2 of the smoothing capacitor 7 is controlled to track the target voltage Vc2*.

Further, the DC voltage Vc1 of the DC capacitor 403 of the inverter circuit 400 is set to be equal to or higher than a desired generated voltage of the inverter circuit 400 in each phase range of 0≤θ<θ1 and θ1≤θ<π/2. In this case, the DC voltage Vc2 of the smoothing capacitor 7 can be maintained to be the target voltage Vc2*, and it is possible to perform the current control of the inverter circuit 400 in which the AC current Iac is controlled so that the input power factor becomes about 1 with high reliability in all the phases of the AC power supply 1. In this case, the DC voltage Vc1 of the DC capacitor 403 is required to be set so as to satisfy Expressions (3) and (4).

$$Vc1 \geq Vp \cdot \sin\theta 1 \quad (3)$$

$$Vc1 \geq (|Vc2^* - Vp \cdot \sin\theta 1|) \quad (4)$$

In addition, the DC voltage Vc1 of the DC capacitor 403 is set to be equal to or lower than the peak voltage Vp of the AC voltage Vac of the AC power supply 1. Since a loss increases if the DC voltage Vc1 of the DC capacitor 403 increases in the inverter circuit 400 which performs PWM control, the DC voltage Vc1 of the DC capacitor 403 is preferably set to be low in a condition satisfying Expressions (3) and (4).

In addition, since the semiconductor switch 601a is turned on and thus the smoothing capacitor 7 is bypassed only in the phase range ±θ1 (predetermined phase range) centering on the zero-cross phase, the control circuit 8 can control the inverter circuit 400 to control the AC current Iac so that the input power factor becomes about 1 in both periods in which the semiconductor switch 601a is turned on and is turned off, and to output DC power with a desired voltage to the smoothing capacitor 7. In other words, the control circuit 8 can determine the On phase θ1 in a predetermined phase range of the AC voltage of the AC power supply 1 so as to adjust an On period in which the semiconductor switch 601a is turned on, thereby adjusting the DC voltage Vc2 of the DC capacitor 403 to a predetermined voltage. By performing such control, it is possible to perform a self-sustaining operation without using an external power supply in the DC capacitor 403.

In addition, the semiconductor switch 401a is operated to have a polarity reverse to that of the semiconductor switch 402a. In other words, in a case where the semiconductor switch 402a is turned on, the semiconductor switch 401a is turned off, and in a case where the semiconductor switch 402a is turned off, the semiconductor switch 401a is turned on. However, since, in the semiconductor switch 401a, a current flows from the emitter to the collector at all times, the semiconductor switch 401a may be turned off so that a current flows through the diode 401b which is connected inversely in parallel thereto.

Figure 7:
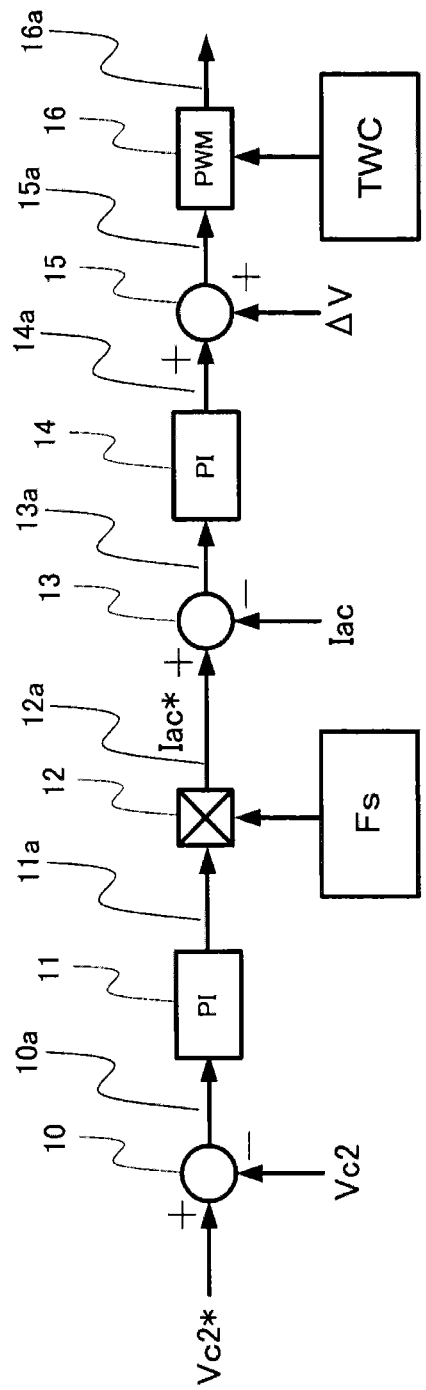
FIG. 7 is a control block diagram illustrating output control on the inverter circuit according to Embodiment 1 of the present invention.

Next, details of control of the inverter circuit 400 for performing input current power factor control will now be described with reference to FIG. 7. FIG. 7 is a control block diagram illustrating output control on the inverter circuit 400 performed by the control circuit 8. Through the output control on the inverter circuit 400, the DC voltage Vc2 of the smoothing capacitor 7 is maintained to be the target voltage Vc2*, and the AC current Iac is controlled so that the power factor of the AC power supply 1 becomes about 1. First, a difference 10a between the DC voltage Vc2 and the target voltage Vc2* of the smoothing capacitor 7 is obtained by a subtractor 10. The difference 10a between the DC voltage Vc2 and the target voltage Vc2* is used as a feedback amount, and an output which is PI-controlled by a PI controller 11 is set as an amplitude target value 11a. A sine wave current command (Iac*) 12a which is synchronized with the AC voltage Vac of the AC power supply 1 is generated by a current command generator 12 on the basis of the amplitude target value 11a and a synchronization frequency Fs of the AC power supply 1.

Next, a difference 13a between the set current command (Iac*) 12a and a detected AC current Iac is obtained by a subtractor 13. The difference 13a between the current command Iac* and the AC current Iac is used as a feedback amount, and an output which is PI-controlled by a PI controller 14 is set as a voltage command 14a which is a target value of a voltage generated by the inverter circuit 400. In this case, a feed forward correction voltage ΔV is obtained which is synchronized with the change between first control in which the semiconductor switch 601a is turned on and the semiconductor switch 501a is turned off and second control in which the semiconductor switch 601a is turned off and the semiconductor switch 501a is turned on. An adder 15 adds the feed forward correction voltage ΔV to the voltage command 14a so as to correct the voltage command 14a. In addition, a gate signal generator 16 generates a gate signal 16a of the semiconductor switch 402a of the inverter circuit 400, corresponding to PWM control by using a corrected voltage command 15a, so that the inverter circuit 400 is operated. A PWM signal with a fixed duty, generated on the basis of a triangular wave of a carrier cycle TWC illustrated in the control block diagram of FIG. 7, may be used as the gate signal 16a. Further, a gate signal of the semiconductor switch 401a is operated to have a polarity reverse to that of a gate signal of the semiconductor switch 402a.

As mentioned above, the control circuit 8 performs the feed forward control in which the corrected voltage command 15a is generated so as to control output of the inverter circuit 400 so that the AC current Iac flowing through the inverter circuit 400 tracks the current command Iac*, and the feed forward correction voltage ΔV is added to the voltage command 14a only at the time of the change between the turning-on and turning-off of the semiconductor switch 601a, which is the time of the change between the first control and the second control. The feed forward correction voltage ΔV is an AC voltage −Vac having a polarity reverse to the AC power supply 1 during the first control, and is a difference voltage (Vc2−Vac) between the DC voltage of the smoothing capacitor 7 and the AC voltage of the AC power supply 1 during the second control.

At the time of the change between the first control and the second control for the semiconductor switch 601a, a voltage command of the inverter circuit 400 is corrected so that an output voltage of the inverter circuit 400 is obtained by adding a difference voltage between the smoothing capacitor 7 and the AC power supply 1 to a voltage of the AC power supply 1. Consequently, it is possible to reliably prevent the control from being delayed as much as a response time of the feedback control. In addition, also the change between the first control and the second control, the AC current Iac can be controlled so that the input power factor becomes about 1, and thus transient current fluctuation can be minimized with high reliability and the occurrence of harmonic currents can be minimized. Therefore, current controllability is improved.

Figure 8:
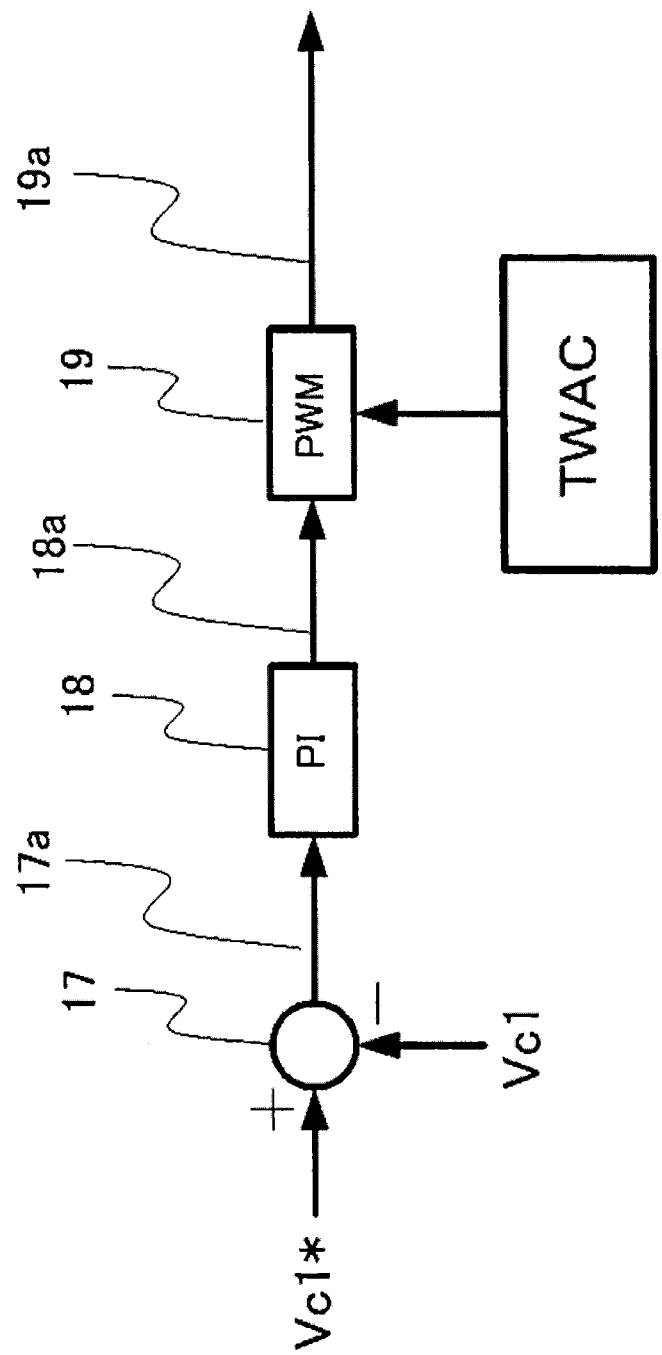
FIG. 8 is a control block diagram illustrating output control of a semiconductor switch according to Embodiment 1 of the present invention.

Next, with reference to FIG. 8, a description will be made of control which is related to output of the semiconductor switches 501a and 601a and which makes the DC voltage Vc1 of the DC capacitor 403 of the inverter circuit 400 track the command value Vc1*. FIG. 8 is a control block diagram illustrating output control on the semiconductor switch 601a, performed by the control circuit 8.

First, a subtractor 17 obtains a difference 17a between the set command value Vc1* and a detected DC voltage Vc1. The difference 17a between the command value Vc1* and the DC voltage Vc1 is used as a feedback amount, and an output which is PI-controlled by a PI controller 18 is set as a voltage command 18a. A gate signal generator 19 generates a gate signal 19a of the semiconductor switch 601a, corresponding to PWM control by using the voltage command 18a. In the PWM control by the gate signal generator 19, a triangular wave (triangular wave of AC power supply cycle TWAC) synchronized with a cycle which is twice the frequency of the AC power supply 1 is used as a carrier wave, and the gate signal 19a is generated through comparative calculation. In other words, a short-circuit period of the semiconductor switch 601a is also controlled by the gate signal 19a.

The semiconductor switch 501a is operated to have a polarity reverse to that of the semiconductor switch 601a. In other words, in a case where the semiconductor switch 601a is turned on, the semiconductor switch 501a is turned off, and in a case where the semiconductor switch 601a is turned off, the semiconductor switch 501a is turned on. However, since, in the semiconductor switch 501a, a current flows from the emitter to the collector at all times, the semiconductor switch 501a may be turned off so that a current flows through the diode 501b which is connected inversely in parallel thereto.

In the present embodiment, since the inverter circuit 400 is controlled by using such a current command, the DC voltage Vc2 of the smoothing capacitor 7 is made to track the target voltage Vc2*, and the input power factor from the AC power supply 1 is controlled to be improved and be output. In addition, a generated voltage of the AC side of the inverter circuit 400 is superimposed on the AC voltage Vac which is output from the AC power supply 1. By performing this control, the semiconductor switches 501a and 601a do not require high frequency switching. Further, the inverter circuit 400 can reduce a treated voltage even more than a peak voltage of the AC power supply 1 through switching of the semiconductor switches. For this reason, a rapid change in a voltage applied to the reactor 3 can be prevented. Thus, it is possible to reduce a switching loss and noise even if the reactor 3 is miniaturized, without using a large reactor which is required to limit a current in the related art.

In addition, in a case where the semiconductor switch 601a is in a turned-on state, since the smoothing capacitor 7 is bypassed and the DC capacitor 403 of the inverter circuit 400 can be charged, the AC current Iac can be made to flow through the AC power supply 1 without causing a high voltage to occur in the inverter circuit 400 and can also be used to release accumulated energy toward the smoothing capacitor 7. For this reason, it is possible to further reduce a level of a voltage treated in switching of the semiconductor switches, and to further promote achievement of high efficiency and low noise. In addition, the reactor 3 in this case does not accumulate energy but operates as a current-limiting circuit which limits a current, and thus reliability of current control is improved. Further, the DC voltage Vc1 of the DC capacitor 403 of the inverter circuit 400 is set to be equal to or lower than the peak voltage Vp of the AC voltage Vac, and thus it is possible to reliably achieve effects of high efficiency and low noise.

Further, the inverter circuit 400 is of a half bridge type constituted by the two semiconductor switches 401a and 402a and the DC capacitor 403, the semiconductor switch 501a is connected between the semiconductor switch 401a of the positive side of the inverter circuit 400 and the positive side P2 of the smoothing capacitor 7, and the semiconductor switch 601a is connected between the semiconductor switch 402a of the negative side of the inverter circuit 400 and the negative side N2 of the smoothing capacitor 7. For this reason, it is possible to realize current control with a smaller number of semiconductor switch elements, and thus to realize miniaturization of a power conversion device, a light weight power conversion device, and a reduction in the number of components thereof.

In addition, since the semiconductor switches 501a and 601a are operated only in a specific phase of an input voltage from the AC power supply 1, the power conversion device can be stably controlled, and thus few losses caused by switching of the semiconductor switches occurs. In addition, since the smoothing capacitor 7 is bypassed when the semiconductor switch 601a is turned on only in the phase range θ1 (short-circuit phase range) centering on θ=0 or π which is the zero-cross phase, output to the smoothing capacitor 7 is not necessary in a region where the AC voltage Vac of the AC power supply 1 is low, and a DC voltage of the inverter circuit 400 is set to be low. Therefore, it is possible to achieve high efficiency and low noise. Further, since the target voltage Vc2* of the smoothing capacitor 7 can be controlled by using the On phase θ1, the target voltage Vc2* can be easily controlled, and controllability and a degree of freedom of control are improved.

Further, at the time of the change between turning-on and turning-off of the semiconductor switch 601a, the inverter circuit 400 is controlled to change the charge and discharge operations of the DC capacitor 403 due to the feed forward control, and thus it is possible to reliably prevent the control from being delayed as much as a response time of the feedback control and thus to realize high speed control.

In addition, it is possible to realize the above-described current control with a configuration in which the semiconductor switches 401a and 501a are omitted, and only the diodes 401b and 501b are used. A low Vf diode for low frequency driving may be selected as the diode 501b. A high frequency diode, which has good recovery characteristics for high frequency driving and has a smaller loss during high frequency driving than a diode for low frequency driving, may be selected as the diode 401b. This configuration is equivalent to a configuration in which the semiconductor switch 501a connected to the positive side of the smoothing capacitor is replaced with a diode, and the semiconductor switch 401a of the positive side of the inverter circuit 400 is replaced with a high frequency diode which has a loss smaller than that of the diode during high frequency driving. In this case, it is possible to optimize recovery losses and conduction losses of the diode 501b which is driven at a low frequency and the diode 401b which is driven at a high frequency, and thus to further reduce losses. Further, by omitting semiconductor switches, reducing the number of driving circuits, and miniaturizing a cooling structure, it is possible to realize miniaturization of a power conversion device, a light weight power conversion device, and a reduction in the number of components thereof.

Further, a MOSFET for high frequency driving may be used as the semiconductor switch 402a, and an IGBT for low frequency driving may be used as the semiconductor switch 601a. In this case, it is possible to further reduce losses of the semiconductor switch 402a which is driven at a high frequency and the semiconductor switch 601a which is driven at a low frequency and to miniaturize a cooling structure. Thus, it is possible to realize miniaturization of a power conversion device, a light weight power conversion device, and a reduction in the number of components thereof. Furthermore, the control circuit 8 may set a driving frequency for turning-on and turning-off control of the semiconductor switches 401a and 402a which constitute the inverter circuit 400 to be higher than a driving frequency for turning-on and turning-off control of the semiconductor switches 501a and 601a which do not constitute the inverter circuit 400, so as to control the turning-on and turning-off of each of the semiconductor switches 401a, 402a, 501a and 601a. Also in this case, it is possible to further reduce losses of the semiconductor switches 401a and 402a which are driven at a high frequency and the semiconductor switches 501a and 601a which are driven at a low frequency and to miniaturize a cooling structure. Thus, it is possible to realize miniaturization of a power conversion device, a light weight power conversion device, and a reduction in the number of components thereof.

Embodiment 2

In Embodiment 1, the DC voltage Vc1 of the DC capacitor 403 is set to satisfy Expressions (3) and (4), and the inverter circuit 400 performs the overall current control in a state in which the semiconductor switch 601a is turned on only in the phase range of the zero-cross phase ($\theta=0$ or $\pi$) ±$\theta$1. The present embodiment is different from Embodiment 1 in that the DC voltage Vc1 of the DC capacitor 403 of the inverter circuit 400 is set regardless of the constraints of Expressions (3) and (4), and the current control is performed by the semiconductor switch 601a instead of the inverter circuit 400 only in a case where Expressions (3) and (4) are not satisfied. In addition, a circuit configuration in the present embodiment is the same as the circuit configuration of Embodiment 1.

Figure 9:
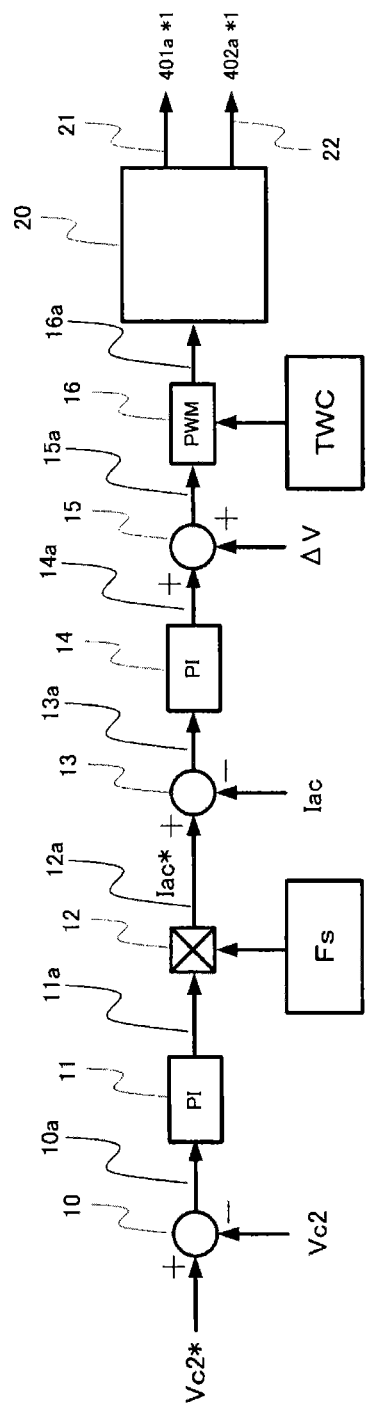
FIG. 9 is a control block diagram illustrating output control on an inverter circuit according to Embodiment 2 of the present invention.

Hereinafter, a control circuit of Embodiment 2 will be described. FIG. 9 is a control block diagram illustrating output control on the inverter circuit 400, performed by the control circuit 8. In the same manner as in Embodiment 1, the DC voltage Vc2 of the smoothing capacitor 7 is maintained to be the target voltage Vc2* by performing output control on the inverter circuit 400, and the gate signal 16a is generated to control the AC current Iac so that a power factor of the AC power supply 1 becomes about 1. In the present embodiment, a gate signal selector 20 is additionally provided, and a gate signal 21 applied to the semiconductor switch 401a and a gate signal 22 applied to the semiconductor switch 402a are selected according to a relationship between the AC voltage Vac of the AC power supply 1, the DC voltage Vc1 of the DC capacitor 403, and the DC voltage Vc2 of the smoothing capacitor 7.

Figure 10:
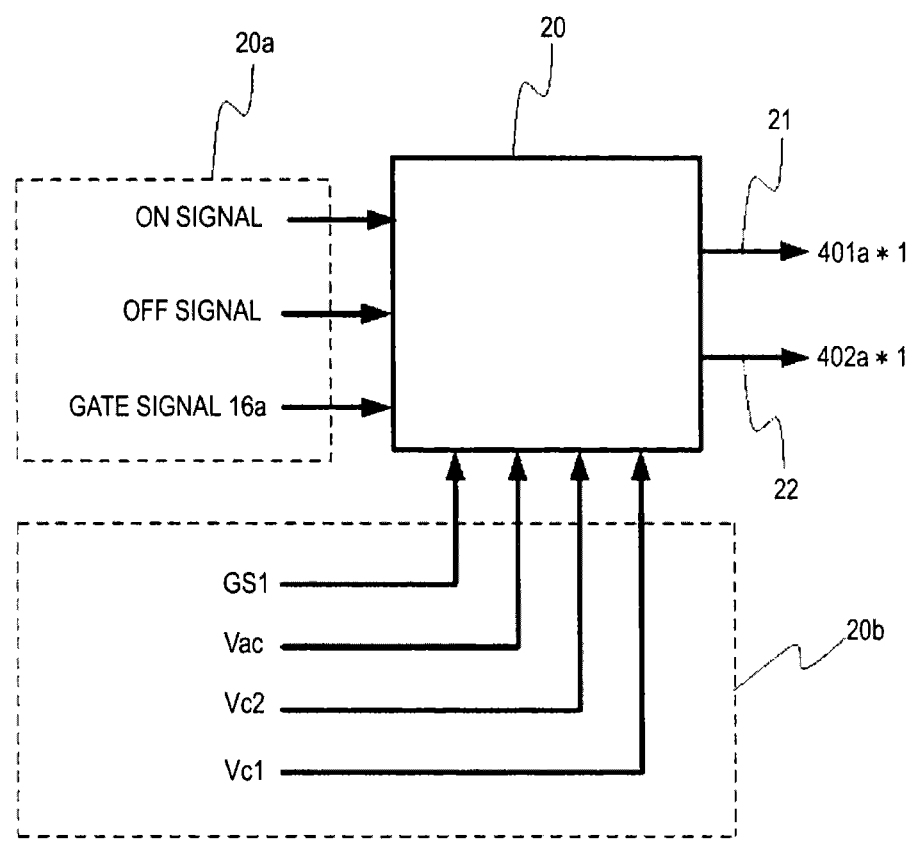
FIG. 10 is a control block diagram illustrating a specific function of a gate signal selector according to Embodiment 2 of the present invention.

FIG. 10 is a control block diagram illustrating a specific function of the gate signal selector 20. Input signals 20a to the gate signal selector 20 are three signals including the gate signal 16a, an On signal, and an Off signal. The gate signal selector 20 selects the three-pattern signals so as to output a gate signal. Voltage information 20b for selecting a gate signal includes the AC voltage Vac of the AC power supply 1, the DC voltage Vc1 of the DC capacitor 403, the DC voltage Vc2 of the smoothing capacitor 7, and a gate signal GS1 of the semiconductor switch 601a.

Figure 11:
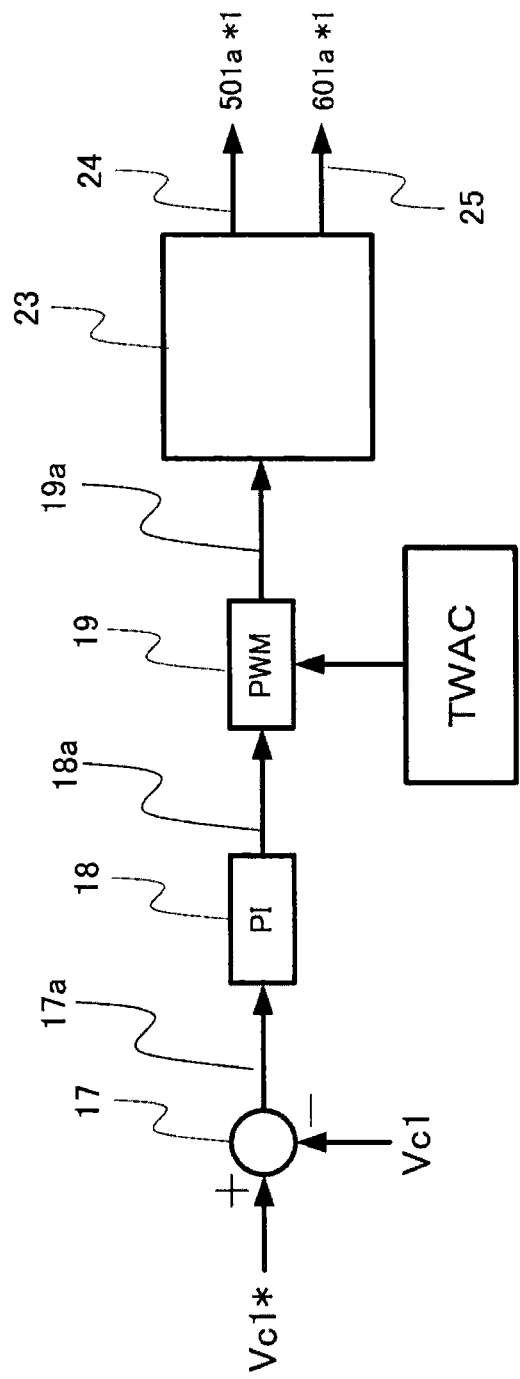
FIG. 11 is a control block diagram illustrating output control on a semiconductor switch according to Embodiment 2 of the present invention.

FIG. 11 is a control block diagram illustrating output control on the semiconductor switch 601a, performed by the control circuit 8. In the same manner as in Embodiment 1, a subtractor 17 obtains a difference 17a between the set command value Vc1* and a detected DC voltage Vc1. The difference 17a between the command value Vc1* and the DC voltage Vc1 is used as a feedback amount, and an output which is PI-controlled by a PI controller 18 is set as a voltage command 18a. A gate signal generator 19 generates a gate signal 19a of the semiconductor switch 601a, corresponding to PWM control by using the voltage command 18a. In the present embodiment, a gate signal selector 23 is additionally provided, and a gate signal 24 applied to the semiconductor switch 501a and a gate signal 25 applied to the semiconductor switch 601a are selected according to a relationship between the AC voltage Vac of the AC power supply 1, the DC voltage Vc1 of the DC capacitor 403, and the DC voltage Vc2 of the smoothing capacitor 7.

Figure 12:
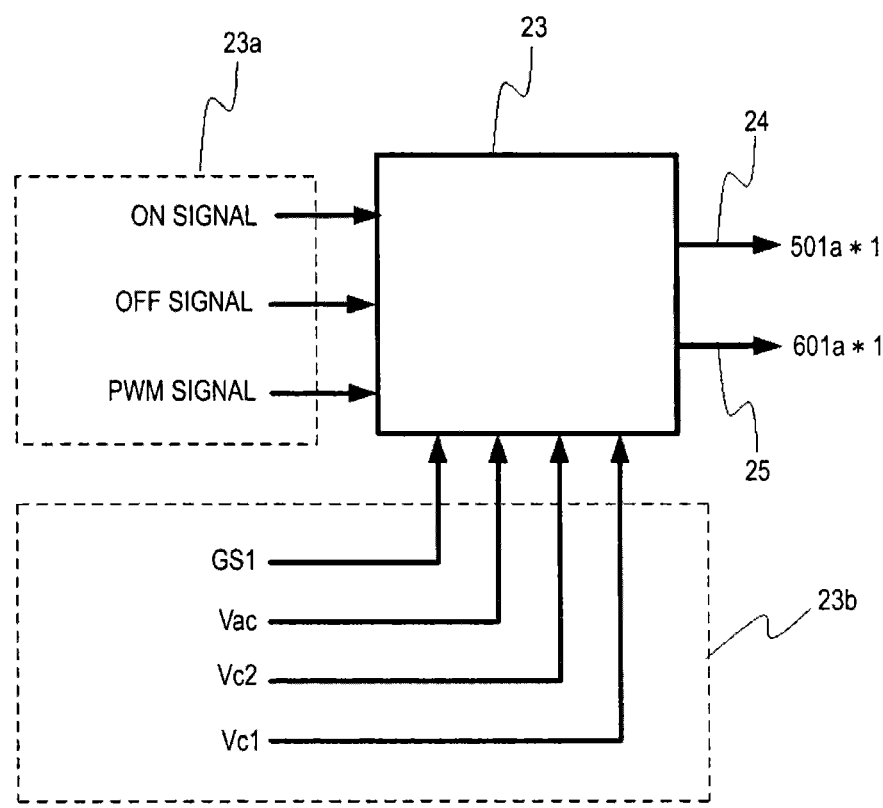
FIG. 12 is a control block diagram illustrating a specific function of the gate signal selector according to Embodiment 2 of the present invention.

FIG. 12 is a control block diagram illustrating a specific function of the gate signal selector 23. Input signals 23a to the gate signal selector 23 are three signals including a current control PWM signal, an On signal, and an Off signal. The gate signal selector 23 selects the three-pattern signals so as to output a gate signal. Voltage information 23b for selecting a gate signal includes the AC voltage Vac of the AC power supply 1, the DC voltage Vc1 of the DC capacitor 403, the DC voltage Vc2 of the smoothing capacitor 7, and a gate signal GS1 of the semiconductor switch 601a.

As the current control PWM signal, a PWM signal with a fixed duty or a PWM signal which is obtained through feedback control may be used. For example, a PWM signal with a fixed duty, which is generated on the basis of the triangular wave of carrier cycle TWC illustrated in the control block diagram of FIG. 9, may be used, and, a PWM signal, which is generated by the gate signal generator 16 may be used without adding the feed forward correction voltage, in the control block diagram of FIG. 9.

Here, detailed descriptions will be made of operations of the gate signal selector 20 and the gate signal selector 23 illustrated in FIGS. 10 and 12. In a case where the DC voltage Vc1 of the DC capacitor 403 is higher than the AC voltage Vac of the AC power supply 1 within a period in which the semiconductor switch 601a is set to be turned on, that is, in a case where Expression (3) is satisfied, the gate signal selector 20 selects the gate signal 16a which is a PWM signal as a gate signal of the semiconductor switches 401a and 402a, and the gate signal selector 23 selects the On signal as a gate signal of the semiconductor switch 601a (fixes the semiconductor switch 601a to a turned-on state) and selects the Off signal as a gate signal of the semiconductor switch 501a (fixes the semiconductor switch 501a to a turned-off state). In addition, the gate signal of the semiconductor switch 401a and the gate signal of the semiconductor switch 402a have a relationship of polarities reverse to each other.

A current path when the semiconductor switch 402a is turned on is as in FIG. 2, and a current path when the semiconductor switch 401a is turned on is as in FIG. 3. In FIG. 2, the reactor 3 is excited by the AC voltage Vac of the AC power supply 1. In FIG. 3, the excitation of the reactor 3 is reset by a difference voltage between the AC voltage Vac of the AC power supply 1 and the DC voltage Vc2 of the smoothing capacitor 7.

Next, in a case where the DC voltage Vc1 of the DC capacitor 403 is lower than the AC voltage Vac of the AC power supply 1 within a period in which the semiconductor switch 601a is set to be turned on, that is, in a case where Expression (3) is not satisfied, the gate signal selector 20 selects the On signal as a gate signal of the semiconductor switch 401a (fixes the semiconductor switch 401a to a turned-on state) and selects the Off signal as a gate signal of the semiconductor switch 402a (fixes the semiconductor switch 402a to a turned-off state), and the gate signal selector 23 selects the current control PWM signal as a gate signal of the semiconductor switch 501a and the semiconductor switch 601a (performs PWM control on the semiconductor switches 501a and 601a through synchronization with each other). In addition, the gate signal of the semiconductor switch 501a and the gate signal of the semiconductor switch 601a have a relationship of polarities reverse to each other.

A current path when the semiconductor switch 601a is turned on is as in FIG. 3, and a current path when the semiconductor switch 601a is turned off is as in FIG. 5. In FIG. 3, the reactor 3 is excited since the DC voltage Vc1 of the DC capacitor 403 is lower than the AC voltage Vac of the AC power supply 1. In FIG. 5, the excitation of the reactor 3 is reset since the DC voltage Vc2 of the smoothing capacitor 7 is lower than the AC voltage Vac of the AC power supply 1. Therefore, even if an operation condition in which Expression (3) is not satisfied when the semiconductor switch 601a is turned on occurs, in a case where the gate signal selectors 20 and 23 select gate signals of the semiconductor switches 401a, 402a, 501a and 601a as described above, it is possible to continuously perform a charge operation of the DC capacitor 403 and high power factor control of the AC power supply 1.

In a case where the DC voltage Vc1 of the DC capacitor 403 is higher than a difference voltage between the DC voltage Vc2 of the smoothing capacitor 7 and the AC voltage Vac of the AC power supply 1 within a period in which the semiconductor switch 601a is set to be turned off, that is, in a case where Expression (4) is satisfied, the gate signal selector 20 selects the gate signal 16a which is a PWM signal as a gate signal of the semiconductor switches 401a and 402a, and the gate signal selector 23 selects the Off signal as a gate signal of the semiconductor switch 601a (fixes the semiconductor switch 601a to a turned-off state) and selects the On signal as a gate signal of the semiconductor switch 501a (fixes the semiconductor switch 501a to a turned-on state). In addition, the gate signal of the semiconductor switch 401a and the gate signal of the semiconductor switch 402a have a relationship of polarities reverse to each other.

A current path when the semiconductor switch 402a is turned on is as in FIG. 4, and a current path when the semiconductor switch 401a is turned on is as in FIG. 5. In FIG. 4, the reactor 3 is excited by the AC voltage Vac of the AC power supply 1. In FIG. 5, the excitation of the reactor 3 is reset by a difference voltage between the AC voltage Vac of the AC power supply 1 and the DC voltage Vc2 of the smoothing capacitor 7.

Next, in a case where the DC voltage Vc1 of the DC capacitor 403 is lower than a difference voltage between the DC voltage Vc2 of the smoothing capacitor 7 and the AC voltage Vac of the AC power supply 1 within a period in which the semiconductor switch 601a is set to be turned off, that is, in a case where Expression (4) is not satisfied, the gate signal selector 20 selects the Off signal as a gate signal of the semiconductor switch 401a (fixes the semiconductor switch 401a to a turned-off state) and selects the On signal as a gate signal of the semiconductor switch 402a (fixes the semiconductor switch 402a to a turned-on state), and the gate signal selector 20 selects the current control PWM signal as a gate signal of the semiconductor switch 501a and the semiconductor switch 601a (performs PWM control on the semiconductor switches 501a and 601a through synchronization with each other). In addition, the gate signal of the semiconductor switch 501a and the gate signal of the semiconductor switch 601a have a relationship of polarities reverse to each other.

A current path when the semiconductor switch 601a is turned on is as in FIG. 2, and a current path when the semiconductor switch 601a is turned off is as in FIG. 4. In FIG. 2, the reactor 3 is excited by the AC voltage Vac of the AC power supply 1. In FIG. 4, the excitation of the reactor 3 is reset since a sum voltage of the AC voltage Vac of the AC power supply 1 and the DC voltage Vc1 of the DC capacitor 403 is lower than the DC voltage Vc2 of the smoothing capacitor 7. Therefore, even if an operation condition in which Expression (4) is not satisfied when the semiconductor switch 601a is turned off occurs, in a case where the gate signal selectors 20 and 23 select gate signals of the semiconductor switches 401a, 402a, 501a and 601a as described above, it is possible to continuously perform a discharge operation of the DC capacitor 403 and high power factor control of the AC power supply 1.

Figure 13:
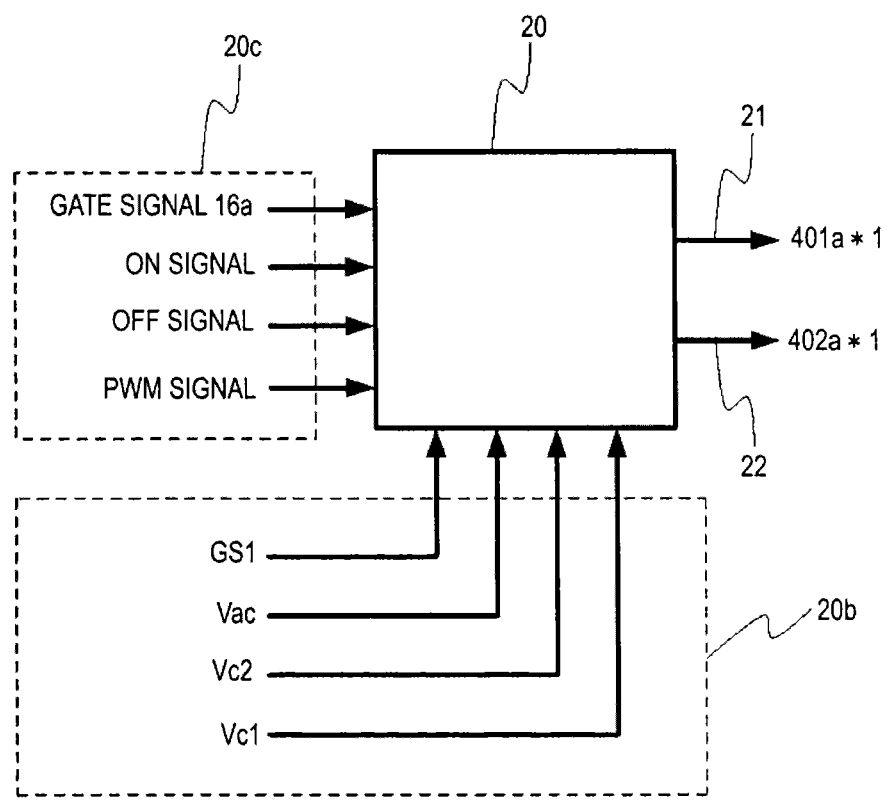
FIG. 13 is a control block diagram illustrating a specific function of the gate signal selector according to Embodiment 2 of the present invention.

In addition, in FIG. 9, the semiconductor switch 401a may be turned off, and the semiconductor switch 402a may be driven at a high frequency in synchronization with the semiconductor switch 601a regardless of the case where Expression (3) is not satisfied during the On period of the semiconductor switch 601a or the case where Expression (4) is not satisfied during the Off period of the semiconductor switch 601a. FIG. 13 illustrates a control block diagram in a case where this control is performed. FIG. 13 is a control block diagram illustrating a specific function of the gate signal selector 20. In FIG. 13, input signals 20c to the gate signal selector 20 are four signals including the gate signal 16a which is a PWM signal, an On signal, an Off signal, and a current control PWM signal. Voltage information 20b for selecting a gate signal includes the AC voltage Vac of the AC power supply 1, the DC voltage Vc1 of the DC capacitor 403, the DC voltage Vc2 of the smoothing capacitor 7, and a gate signal GS1 of the semiconductor switch 601a.

In a case where Expressions (3) and (4) are satisfied, from the voltage information, the Off signal is selected as a gate signal of the semiconductor switch 401a, and the gate signal 16a which is a PWM signal is selected as a gate signal of the semiconductor switch 402a. In addition, in a case where Expression (3) or Expression (4) is not satisfied, the Off signal is selected as agate signal of the semiconductor switch 401a (the semiconductor switch 401a is fixed to a turned-off state), and the current control PWM signal is selected as a gate signal of the semiconductor switch 402a.

A current path when the semiconductor switch 402a and the semiconductor switch 601a are turned on is as in FIG. 2, and a current path when the semiconductor switch 402a and the semiconductor switch 601a are turned off is as in FIG. 5. In FIG. 2, the reactor 3 is excited by the AC voltage Vac of the AC power supply 1, and, in FIG. 5, the excitation of the reactor 3 is reset by a difference voltage between the DC voltage Vc2 of the smoothing capacitor 7 and the AC voltage Vac of the AC power supply 1.

In the present embodiment, in addition to the features obtained by the configuration of Embodiment 1, even in a case where the conditions (Expressions (3) and (4)) in which current control can be performed by the inverter circuit 400 are not satisfied, the current control can be continuously performed through changing to the semiconductor switch 601a. Consequently, since operation voltage ranges of the AC voltage Vac of the AC power supply 1 and the DC voltage Vc2 of the smoothing capacitor 7 can be widened, it is possible to continuously perform high power factor control corresponding to the wide operation condition.

Embodiment 3

Figure 14:
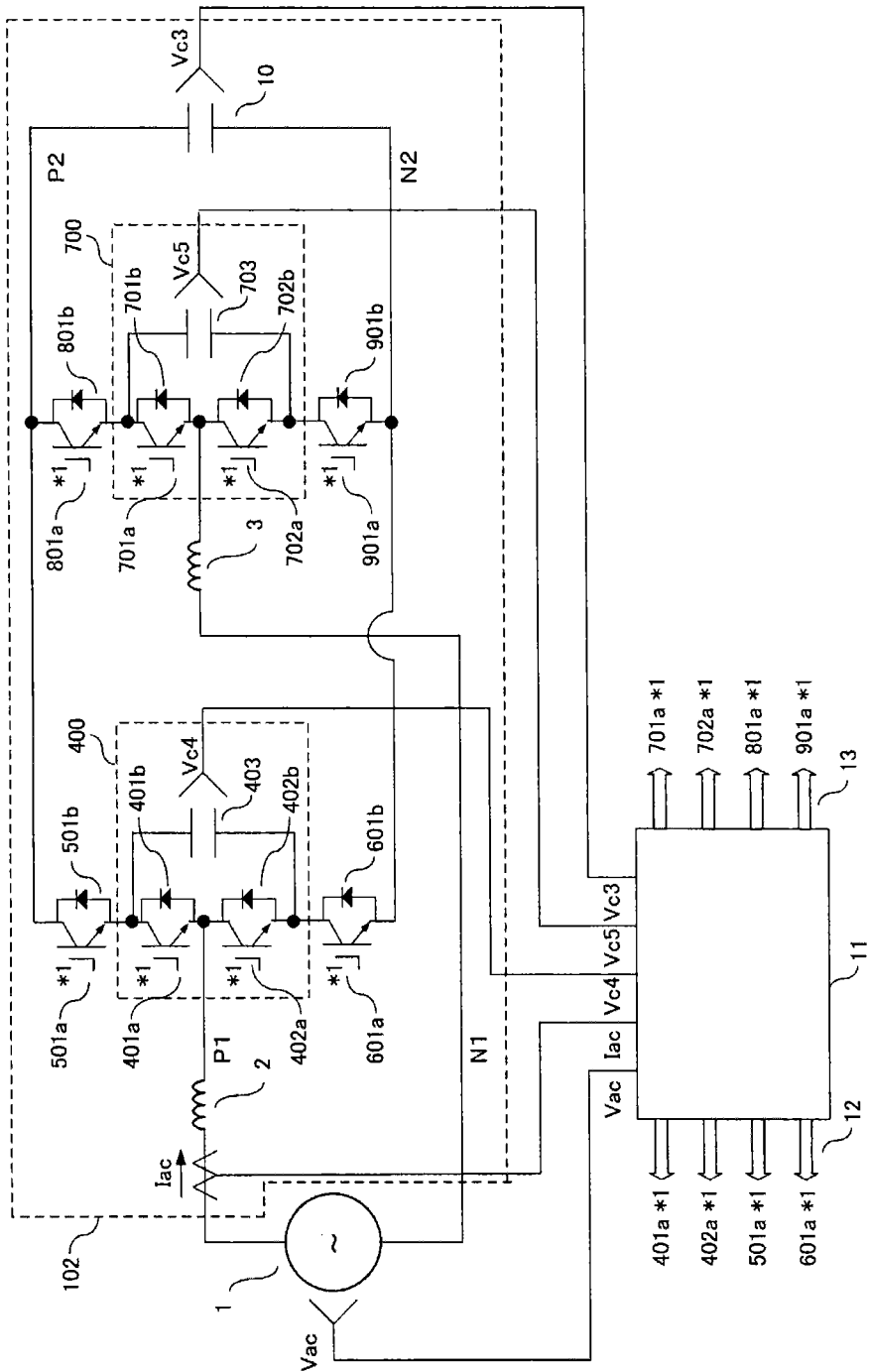
FIG. 14 is a configuration diagram of a power conversion device according to Embodiment 3 of the present invention.

In Embodiments 1 and 2, the diode rectifying circuit 200 is included in the rear stage of the AC power supply 1, but, in the present embodiment, the diode rectifying circuit 200 is omitted, and half bridge type inverter circuits are connected to each other in two stages. FIG. 14 is a schematic configuration diagram of a power conversion device of Embodiment 3. As illustrated in FIG. 14, the power conversion device includes a main circuit 102 which converts AC power of an AC power supply 1 into DC power which is then output, and a control circuit 11. The main circuit 102 includes a positive side reactor 2 and a negative side reactor 3 which are current limiting circuits, an inverter circuit 400 which is a half bridge type first inverter circuit, an inverter circuit 700 which is a half bridge type second inverter circuit, semiconductor switches 501a, 601a, 801a and 901a, and a smoothing capacitor 10 which smoothes an output voltage.

An output terminals of the AC power supply 1 are respectively connected to the positive side reactor 2 which is inserted into a positive side bus P1 of the AC power supply 1 and the negative side reactor 3 which is inserted into a negative side bus N1 of the AC power supply 1. On the rear stage of the positive side reactor 2, the half bridge type inverter circuit 400 which includes a semiconductor switch 401a, a semiconductor switch 402a, and a DC capacitor 403 which is a first DC capacitor is connected. The semiconductor switch 401a is a first semiconductor switch of the positive side of the inverter circuit 400, and the semiconductor switch 402a is a second semiconductor switch of the negative side of the inverter circuit 400. In addition, a connection point (an AC side terminal) between the semiconductor switch 401a and the semiconductor switch 402a is connected to the positive side reactor 2. Further, on the rear stage of the negative side reactor 3, the half bridge type inverter circuit 700 which includes a semiconductor switch 701a, a semiconductor switch 702a, and a DC capacitor 703 which is a second DC capacitor is connected. The semiconductor switch 701a is a fifth semiconductor switch of the positive side of the inverter circuit 700, and the semiconductor switch 702a is a sixth semiconductor switch of the negative side of the inverter circuit 700. In addition, a connection point (AC side terminal) between the semiconductor switch 701a and the semiconductor switch 702a is connected to the negative side reactor 3.

The semiconductor switch 501a which is a third semiconductor switch is connected between the semiconductor switch 401a of the positive side of the inverter circuit 400 and a positive side P2 of the smoothing capacitor 10. The semiconductor switch 601a which is a fourth semiconductor switch is connected between the semiconductor switch 402a of the negative side of the inverter circuit 400 and a negative side N2 of the smoothing capacitor 10. In addition, the semiconductor switch 801a which is a seventh semiconductor switch is connected between the semiconductor switch 701a of the positive side of the inverter circuit 700 and the positive side P2 of the smoothing capacitor 10. The semiconductor switch 901a which is an eighth semiconductor switch is connected between the semiconductor switch 702a of the negative side of the inverter circuit 700 and the negative side N2 of the smoothing capacitor 10. Further, the semiconductor switches 401a, 402a, 701a and 702a are semiconductor switches constituting the inverter circuits 400 and 700, and the semiconductor switches 501a, 601a, 801a and 901a are switches not constituting the inverter circuits 400 and 700.

In the same manner as in Embodiments 1 and 2, the inverter circuit 400 is an inverter having a half bridge configuration including the semiconductor switches 401a and 402a such as two IGBTs which are connected inversely in parallel to diodes 401b and 402b, and the DC capacitor 403. Similarly, the inverter circuit 700 is an inverter having a half bridge configuration including the semiconductor switches 701a and 702a such as two IGBTs which are connected inversely in parallel to diodes 701b and 702b, and the DC capacitor 703. The semiconductor switches 501a, 601a, 801a and 901a are semiconductor switch elements such as IGBTs which are respectively connected inversely in parallel to the diodes 501b, 601b, 801b and 901b. In addition, the semiconductor switches 401a, 402a, 701a, 702a, 501a, 601a, 801a and 901a may be semiconductor switch elements other than the IGBTs, and may be a MOSFET in which a diode is embedded between a source and a drain, or the like. Further, in a case where a regenerative operation is not performed, the semiconductor switches 501a and 801a may be omitted, and only the diodes 501b and 801b may be used.

In addition, the power conversion device includes a voltmeter which measures a DC voltage Vc4 of the DC capacitor 403 of the inverter circuit 400, a voltmeter which measures a DC voltage Vc5 of the DC capacitor 703 of the inverter circuit 700, a voltmeter which measures a DC voltage Vc3 of the smoothing capacitor 10, a voltmeter which measures an AC voltage Vac from the AC power supply 1, and an ammeter which measures an AC current Iac therefrom.

The control circuit 11 controls turning-on and turning-off of the semiconductor switch elements 401a, 402a, 701a, 702a, 501a, 601a, 801a and 901a. The control circuit 11 generates gate signals 12 and 13 applied to the semiconductor switches 401a and 402a of the inverter circuit 400, the semiconductor switches 701a and 702a of the inverter circuit 700, and the semiconductor switches 501a, 601a, 801a, 901a, and performs output control on the inverter circuit 400, the inverter circuit 700, and the semiconductor switches 501a, 601a, 801a and 901a on the basis of the DC voltage Vc4 of the DC capacitor 403 of the inverter circuit 400, the DC voltage Vc5 of the DC capacitor 703 of the inverter circuit 700, the DC voltage Vc3 of the smoothing capacitor 10, and the AC voltage Vac and the AC current Iac from the AC power supply 1. Therefore, the DC voltage Vc3 of the smoothing capacitor 10 is maintained to be a given target voltage Vc3*, the AC current Iac from the AC power supply 1 is maintained in a high power factor, and the DC voltage Vc4 of the DC capacitor 403 and the DC voltage Vc5 of the DC capacitor 703 are maintained to be given command value Vc4* and command value Vc5*.

More specifically, the control circuit 11 controls of turning-on and turning-off of the semiconductor switch 601a and the semiconductor switch 901a so that the DC voltages Vc4 and Vc5 of the DC capacitor 403 and the DC capacitor 703 track the respective command values Vc4* and Vc5*, and controls turning-on and turning-off of the semiconductor switches 401a, 402a, 701a and 702a so that the DC voltage Vc3 of the smoothing capacitor 10 tracks the target voltage Vc3* of the smoothing capacitor 10 so as to adjust an input power factor from the AC power supply 1, thereby improving the input power factor.

In addition, the control circuit 11 changes control for turning-on and turning-off of the semiconductor switches 401a and 402a of the inverter circuit 400 and control for turning-on and turning-off of the semiconductor switches 701a and 702a of the inverter circuit 700 depending on polarities of the AC voltage Vac of the AC power supply 1, so that the DC voltage Vc3 of the smoothing capacitor 10 tracks the target voltage Vc3* of the smoothing capacitor 10 so as to adjust the input power factor from the AC power supply 1, thereby performing control for improving the input power factor. Further, the control circuit 11 performs control for regenerating power of the smoothing capacitor 10 in the AC power supply 1. Furthermore, the control circuit 11 controls turning-on and turning-off of the semiconductor switches 401a, 402a, 701a, 702a, 501a, 601a, 801a and 901a so that the DC capacitors 403 and 703 are charged during a powering operation and the DC capacitors 403 and 703 are discharged during a regenerative operation.

With reference to the drawings, a description will be made of a powering operation of the power conversion device with this configuration, that is, an operation of outputting DC power to the smoothing capacitor 10. FIGS. 15 to 22 are current path diagrams illustrating a powering operation of the power conversion device. FIGS. 15 to 18 are current path diagrams in a case where a polarity of the AC voltage Vac is positive. FIGS. 19 to 22 are current path diagrams in a case where a polarity of the AC voltage Vac is negative. In FIGS. 15 to 22, a circuit configuration is the same as that of FIG. 14, and a path along which a current flows is indicated by bold lines.

Figure 23:
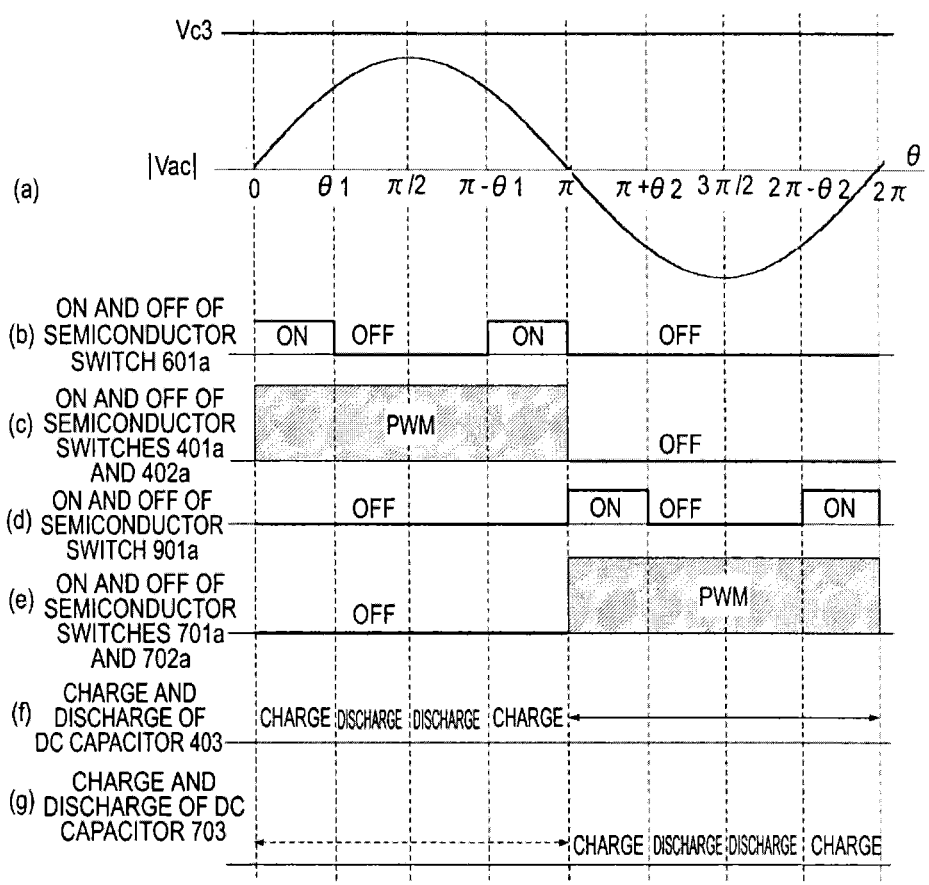
FIG. 23 illustrates waveforms of respective parts and charge and discharge of a DC capacitor of an inverter circuit, for explaining a powering operation of the power conversion device according to Embodiment 3 of the present invention.

In addition, FIG. 23 illustrates waveforms of the respective parts and charge and discharge of the DC capacitors 403 and 703 of the inverter circuits 400 and 700, for explaining a powering operation of the power conversion device. In FIG. 23, FIG. 23 (a) illustrates a voltage waveform of the AC voltage Vac; FIG. 23(b) illustrates turned-on and turned-off states of the semiconductor switch 601a; FIG. 23(c) illustrates turned-on and turned-off states of the semiconductor switches 401a and 402a; FIG. 23(d) illustrates turned-on and turned-off states of the semiconductor switch 901a; FIG. 23(e) illustrates turned-on and turned-off states of the semiconductor switches 701a and 702a; FIG. 23(f) illustrates charge and discharge states of the DC capacitor 403; and FIG. 23(g) illustrates charge and discharge states of the DC capacitor 703. In FIGS. 23(f) and 23 (g), ranges indicated by arrows are periods in which charge and discharge are not performed.

In addition, the DC voltage Vc3 of the smoothing capacitor 10 of the output stage is higher than the peak voltage Vp of the AC voltage Vac of the AC power supply 1, and FIG. 23 illustrates a state in which the DC voltage Vc3 of the smoothing capacitor 10 is controlled to be a given target voltage Vc3*. In the present embodiment, in a case where a polarity of the AC voltage Vac of the AC power supply 1 is positive, output control on the semiconductor switches 501a and 601a and the semiconductor switches 401a and 402a constituting the inverter circuit 400 is performed, so that the semiconductor switches 701a, 702a, 801a and 901a are turned off. In a case where a polarity of the AC voltage Vac of the AC power supply 1 is negative, output control on the semiconductor switches 801a and 901a and the semiconductor switches 701a and 702a constituting the inverter circuit 700 is performed, and the semiconductor switches 401a, 402a, 501a and 601a are turned off.

Figure 15:
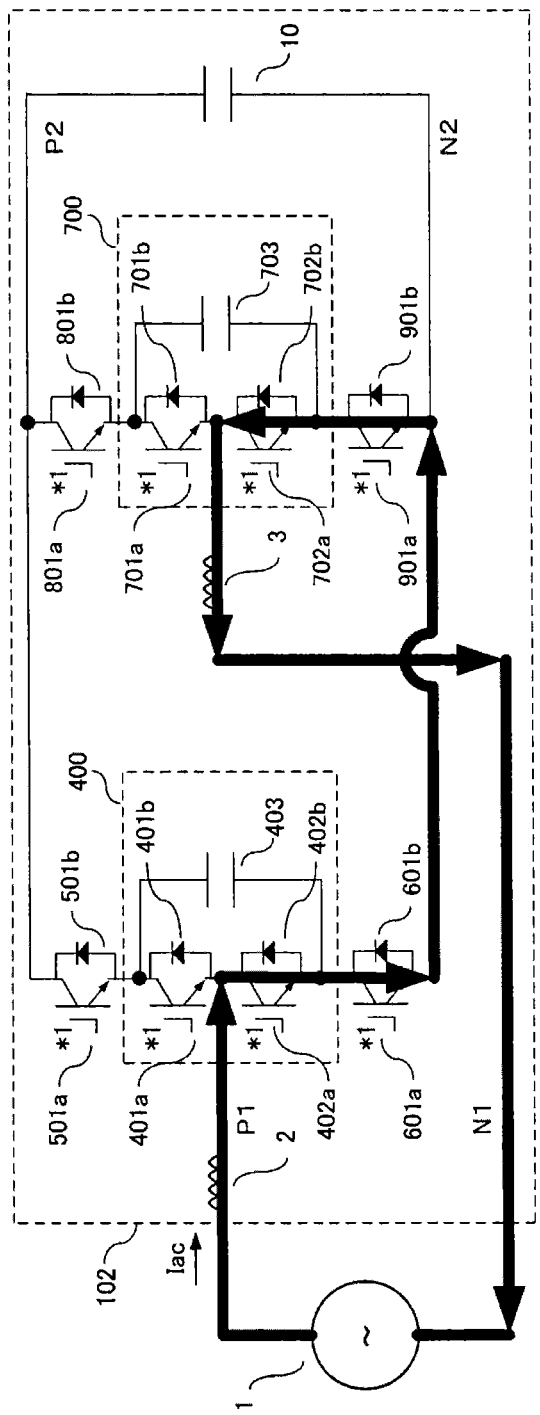
FIG. 15 is a current path diagram illustrating a powering operation of the power conversion device according to Embodiment 3 of the present invention.
Figure 16:
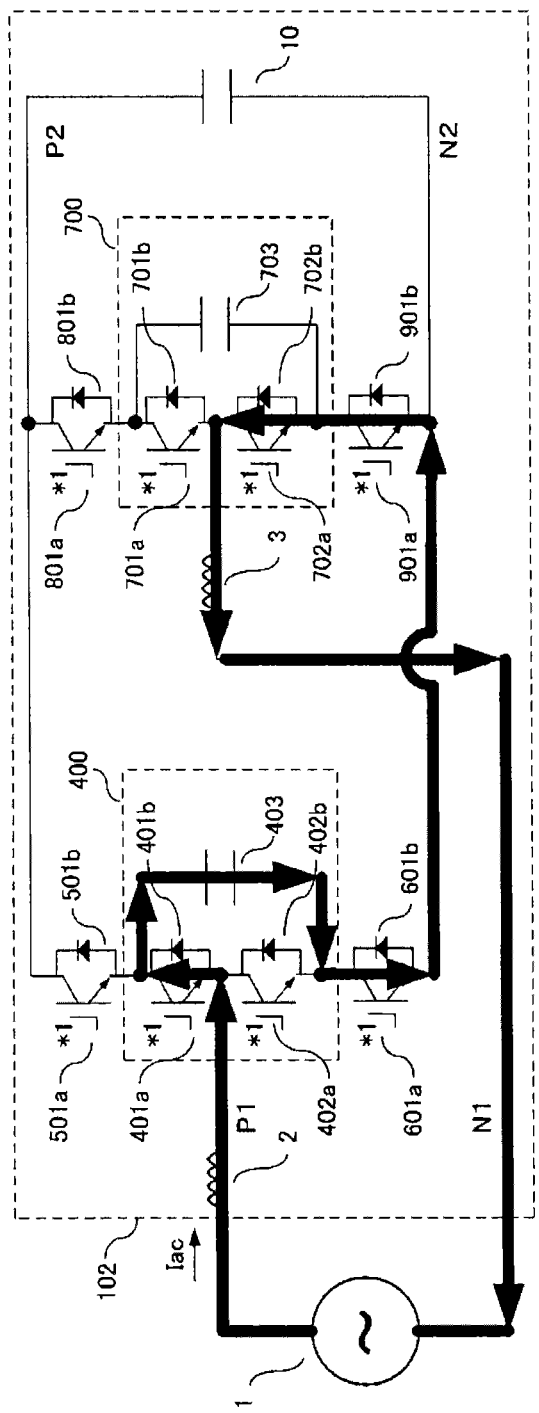
FIG. 16 is a current path diagram illustrating a powering operation of the power conversion device according to Embodiment 3 of the present invention.
Figure 17:
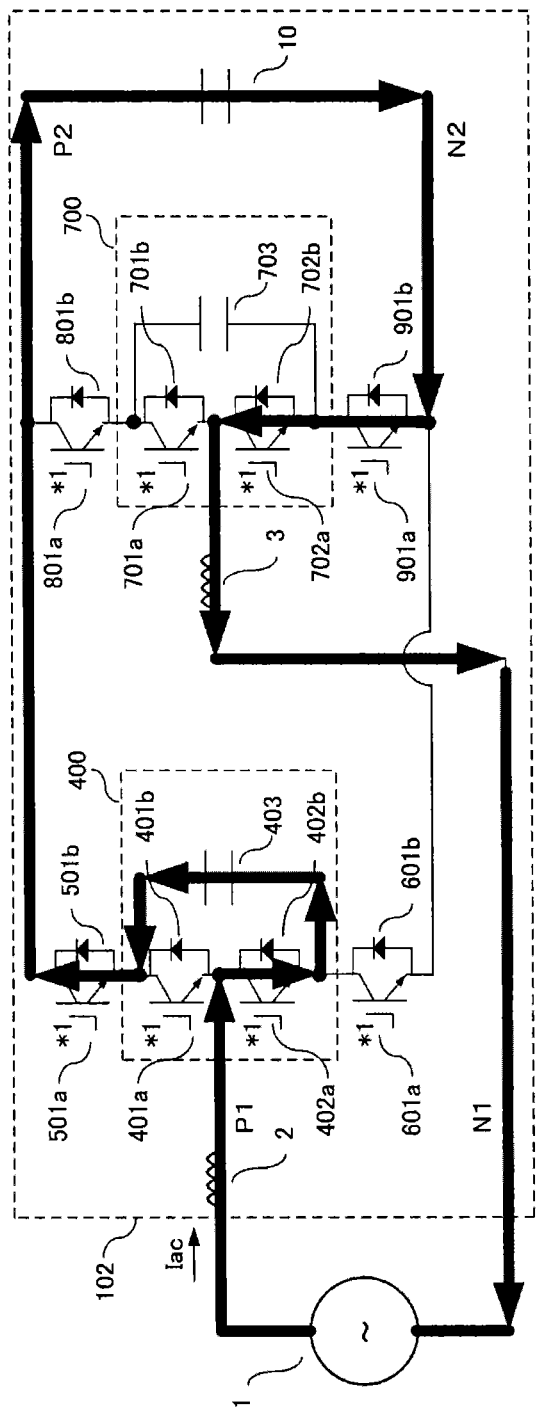
FIG. 17 is a current path diagram illustrating a powering operation of the power conversion device according to Embodiment 3 of the present invention.
Figure 18:
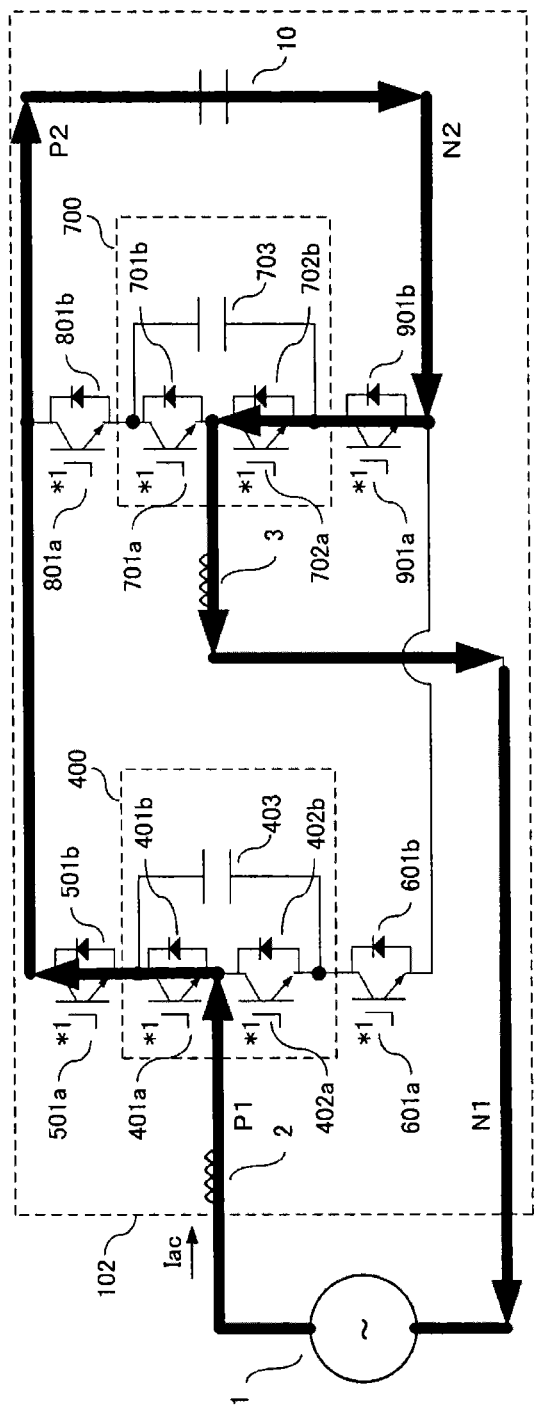
FIG. 18 is a current path diagram illustrating a powering operation of the power conversion device according to Embodiment 3 of the present invention.

First, a voltage phase of the AC power supply 1 is set to θ, and a description will be made of operations of the four semiconductor switches 401a, 402a, 501a and 601a and current paths in a case of 0≤θ<π in which a polarity of the AC voltage Vac of the AC power supply 1 is positive. As illustrated in FIG. 15, in a case where the semiconductor switches 402a and 601a are turned on, and the semiconductor switches 401a and 501a are turned off, the AC current Iac flows so as to bypass the DC capacitor 403. As illustrated in FIG. 16, in a case where the semiconductor switches 401a and 601a are turned on, and the semiconductor switches 402a and 501a are turned off, the AC current Iac flows so as to charge the DC capacitor 403. In addition, as illustrated in FIG. 17, in a case where the semiconductor switches 402a and 501a are turned on, and the semiconductor switches 401a and 601a are turned off, the AC current Iac flows so as to discharge the DC capacitor 403. As illustrated in FIG. 18, in a case where the semiconductor switches 401a and 501a are turned on, and the semiconductor switches 402a and 601a are turned off, the AC current Iac flows so as to bypass the DC capacitor 403.

Through combinations of operation modes of the four semiconductor switches, the inverter circuit 400 is PWM-controlled. Therefore, it is possible to perform high power factor control of the AC power supply 1 and charge and discharge control of the DC capacitor 403. In addition, a current which flows through the inverter circuit 700 side flows through the diode 901b and the diode 702b, but may be controlled to flow through the semiconductor switches 901a and 702a by appropriately turning-on and turning-off the semiconductor switches 901a and 702a.

Figure 19:
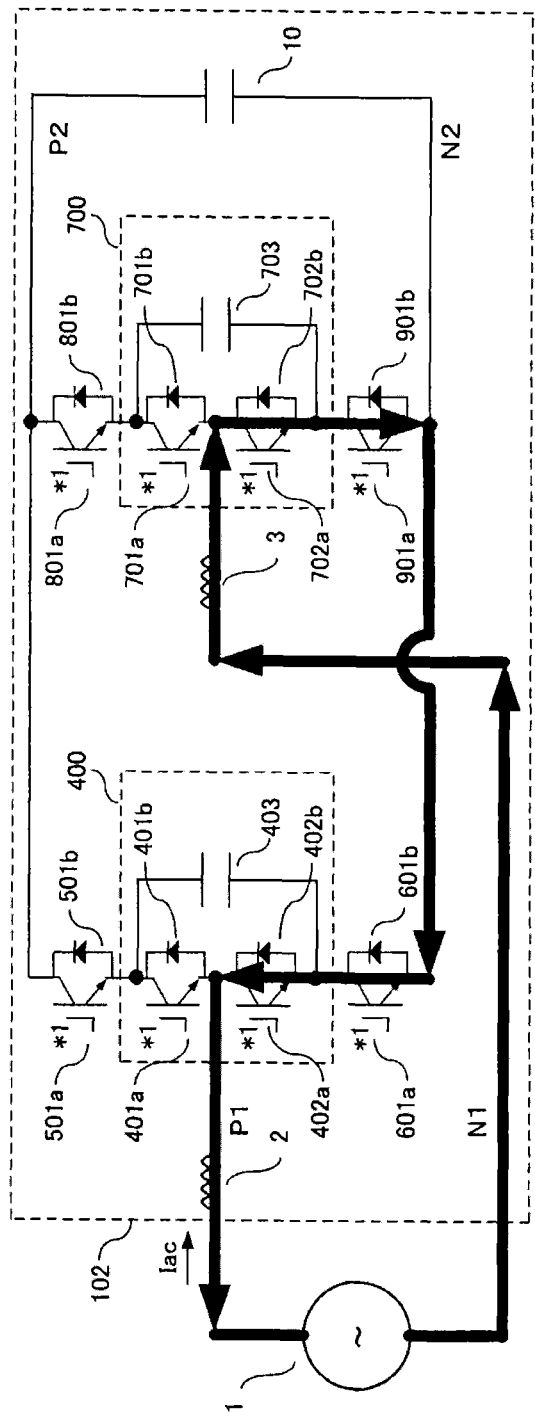
FIG. 19 is a current path diagram illustrating a powering operation of the power conversion device according to Embodiment 3 of the present invention.
Figure 20:
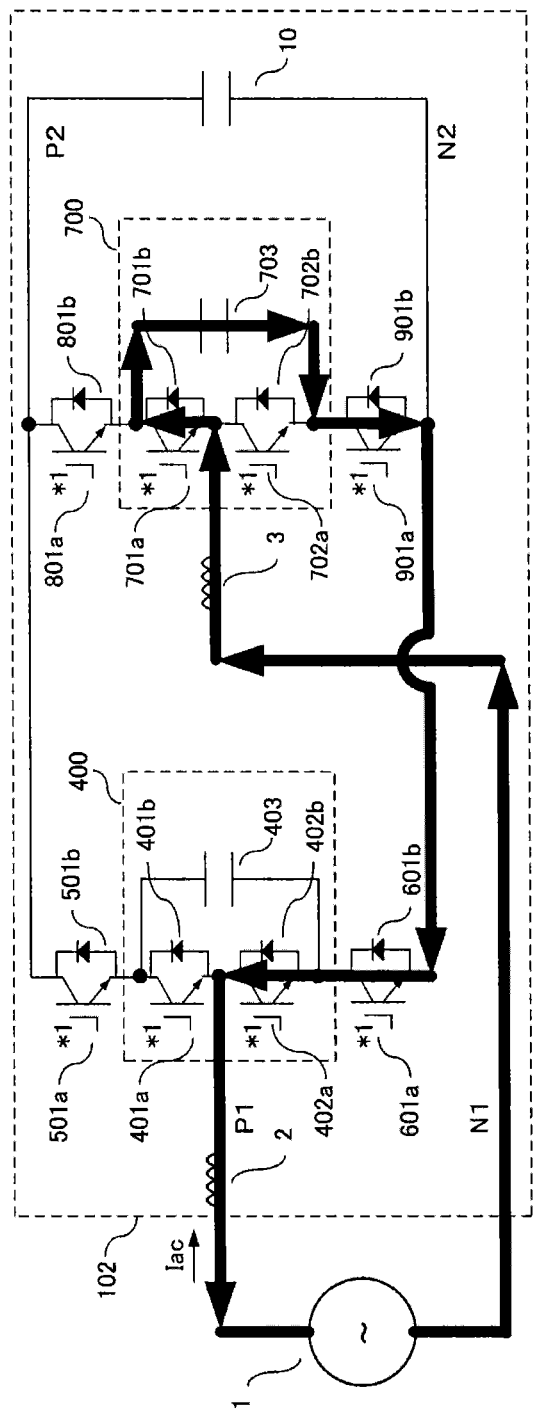
FIG. 20 is a current path diagram illustrating a powering operation of the power conversion device according to Embodiment 3 of the present invention.
Figure 21:
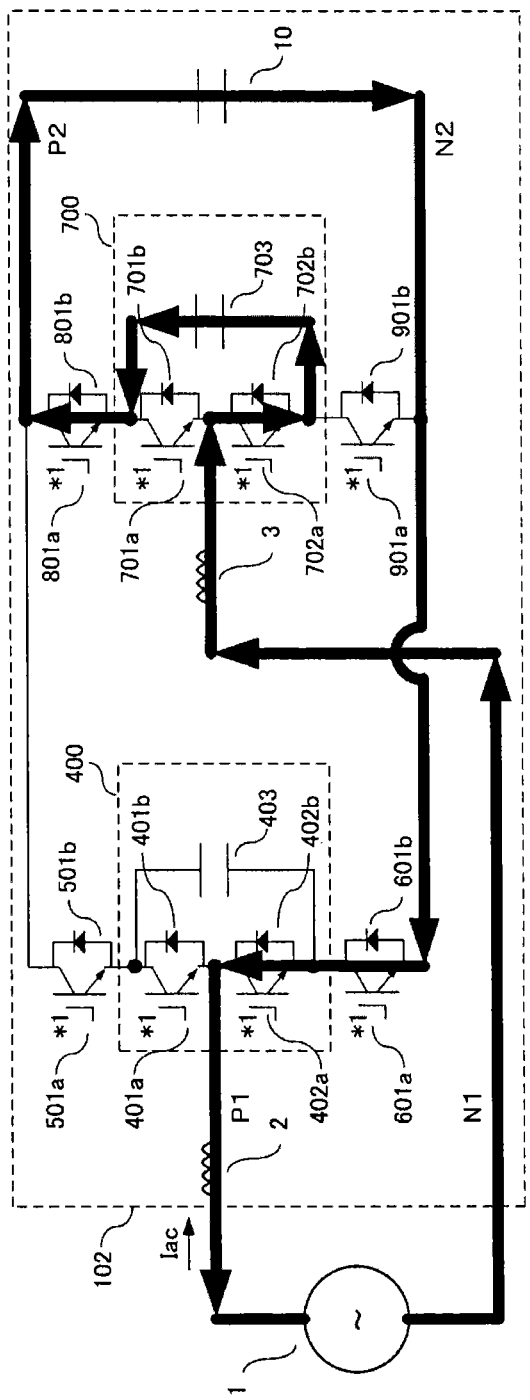
FIG. 21 is a current path diagram illustrating a powering operation of the power conversion device according to Embodiment 3 of the present invention.
Figure 22:
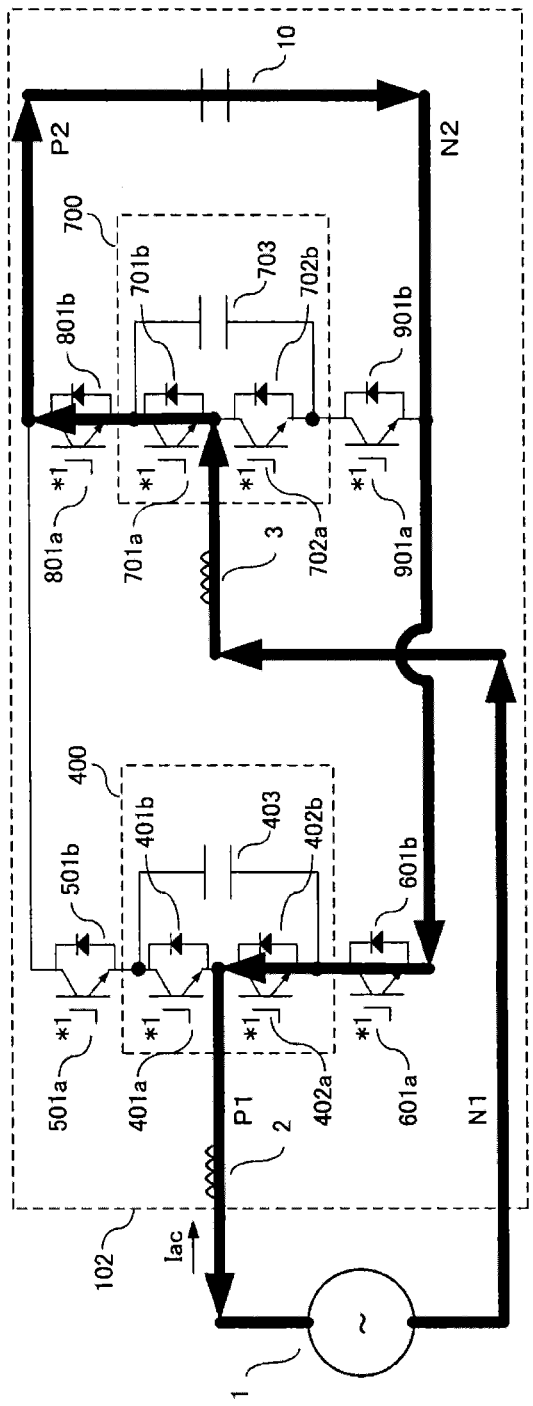
FIG. 22 is a current path diagram illustrating a powering operation of the power conversion device according to Embodiment 3 of the present invention.

Next, a voltage phase of the AC power supply 1 is set to θ, and a description will be made of operations of the four semiconductor switches 701a, 702a, 801a and 901a and current paths in a case of π≤θ<2π in which a polarity of the AC voltage Vac of the AC power supply 1 is negative. As illustrated in FIG. 19, in a case where the semiconductor switches 702a and 901a are turned on, and the semiconductor switches 701a and 801a are turned off, the AC current Iac flows so as to bypass the DC capacitor 703. As illustrated in FIG. 20, in a case where the semiconductor switches 701a and 901a are turned on, and the semiconductor switches 702a and 801a are turned off, the AC current Iac flows so as to charge the DC capacitor 703. In addition, as illustrated in FIG. 21, in a case where the semiconductor switches 702a and 801a are turned on, and the semiconductor switches 701a and 901a are turned off, the AC current Iac flows so as to discharge the DC capacitor 703. As illustrated in FIG. 22, in a case where the semiconductor switches 701a and 801a are turned on, and the semiconductor switches 702a and 901a are turned off, the AC current Iac flows so as to bypass the DC capacitor 703.

Through combinations of operation modes of the four semiconductor switches, the inverter circuit 700 is PWM-controlled. Therefore, it is possible to perform high power factor control of the AC power supply 1 and charge and discharge control of the DC capacitor 703. In addition, a current which flows through the inverter circuit 400 side flows through the diode 601b and the diode 402b, but may be controlled to flow through the semiconductor switches 601a and 402a by appropriately turning-on and turning-off the semiconductor switches 601a and 402a.

As illustrated in FIG. 23, in a case where a polarity of the AC voltage Vac of the AC power supply 1 is positive, the smoothing capacitor 10 is bypassed in a state in which the semiconductor switch 601a is turned on and the semiconductor switch 501a (not illustrated) is turned off in the phase range ±θ1 centering on the zero-cross phase of the AC voltage Vac of the AC power supply 1, that is, the phase range 0 to θ1 and the phase range (π−θ1) to π. In addition, PWM control for alternately turning on and turning off the semiconductor switches 401a and 402a of the inverter circuit 400 is performed (the operation mode of FIG. 15 and the operation mode of FIG. 16 are alternately performed).

By performing this control, the current from the AC power supply 1 is limited by the positive side reactor 2 and the negative side reactor 3 so as to be input to the inverter circuit 400, and then returns to the AC power supply 1 from the inverter circuit 400 through the diode 901b and the diode 702b (or the semiconductor switches 901a and 702a). At this time, the positive side reactor 2 and the negative side reactor 3 are excited in the operation mode of FIG. 15, and the excitation of the positive side reactor 2 and the negative side reactor 3 is reset in the operation mode of FIG. 16. In addition, the DC capacitor 403 is bypassed in the operation mode of FIG. 15, and the DC capacitor 403 is charged in the operation mode of FIG. 16. Therefore, the inverter circuit 400 is PWM-controlled through a combination of the operation mode of FIG. 15 and the operation mode of FIG. 16. Thus, the DC capacitor 403 can be charged and the high power factor control of the AC power supply 1 can be performed.

Next, as illustrated in FIG. 23, in a case where a polarity of the AC voltage Vac of the AC power supply 1 is positive, DC power is output to the smoothing capacitor 10 in a state in which the semiconductor switch 601a is turned off and the semiconductor switch 501a (not illustrated) is turned on in the phase range θ1 to (π−θ1). In addition, PWM control for alternately turning on and turning off the semiconductor switches 401a and 402a of the inverter circuit 400 is performed (the operation mode of FIG. 17 and the operation mode of FIG. 18 are alternately performed).

By performing this control, the current from the AC power supply 1 is limited by the positive side reactor 2 and the negative side reactor 3 so as to be input to the inverter circuit 400, then charges the smoothing capacitor 10 from the inverter circuit 400 through the semiconductor switch 501a, and then returns to the AC power supply 1 through the diode 901b and the diode 702b (or the semiconductor switches 901a and 702a). At this time, the inverter circuit 400 outputs a voltage (Vc4*−Vac) and repeatedly performs the operation mode of FIG. 17 and the operation mode of FIG. 18 so as to add an output voltage of the inverter circuit 400 to the AC voltage Vac of the AC power supply 1, and controls the voltage Vc3 of the smoothing capacitor 10 so that the target voltage Vc3* higher than the peak voltage of the AC power supply 1 is obtained.

In the inverter circuit 400, the positive side reactor 2 and the negative side reactor 3 are excited in the operation mode of FIG. 17, and the excitation of the positive side reactor 2 and the negative side reactor 3 is reset in the operation mode of FIG. 18. In addition, the DC capacitor 403 is discharged in the operation mode of FIG. 17, and the DC capacitor 403 is bypassed in the operation mode of FIG. 18. Therefore, the inverter circuit 400 is PWM-controlled through a combination of the operation mode of FIG. 17 and the operation mode of FIG. 18. Thus, the DC capacitor 403 can be discharged and the high power factor control of the AC power supply 1 can be performed.

Next, as illustrated in FIG. 23, in a case where a polarity of the AC voltage Vac of the AC power supply 1 is negative, the smoothing capacitor 10 is bypassed in a state in which the semiconductor switch 901a is turned on and the semiconductor switch 801a (not illustrated) is turned off in the phase range ±θ2 centering on the zero-cross phase of the AC voltage Vac of the AC power supply 1, that is, the phase range π to (π+θ2) and the phase range (2π−θ2) to 2π. In addition, PWM control for alternately turning on and turning off the semiconductor switches 701a and 702a of the inverter circuit 700 is performed (the operation mode of FIG. 19 and the operation mode of FIG. 20 are alternately performed).

By performing this control, the current from the AC power supply 1 is limited by the positive side reactor 2 and the negative side reactor 3 so as to be input to the inverter circuit 700, and then returns to the AC power supply 1 from the inverter circuit 700 through the diode 601b and the diode 402b (or the semiconductor switches 601a and 402a). At this time, the positive side reactor 2 and the negative side reactor 3 are excited in the operation mode of FIG. 19, and the excitation of the positive side reactor 2 and the negative side reactor 3 is reset in the operation mode of FIG. 20. In addition, the DC capacitor 703 is bypassed in the operation mode of FIG. 19, and the DC capacitor 703 is charged in the operation mode of FIG. 20. Therefore, the inverter circuit 700 is PWM-controlled through a combination of the operation mode of FIG. 19 and the operation mode of FIG. 20. Thus, the DC capacitor 703 can be charged and the high power factor control of the AC power supply 1 can be performed.

Next, as illustrated in FIG. 23, in a case where a polarity of the AC voltage Vac of the AC power supply 1 is negative, DC power is output to the smoothing capacitor 10 in a state in which the semiconductor switch 901a is turned off and the semiconductor switch 801a (not illustrated) is turned on in the phase range (π+θ2) to (2π−θ2). In addition, PWM control for alternately turning on and turning off the semiconductor switches 701a and 702a of the inverter circuit 700 is performed (the operation mode of FIG. 21 and the operation mode of FIG. 22 are alternately performed).

By performing this control, the current from the AC power supply 1 is limited by the positive side reactor 2 and the negative side reactor 3 so as to be input to the inverter circuit 700, then charges the smoothing capacitor 10 from the inverter circuit 700 through the semiconductor switch 801a, and then returns to the AC power supply 1 through the diode 601b and the diode 402b (or the semiconductor switches 601a and 402a). At this time, the inverter circuit 700 outputs a voltage (Vc5*−Vac) and repeatedly performs the operation mode of FIG. 21 and the operation mode of FIG. 22 so as to add an output voltage of the inverter circuit 700 to the AC voltage Vac of the AC power supply 1, and controls the voltage Vc3 of the smoothing capacitor 10 so that the target voltage Vc3* higher than the peak voltage of the AC power supply 1 is obtained.

In the inverter circuit 700, the positive side reactor 2 and the negative side reactor 3 are excited in the operation mode of FIG. 21, and the excitation of the positive side reactor 2 and the negative side reactor 3 is reset in the operation mode of FIG. 22. In addition, the DC capacitor 703 is discharged in the operation mode of FIG. 21, and the DC capacitor 703 is bypassed in the operation mode of FIG. 22. Therefore, the inverter circuit 700 is PWM-controlled through a combination of the operation mode of FIG. 21 and the operation mode of FIG. 22. Thus, the DC capacitor 703 can be discharged and the high power factor control of the AC power supply 1 can be performed.

Next, with reference to the drawings, a description will be made of a regenerative operation of the power conversion device, that is, an operation of outputting AC power to the AC power supply 1. FIGS. 24 to 31 are current path diagrams illustrating a powering operation of the power conversion device. FIGS. 24 to 27 are current path diagrams in a case where a polarity of the AC voltage Vac is positive, and FIGS. 28 to 31 are current path diagrams in a case where a polarity of the AC voltage Vac is negative. In FIGS. 24 to 31, a circuit configuration is the same as that of FIG. 14, and a path along which a current flow is indicated by bold lines.

Figure 32:
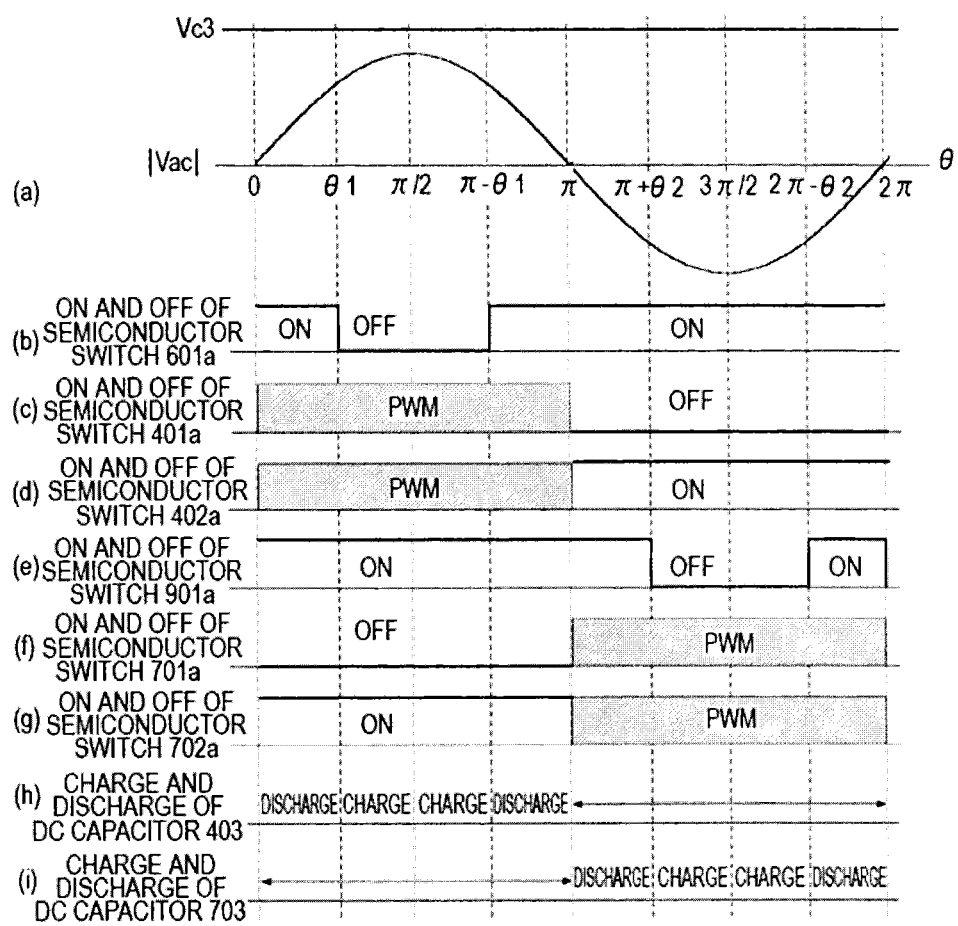
FIG. 32 illustrates waveforms of respective parts and charge and discharge of a DC capacitor of an inverter circuit, for explaining a regenerative operation of the power conversion device according to Embodiment 3 of the present invention.

In addition, FIG. 32 illustrates waveforms of the respective parts and charge and discharge of the DC capacitors 403 and 703 of the inverter circuits 400 and 700, for explaining a regenerative operation of the power conversion device. In FIG. 32, FIG. 32(a) illustrates a voltage waveform of the AC voltage Vac; FIG. 32(b) illustrates turned-on and turned-off states of the semiconductor switch 601a; FIG. 32(c) illustrates turned-on and turned-off states of the semiconductor switch 401a; FIG. 32(d) illustrates turned-on and turned-off states of the semiconductor switch 402a; FIG. 32(e) illustrates turned-on and turned-off states of the semiconductor switch 901a; FIG. 32(f) illustrates turned-on and turned-off states of the semiconductor switch 701a; FIG. 32(g) illustrates turned-on and turned-off states of the semiconductor switch 702a; FIG. 32(h) illustrates charge and discharge states of the DC capacitor 403; and FIG. 32(i) illustrates charge and discharge states of the DC capacitor 703. In FIGS. 32(h) and 32(i), ranges indicated by arrows are periods in which charge and discharge are not performed.

In addition, the DC voltage Vc3 of the smoothing capacitor 10 of the output stage is higher than the peak voltage Vp of the AC voltage Vac of the AC power supply 1, and FIG. 32 illustrates a state in which the DC voltage Vc3 of the smoothing capacitor 10 is controlled to be a given target voltage Vc3*. In the present embodiment, in a case where a polarity of the AC voltage Vac of the AC power supply 1 is positive, output control on the semiconductor switches 501a and 601a and the semiconductor switches 401a and 402a constituting the inverter circuit 400 is performed, so that the semiconductor switch 901a, and the semiconductor switch 702a constituting the inverter circuit 700 are turned on, and the semiconductor switch 801a, and the semiconductor switch 701a constituting the inverter circuit 700 are turned off.

In a case where a polarity of the AC voltage Vac of the AC power supply 1 is negative, output control on the semiconductor switches 801a and 901a and the semiconductor switches 701a and 702a constituting the inverter circuit 700 is performed, so that the semiconductor switch 601a, and the semiconductor switch 402a constituting the inverter circuit 400 are turned on, and the semiconductor switch 501a, and the semiconductor switch 401a constituting the inverter circuit 400 are turned off.

Figure 24:
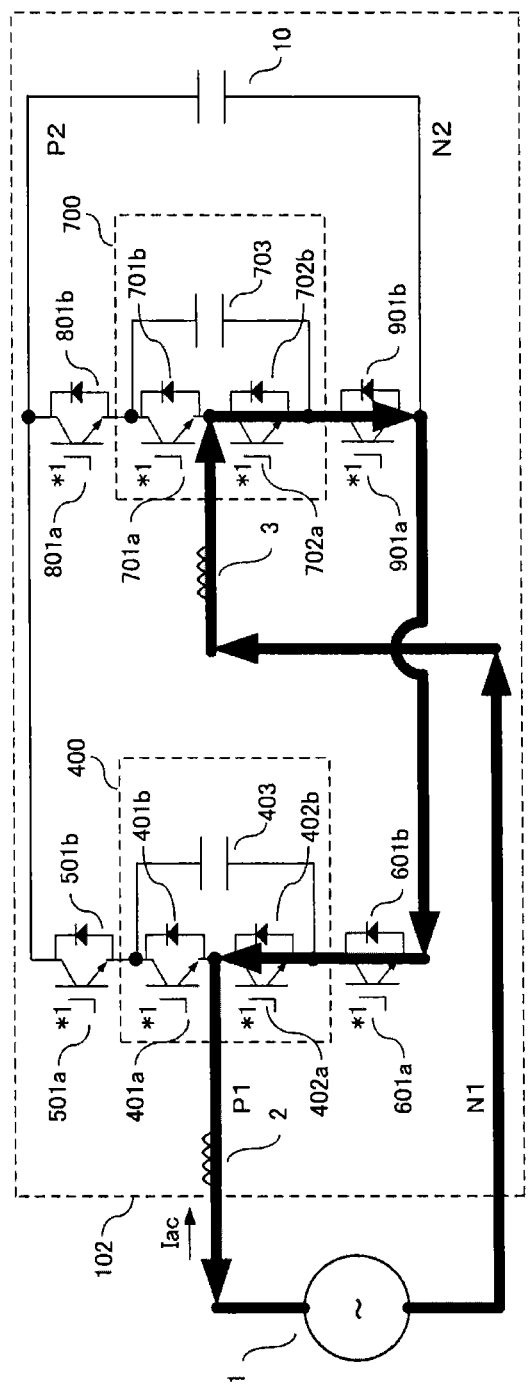
FIG. 24 is a current path diagram illustrating a regenerative operation of the power conversion device according to Embodiment 3 of the present invention.
Figure 25:
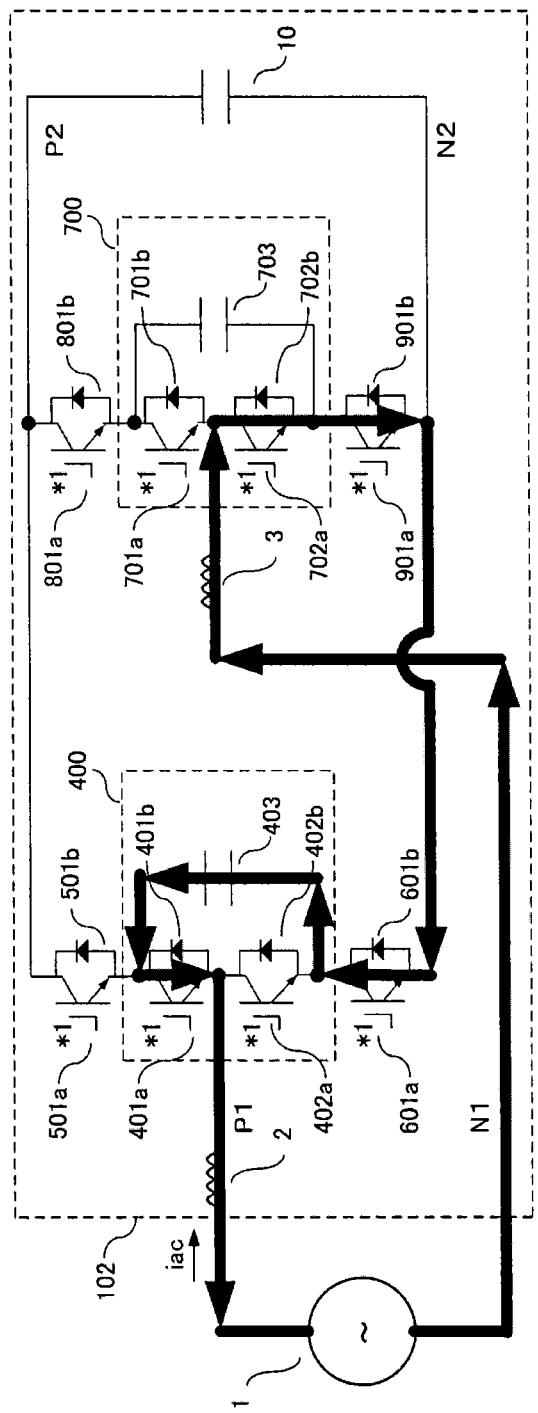
FIG. 25 is a current path diagram illustrating a regenerative operation of the power conversion device according to Embodiment 3 of the present invention.
Figure 26:
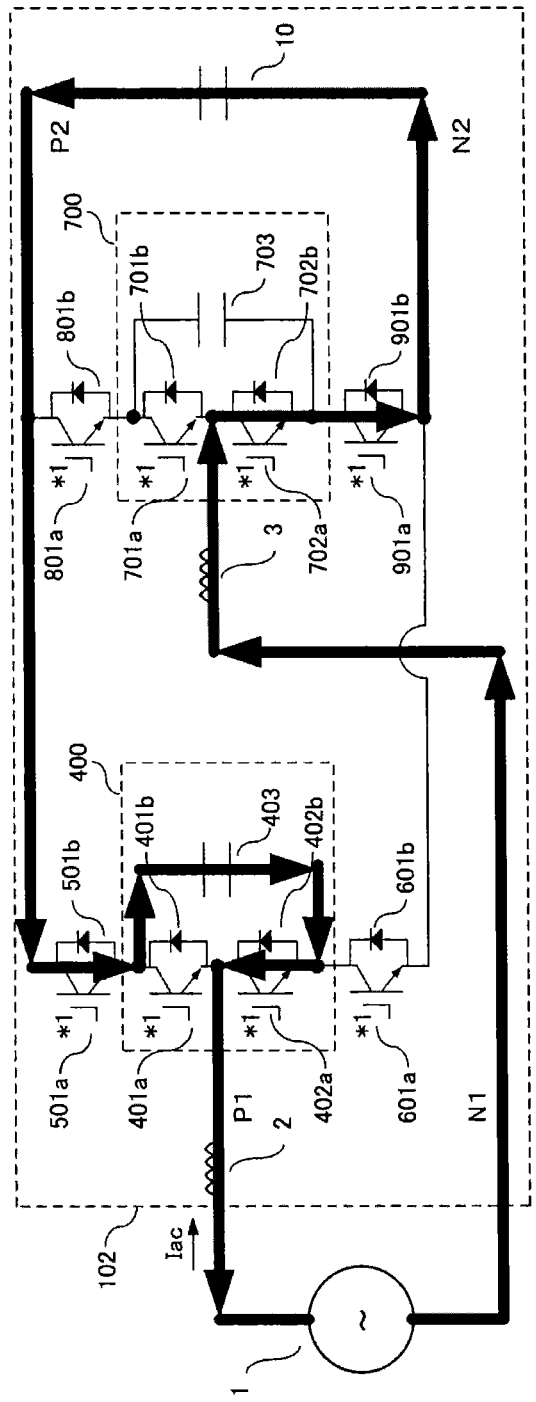
FIG. 26 is a current path diagram illustrating a regenerative operation of the power conversion device according to Embodiment 3 of the present invention.
Figure 27:
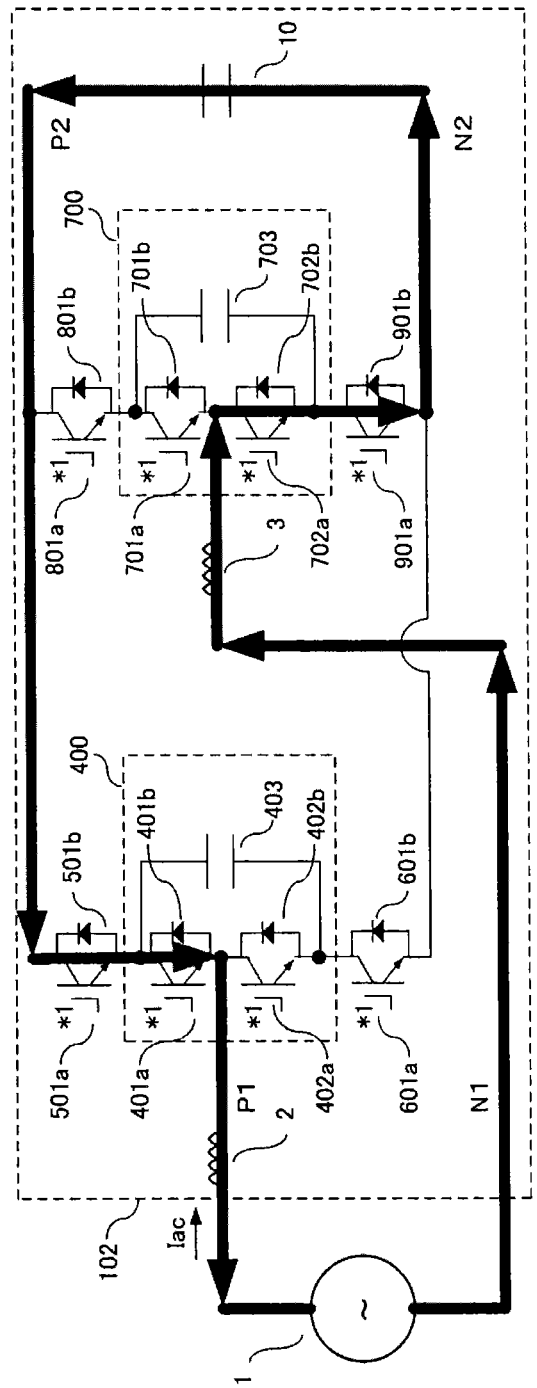
FIG. 27 is a current path diagram illustrating a regenerative operation of the power conversion device according to Embodiment 3 of the present invention.

First, a voltage phase of the AC power supply 1 is set to θ, and a description will be made of operations of the four semiconductor switches 401a, 402a, 501a and 601a and current paths in a case of $0 \leq \theta < \pi$ in which a polarity of the AC voltage Vac of the AC power supply 1 is positive. As illustrated in FIG. 24, in a case where the semiconductor switches 402a and 601a are turned on, and the semiconductor switches 401a and 501a are turned off, the AC current Iac flows so as to bypass the DC capacitor 403. As illustrated in FIG. 25, in a case where the semiconductor switches 401a and 601a are turned on, and the semiconductor switches 402a and 501a are turned off, the AC current Iac flows so as to discharge the DC capacitor 403. In addition, as illustrated in FIG. 26, in a case where the semiconductor switches 402a and 501a are turned on, and the semiconductor switches 401a and 601a are turned off, the AC current Iac flows so as to charge the DC capacitor 403. As illustrated in FIG. 27, in a case where the semiconductor switches 401a and 501a are turned on, and the semiconductor switches 402a and 601a are turned off, the AC current Iac flows so as to bypass the DC capacitor 403. In the four operation modes, the semiconductor switches 702a and 901a are normally turned on. Through combinations of operation modes of the four semiconductor switches, the inverter circuit 400 is PWM-controlled. Therefore, it is possible to perform high power factor control of the AC power supply 1 and charge and discharge control of the DC capacitor 403.

Figure 28:
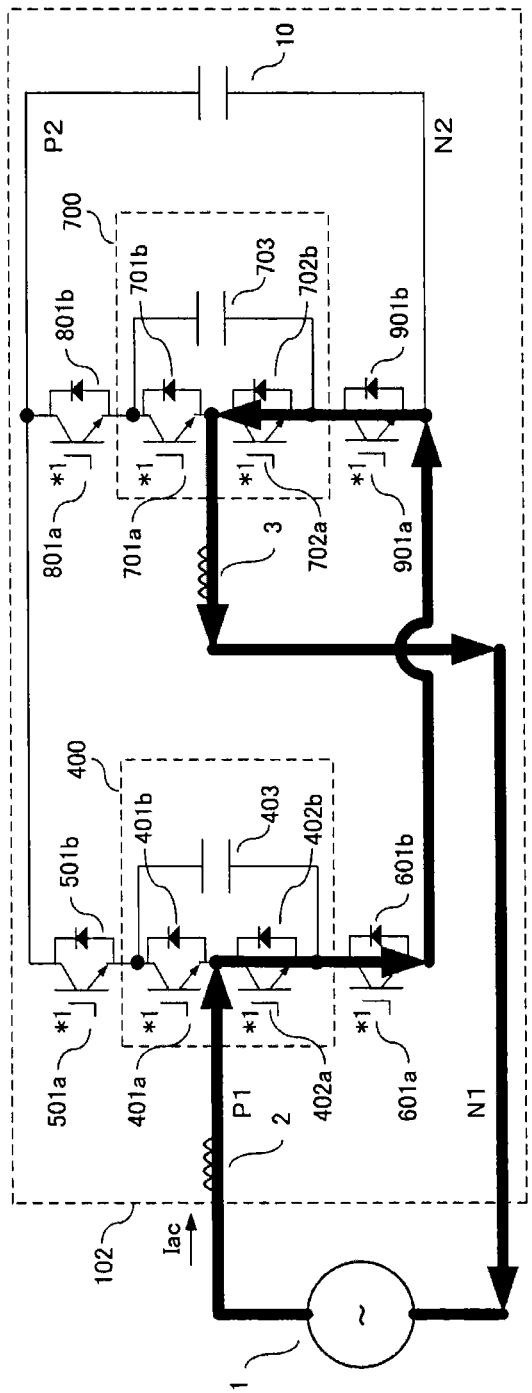
FIG. 28 is a current path diagram illustrating a regenerative operation of the power conversion device according to Embodiment 3 of the present invention.
Figure 29:
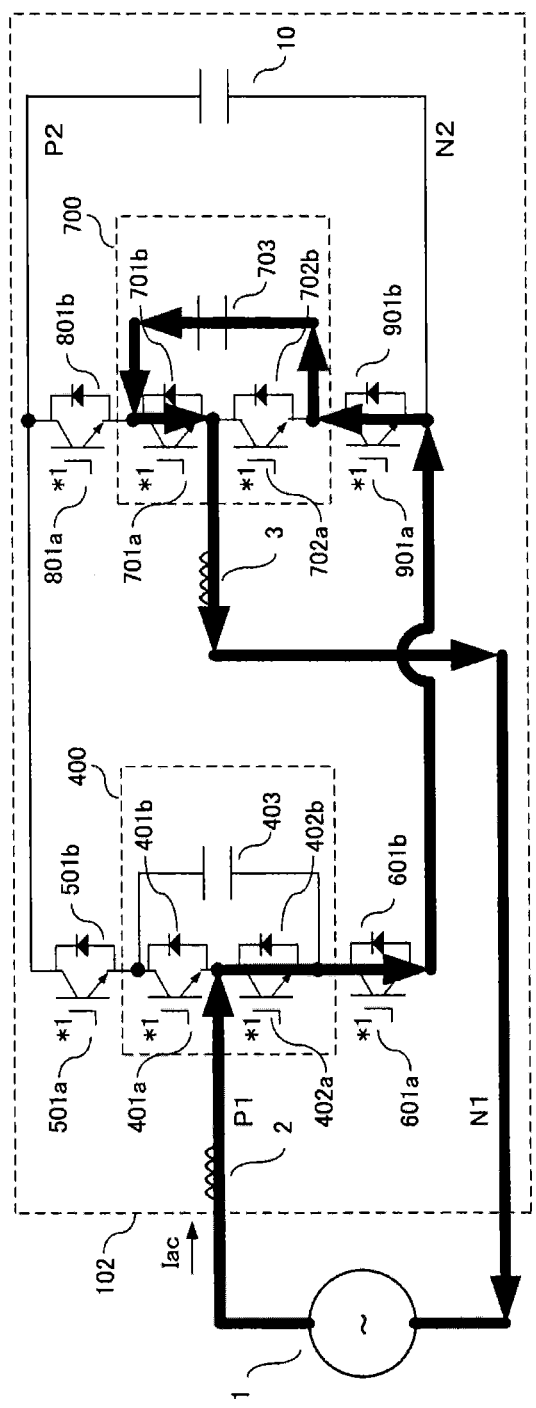
FIG. 29 is a current path diagram illustrating a regenerative operation of the power conversion device according to Embodiment 3 of the present invention.
Figure 30:
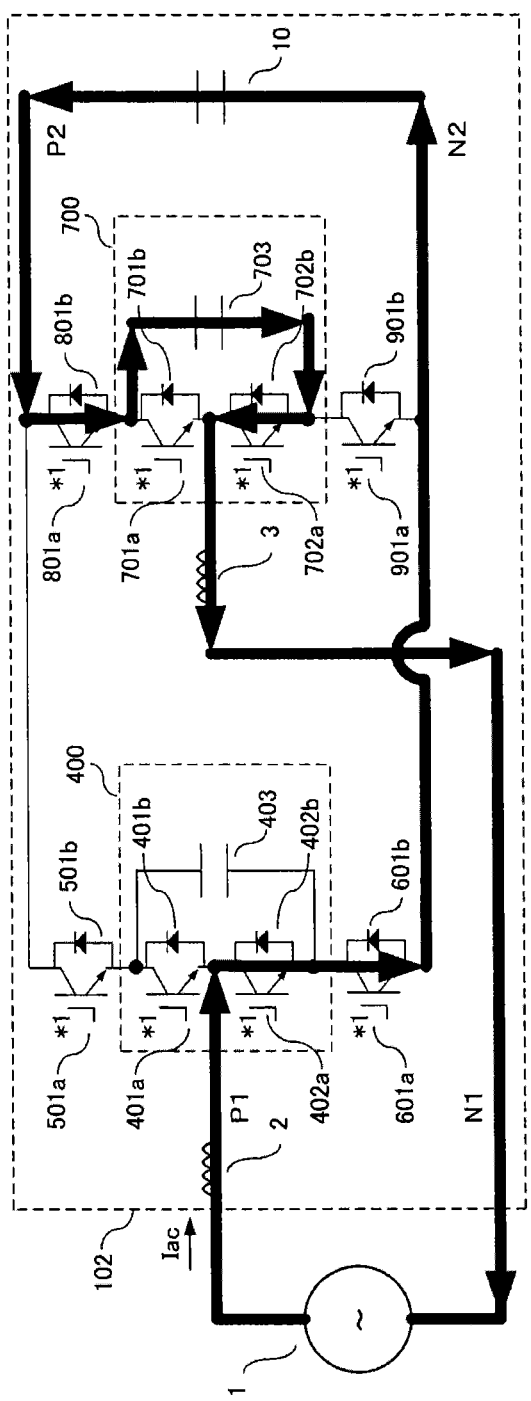
FIG. 30 is a current path diagram illustrating a regenerative operation of the power conversion device according to Embodiment 3 of the present invention.
Figure 31:
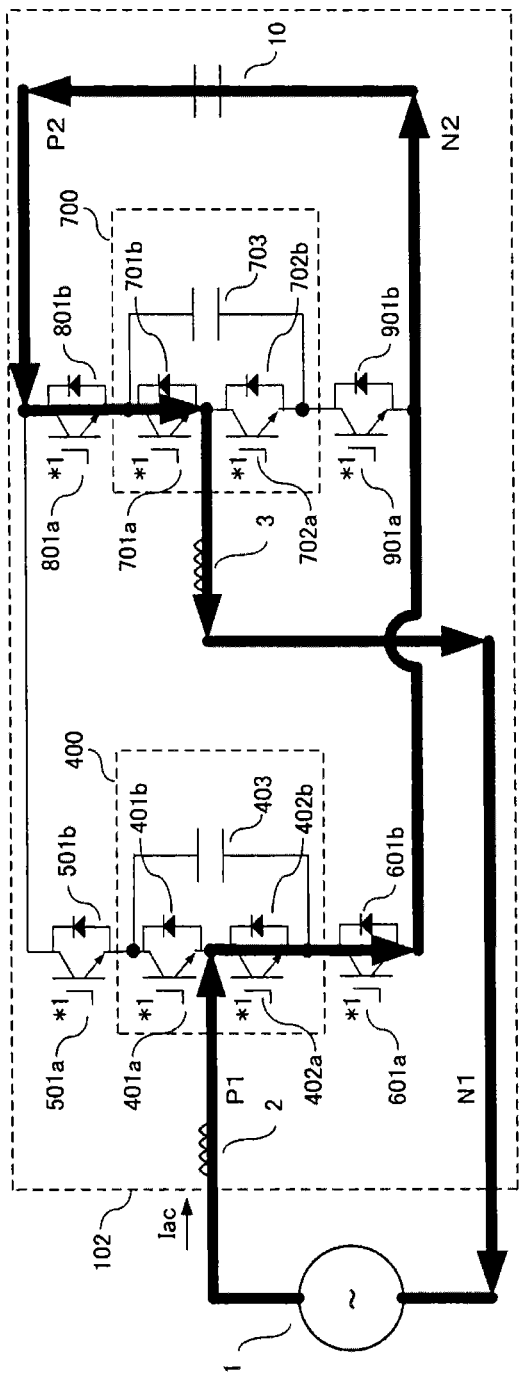
FIG. 31 is a current path diagram illustrating a regenerative operation of the power conversion device according to Embodiment 3 of the present invention.

Next, a voltage phase of the AC power supply 1 is set to θ, and a description will be made of operations of the four semiconductor switches 701a, 702a, 801a and 901a and current paths in a case of $\pi \leq \theta < 2\pi$ in which a polarity of the AC voltage Vac of the AC power supply 1 is negative. As illustrated in FIG. 28, in a case where the semiconductor switches 702a and 901a are turned on, and the semiconductor switches 701a and 801a are turned off, the AC current Iac flows so as to bypass the DC capacitor 703. As illustrated in FIG. 29, in a case where the semiconductor switches 701a and 901a are turned on, and the semiconductor switches 702a and 801a are turned off, the AC current Iac flows so as to discharge the DC capacitor 703. In addition, as illustrated in FIG. 30, in a case where the semiconductor switches 702a and 801a are turned on, and the semiconductor switches 701a and 901a are turned off, the AC current Iac flows so as to charge the DC capacitor 703. As illustrated in FIG. 31, in a case where the semiconductor switches 701a and 801a are turned on, and the semiconductor switches 702a and 901a are turned off, the AC current Iac flows so as to bypass the DC capacitor 703. In the four operation modes, the semiconductor switches 402a and 601a are normally turned on. Through combinations of operation modes of the four semiconductor switches, the inverter circuit 700 is PWM-controlled. Therefore, it is possible to perform high power factor control of the AC power supply 1 and charge and discharge control of the DC capacitor 703.

As illustrated in FIG. 32, in a case where a polarity of the AC voltage Vac of the AC power supply 1 is positive, the smoothing capacitor 10 is bypassed in a state in which the semiconductor switch 601a is turned on and the semiconductor switch 501a (not illustrated) is turned off in the phase range ±θ1 centering on the zero-cross phase of the AC voltage Vac of the AC power supply 1, that is, the phase range 0 to θ1 and the phase range (π−θ1) to π. In addition, PWM control for alternately turning on and turning off the semiconductor switches 401a and 402a of the inverter circuit 400 is performed (the operation mode of FIG. 24 and the operation mode of FIG. 25 are alternately performed).

By performing this control, the current from the AC power supply 1 is limited by the positive side reactor 2 and the negative side reactor 3, and is input to the inverter circuit 400 through the semiconductor switches 702a and 901a via the semiconductor switch 601a. At this time, the positive side reactor 2 and the negative side reactor 3 are excited in the operation mode of FIG. 24, and the excitation of the positive side reactor 2 and the negative side reactor 3 is reset in the operation mode of FIG. 25. In addition, the DC capacitor 403 is bypassed in the operation mode of FIG. 24, and the DC capacitor 403 is discharged in the operation mode of FIG. 25. Therefore, the inverter circuit 400 is PWM-controlled through a combination of the operation mode of FIG. 24 and the operation mode of FIG. 25. Thus, the DC capacitor 403 can be discharged and the high power factor control of the AC power supply 1 can be performed.

Next, as illustrated in FIG. 32, in a case where a polarity of the AC voltage Vac of the AC power supply 1 is positive, DC power is input to the smoothing capacitor 10 in a state in which the semiconductor switch 601a is turned off and the semiconductor switch 501a (not illustrated) is turned on in the phase range θ1 to (π−θ1). In addition, PWM control for alternately turning on and turning off the semiconductor switches 401a and 402a of the inverter circuit 400 is performed (the operation mode of FIG. 26 and the operation mode of FIG. 27 are alternately performed).

By performing this control, the current from the smoothing capacitor 10 is limited by the positive side reactor 2 and the negative side reactor 3, and is input to the inverter circuit 400 via the semiconductor switch 501a so as to be regenerated in the AC power supply 1. The current from the AC power supply 1 flows toward the smoothing capacitor 10 via the semiconductor switches 702a and 901a. At this time, the inverter circuit 400 outputs a voltage (Vc4*−Vac) and repeatedly performs the operation mode of FIG. 26 and the operation mode of FIG. 27 so as to add an output voltage of the inverter circuit 400 to the AC power supply 1, and controls the voltage Vc3 of the smoothing capacitor 10 so that the target voltage Vc3* higher than the peak voltage of the AC power supply 1 is obtained.

In the inverter circuit 400, the positive side reactor 2 and the negative side reactor 3 are excited in the operation mode of FIG. 26, and the excitation of the positive side reactor 2 and the negative side reactor 3 is reset in the operation mode of FIG. 27. In addition, the DC capacitor 403 is charged in the operation mode of FIG. 26, and the DC capacitor 403 is bypassed in the operation mode of FIG. 27. Therefore, the inverter circuit 400 is PWM-controlled through a combination of the operation mode of FIG. 26 and the operation mode of FIG. 27. Thus, the DC capacitor 403 can be charged and the high power factor control of the AC power supply 1 can be performed.

Next, as illustrated in FIG. 32, in a case where a polarity of the AC voltage Vac of the AC power supply 1 is negative, the smoothing capacitor 10 is bypassed in a state in which the semiconductor switch 901a is turned on and the semiconductor switch 801a (not illustrated) is turned off in the phase range ±θ2 centering on the zero-cross phase of the AC voltage Vac of the AC power supply 1, that is, the phase range π to (π+θ2) and the phase range (2π−θ2) to 2π. In addition, PWM control for alternately turning on and turning off the semiconductor switches 701a and 702a of the inverter circuit 700 is performed (the operation mode of FIG. 28 and the operation mode of FIG. 29 are alternately performed).

By performing this control, the current from the smoothing capacitor 10 is limited by the positive side reactor 2 and the negative side reactor 3, and is input to the inverter circuit 700 so as to return to the AC power supply 1. At this time, the positive side reactor 2 and the negative side reactor 3 are excited in the operation mode of FIG. 28, and the excitation of the positive side reactor 2 and the negative side reactor 3 is reset in the operation mode of FIG. 29. In addition, the DC capacitor 703 is bypassed in the operation mode of FIG. 28, and the DC capacitor 703 is discharged in the operation mode of FIG. 29. Therefore, the inverter circuit 700 is PWM-controlled through a combination of the operation mode of FIG. 28 and the operation mode of FIG. 29. Thus, the DC capacitor 703 can be discharged and the high power factor control of the AC power supply 1 can be performed.

Next, as illustrated in FIG. 32, in a case where a polarity of the AC voltage Vac of the AC power supply 1 is negative, DC power is output to the smoothing capacitor 10 in a state in which the semiconductor switch 901a is turned off and the semiconductor switch 801a (not illustrated) is turned on in the phase range (π+θ2) to (2π−θ2). In addition, PWM control for alternately turning on and turning off the semiconductor switches 701a and 702a of the inverter circuit 700 is performed (the operation mode of FIG. 30 and the operation mode of FIG. 31 are alternately performed).

By performing this control, the current from the smoothing capacitor 10 is limited by the positive side reactor 2 and the negative side reactor 3 so as to be input to the inverter circuit 700, and then returns to the AC power supply 1 from the inverter circuit 700. At this time, the inverter circuit 700 outputs a voltage (Vc5*−Vac) and repeatedly performs the operation mode of FIG. 30 and the operation mode of FIG. 31 so as to add an output voltage of the inverter circuit 700 to the AC voltage Vac of the AC power supply 1, and controls the voltage Vc3 of the smoothing capacitor 10 so that the target voltage Vc3* higher than the peak voltage of the AC power supply 1 is obtained.

In the inverter circuit 700, the positive side reactor 2 and the negative side reactor 3 are excited in the operation mode of FIG. 30, and the excitation of the positive side reactor 2 and the negative side reactor 3 is reset in the operation mode of FIG. 31. In addition, the DC capacitor 703 is charged in the operation mode of FIG. 30, and the DC capacitor 703 is bypassed in the operation mode of FIG. 31. Therefore, the inverter circuit 700 is PWM-controlled through a combination of the operation mode of FIG. 30 and the operation mode of FIG. 31. Thus, the DC capacitor 703 can be charged and the high power factor control of the AC power supply 1 can be performed.

Regardless of the powering operation or the regenerative operation of the power conversion device, an On period of the semiconductor switch 601a is adjusted in a case where a polarity of the AC voltage Vac of the AC power supply 1 is positive, and thus the DC voltage Vc4 of the DC capacitor 403 of the inverter circuit 400 can be maintained to be a constant voltage. In addition, an On period of the semiconductor switch 901a is adjusted in a case where a polarity of the AC voltage Vac of the AC power supply 1 is negative, and thus the DC voltage Vc5 of the DC capacitor 703 of the inverter circuit 700 can be maintained to be a constant voltage.

In the driving method, a relationship between the AC voltage Vac of the AC power supply 1 and the DC voltage Vc3 of the smoothing capacitor 10 is expressed as in Equation (1) in the same manner as in Embodiment 1. However, the target voltage Vc2* of Equation (1) is required to be replaced with the target voltage Vc3*. In addition, in relation to an establishment condition of current control, in the same manner as in Expressions (3) and (4), Expressions (5) and (6) are required to be satisfied in a case where current control is performed by the inverter circuit 400, and Expressions (7) and (8) are required to be satisfied in a case where current control is performed by the inverter circuit 700.

$$Vc4 \geq Vp \cdot \sin\theta 1 \qquad (5)$$

$$Vc4 \geq (|Vc3^* - Vp \cdot \sin\theta 1|) \qquad (6)$$

$$Vc5 \geq Vp \cdot \sin\theta 1 \qquad (7)$$

$$Vc5 \geq (|Vc3^* - Vp \cdot \sin\theta 1|) \qquad (8)$$

In the above-described driving method, in a case where the establishment conditions (Expressions (5) to (8)) of the current control are not satisfied, the current control can be continuously performed by changing the current control by the inverter circuits 400 and 700 to that by the semiconductor switches 601a and 901a.

Hereinafter, a description will be made of current paths in the current control performed by the semiconductor switches 601a and 901a in the powering operation. In a case where a polarity of the AC voltage Vac of the AC power supply 1 is positive, and Expression (5) is not satisfied within a period in which the semiconductor switch 601a is turned on, the semiconductor switch 401a is turned on, and the semiconductor switch 601a is PWM-controlled. A current path is as illustrated in FIG. 16 in a case where the semiconductor switch 601a is turned on, and a current path is as illustrated in FIG. 18 in a case where the semiconductor switch 601a is turned off. The positive side reactor 2 and the negative side reactor 3 are excited in the current path illustrated in FIG. 16, and the excitation of the positive side reactor 2 and the negative side reactor 3 is reset in the current path illustrated in FIG. 18. In addition, the DC capacitor 403 is charged in FIG. 16, and the DC capacitor 403 is bypassed in FIG. 18. Therefore, even in a case where Expression (5) is not satisfied, the current control can be continuously performed, and thus a charge operation of the DC capacitor 403 can also be continuously performed.

In a case where a polarity of the AC voltage Vac of the AC power supply 1 is positive, and Expression (6) is not satisfied within a period in which the semiconductor switch 601a is turned off, the semiconductor switch 402a is turned on, and the semiconductor switch 601a is PWM-controlled. A current path is as illustrated in FIG. 15 in a case where the semiconductor switch 601a is turned on, and a current path is as illustrated in FIG. 17 in a case where the semiconductor switch 601a is turned off. The positive side reactor 2 and the negative side reactor 3 are excited in the current path illustrated in FIG. 15, and the excitation of the positive side reactor 2 and the negative side reactor 3 is reset in the current path illustrated in FIG. 17. In addition, the DC capacitor 403 is bypassed in FIG. 15, and the DC capacitor 403 is discharged in FIG. 17. Therefore, even in a case where Expression (6) is not satisfied, the current control can be continuously performed, and thus a discharge operation of the DC capacitor 403 can also be continuously performed.

In a case where a polarity of the AC voltage Vac of the AC power supply 1 is negative, and Expression (7) is not satisfied within a period in which the semiconductor switch 901a is turned on, the semiconductor switch 701a is turned on, and the semiconductor switch 901a is PWM-controlled. A current path is as illustrated in FIG. 20 in a case where the semiconductor switch 901a is turned on, and a current path is as illustrated in FIG. 22 in a case where the semiconductor switch 901a is turned off. The positive side reactor 2 and the negative side reactor 3 are excited in the current path illustrated in FIG. 20, and the excitation of the positive side reactor 2 and the negative side reactor 3 is reset in the current path illustrated in FIG. 22. In addition, the DC capacitor 703 is charged in FIG. 20, and the DC capacitor 703 is bypassed in FIG. 22. Therefore, even in a case where Expression (7) is not satisfied, the current control can be continuously performed, and thus a charge operation of the DC capacitor 703 can also be continuously performed.

In a case where a polarity of the AC voltage Vac of the AC power supply 1 is negative, and Expression (8) is not satisfied within a period in which the semiconductor switch 901a is turned off, the semiconductor switch 702a is turned on, and the semiconductor switch 901a is PWM-controlled. A current path is as illustrated in FIG. 19 in a case where the semiconductor switch 901a is turned on, and a current path is as illustrated in FIG. 21 in a case where the semiconductor switch 901a is turned off. The positive side reactor 2 and the negative side reactor 3 are excited in the current path illustrated in FIG. 19, and the excitation of the positive side reactor 2 and the negative side reactor 3 is reset in the current path illustrated in FIG. 21. In addition, the DC capacitor 703 is bypassed in FIG. 19, and the DC capacitor 703 is discharged in FIG. 21. Therefore, even in a case where Expression (8) is not satisfied, the current control can be continuously performed, and thus a discharge operation of the DC capacitor 703 can also be continuously performed.

Also during the regenerative operation, it is possible to continuously perform the current control through turning-on and turning-off of the semiconductor switches 501a, 601a, 801a and 901a. In a case where a polarity of the AC voltage Vac of the AC power supply 1 is positive, and Expression (5) is not satisfied within a period in which the semiconductor switch 501a is turned off and the semiconductor switch 601a is turned on, the semiconductor switch 401a is turned on, and the semiconductor switch 501a and the semiconductor switch 601a are PWM-controlled. Here, the turned-on and turned-off states of the semiconductor switch 501a have a relationship of polarities reverse to the turned-on and turned-off states of the semiconductor switch 601a. A current path is as illustrated in FIG. 25 in a case where the semiconductor switch 501a is turned off and the semiconductor switch 601a is turned on, and a current path is as illustrated in FIG. 27 in a case where the semiconductor switch 501a is turned on and the semiconductor switch 601a is turned off. The positive side reactor 2 and the negative side reactor 3 are excited in the current path illustrated in FIG. 25, and the excitation of the positive side reactor 2 and the negative side reactor 3 is reset in the current path illustrated in FIG. 27. In addition, the DC capacitor 403 is discharged in FIG. 25, and the DC capacitor 403 is bypassed in FIG. 27. Therefore, even in a case where Expression (5) is not satisfied, the current control can be continuously performed, and thus a discharge operation of the DC capacitor 403 can also be continuously performed.

In a case where a polarity of the AC voltage Vac of the AC power supply 1 is positive, and Expression (6) is not satisfied within a period in which the semiconductor switch 501a is turned on and the semiconductor switch 601a is turned off, the semiconductor switch 402a is turned on, and the semiconductor switch 501a and the semiconductor switch 601a are PWM-controlled. Also here, the turned-on and turned-off states of the semiconductor switch 501a have a relationship of polarities reverse to the turned-on and turned-off states of the semiconductor switch 601a. A current path is as illustrated in FIG. 24 in a case where the semiconductor switch 501a is turned off and the semiconductor switch 601a is turned on, and a current path is as illustrated in FIG. 26 in a case where the semiconductor switch 501a is turned on and the semiconductor switch 601a is turned off. The positive side reactor 2 and the negative side reactor 3 are excited in the current path illustrated in FIG. 24, and the excitation of the positive side reactor 2 and the negative side reactor 3 is reset in the current path illustrated in FIG. 26. In addition, the DC capacitor 403 is bypassed in FIG. 26, and the DC capacitor 403 is charged in FIG. 26. Therefore, even in a case where Expression (6) is not satisfied, the current control can be continuously performed, and thus a charge operation of the DC capacitor 403 can also be continuously performed.

In a case where a polarity of the AC voltage Vac of the AC power supply 1 is negative, and Expression (7) is not satisfied within a period in which the semiconductor switch 801a is turned off and the semiconductor switch 901a is turned on, the semiconductor switch 701a is turned on, and the semiconductor switch 801a and the semiconductor switch 901a are PWM-controlled. Also here, the turned-on and turned-off states of the semiconductor switch 801a have a relationship of polarities reverse to the turned-on and turned-off states of the semiconductor switch 901a. A current path is as illustrated in FIG. 29 in a case where the semiconductor switch 801a is turned off and the semiconductor switch 901a is turned on, and a current path is as illustrated in FIG. 31 in a case where the semiconductor switch 801a is turned on and the semiconductor switch 901a is turned off. The positive side reactor 2 and the negative side reactor 3 are excited in the current path illustrated in FIG. 29, and the excitation of the positive side reactor 2 and the negative side reactor 3 is reset in the current path illustrated in FIG. 31. In addition, the DC capacitor 703 is discharged in FIG. 29, and the DC capacitor 703 is bypassed in FIG. 31. Therefore, even in a case where Expression (7) is not satisfied, the current control can be continuously performed, and thus a discharge operation of the DC capacitor 703 can also be continuously performed.

In a case where a polarity of the AC voltage Vac of the AC power supply 1 is negative, and Expression (8) is not satisfied within a period in which the semiconductor switch 801a is turned on and the semiconductor switch 901a is turned off, the semiconductor switch 702a is turned on, and the semiconductor switch 801a and the semiconductor switch 901a are PWM-controlled. Also here, the turned-on and turned-off states of the semiconductor switch 801a have a relationship of polarities reverse to the turned-on and turned-off states of the semiconductor switch 901a. A current path is as illustrated in FIG. 28 in a case where the semiconductor switch 801a is turned off and the semiconductor switch 901a is turned on, and a current path is as illustrated in FIG. 30 in a case where the semiconductor switch 801a is turned on and the semiconductor switch 901a is turned off. The positive side reactor 2 and the negative side reactor 3 are excited in the current path illustrated in FIG. 28, and the excitation of the positive side reactor 2 and the negative side reactor 3 is reset in the current path illustrated in FIG. 30. In addition, the DC capacitor 703 is bypassed in FIG. 28, and the DC capacitor 703 is charged in FIG. 30. Therefore, even in a case where Expression (8) is not satisfied, the current control can be continuously performed, and thus a charge operation of the DC capacitor 703 can also be continuously performed.

In addition, the inverter circuit 400 is operated so that the turned-on and turned-off states of the semiconductor switch 401a have polarities reverse to those of the turned-on and turned-off states of the semiconductor switch 402a. In other words, in a case where the semiconductor switch 402a is turned on, the semiconductor switch 401a is turned off, and in a case where the semiconductor switch 402a is turned off, the semiconductor switch 401a is turned on. Similarly, the inverter circuit 700 is operated so that the turned-on and turned-off states of the semiconductor switch 701a have polarities reverse to those of the turned-on and turned-off states of the semiconductor switch 702a.

Figure 33:
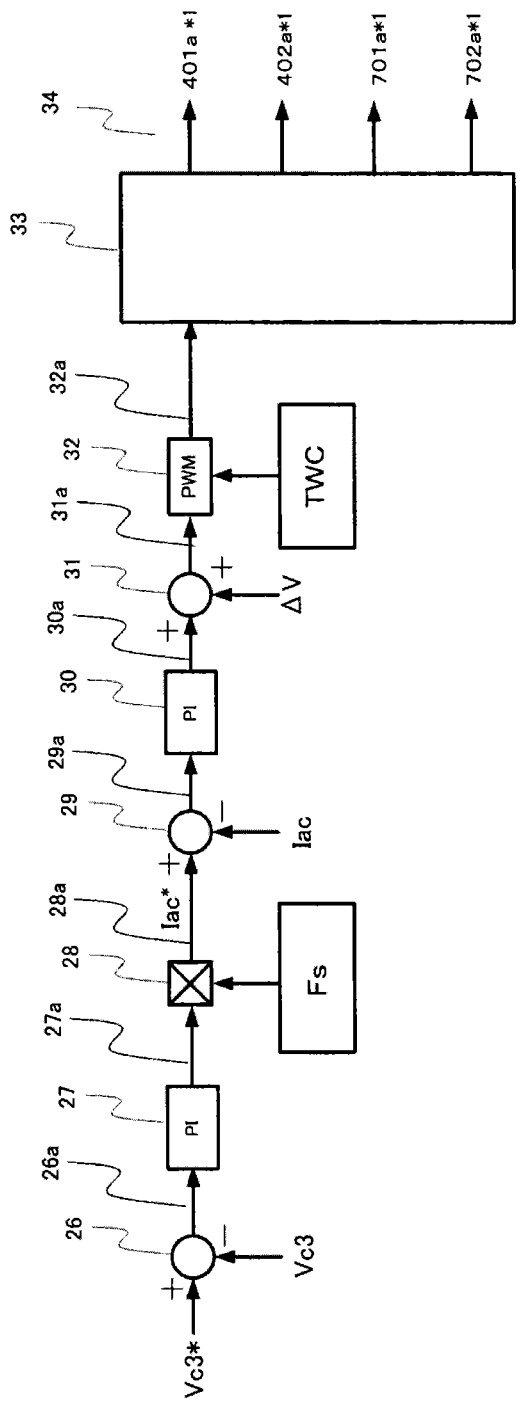
FIG. 33 is a control block diagram illustrating output control on an inverter circuit according to Embodiment 3 of the present invention.

Next, a description will be made of details of control on the inverter circuits 400 and 700. FIG. 33 is a control block diagram illustrating output control on the inverter circuits 400 and 700, performed by the control circuit 11. In the inverter circuits 400 and 700, the DC voltage Vc3 of the smoothing capacitor 10 is maintained to be the target voltage Vc3* by performing output control on the semiconductor switches 401a, 402a, 701a and 702a constituting the inverter circuits, and the AC current Iac is controlled so that a power factor of the AC power supply 1 becomes about 1 during a powering operation and becomes about (−1) during a regenerative operation.

In FIG. 33, first, a subtractor 26 obtains a difference 26a between the DC voltage Vc3 and the target voltage Vc3* of the smoothing capacitor 10. The difference 26a between the DC voltage Vc3 and the target voltage Vc3* is used as a feedback amount, an output which is PI-controlled by a PI controller 27 is set as an amplitude target value 27a. A sine wave current command (Iac*) 28a which is synchronized with the AC voltage Vac of the AC power supply 1 is generated by a current command generator 28 on the basis of the amplitude target value 27a and a synchronization frequency Fs of the AC power supply 1. The current command (Iac*) 28a is adjusted so that a power factor becomes 1 during a powering operation and becomes (−1) during a regenerative operation.

Next, a difference 29a between the set current command (Iac*) 28a and a detected AC current Iac is obtained by a subtractor 29. The difference 29a between the current command Iac* and the AC current Iac is used as a feedback amount, and an output which is PI-controlled by a PI controller 30 is set as a voltage command 30a which is a target value of a voltage generated by the inverter circuits 400 and 700. In this case, a feed forward correction voltage ΔV is obtained which is synchronized with the change between first control in which the semiconductor switch 601a or the semiconductor switch 901a is turned on and the semiconductor switch 501a or the semiconductor switch 801a is turned off and second control in which the semiconductor switch 601a or the semiconductor switch 901a is turned off and the semiconductor switch 501a or the semiconductor switch 801a is turned on. An adder 31 adds the feed forward correction voltage ΔV to the voltage command 30a so as to correct the voltage command 31a. In addition, a gate signal generator 32 generates a gate signal 32a of each semiconductor switch of the inverter circuits 400 and 700, corresponding to PWM control by using a corrected voltage command 31a.

As mentioned above, the control circuit 11 performs the feed forward control in which the feed forward correction voltage ΔV is added to the voltage command 30a only at the time of the change between turning-on and turning-off of the semiconductor switches 601a and 901a, which is the time of the change between the first control and the second control. The feed forward correction voltage ΔV is an AC voltage −Vac having a polarity reverse to the AC voltage of the AC power supply 1 during the first control, and is a difference voltage (Vc5−Vac) between the DC voltage Vc5 of the smoothing capacitor 10 and the AC voltage Vac of the AC power supply 1 during the second control.

Figure 34:
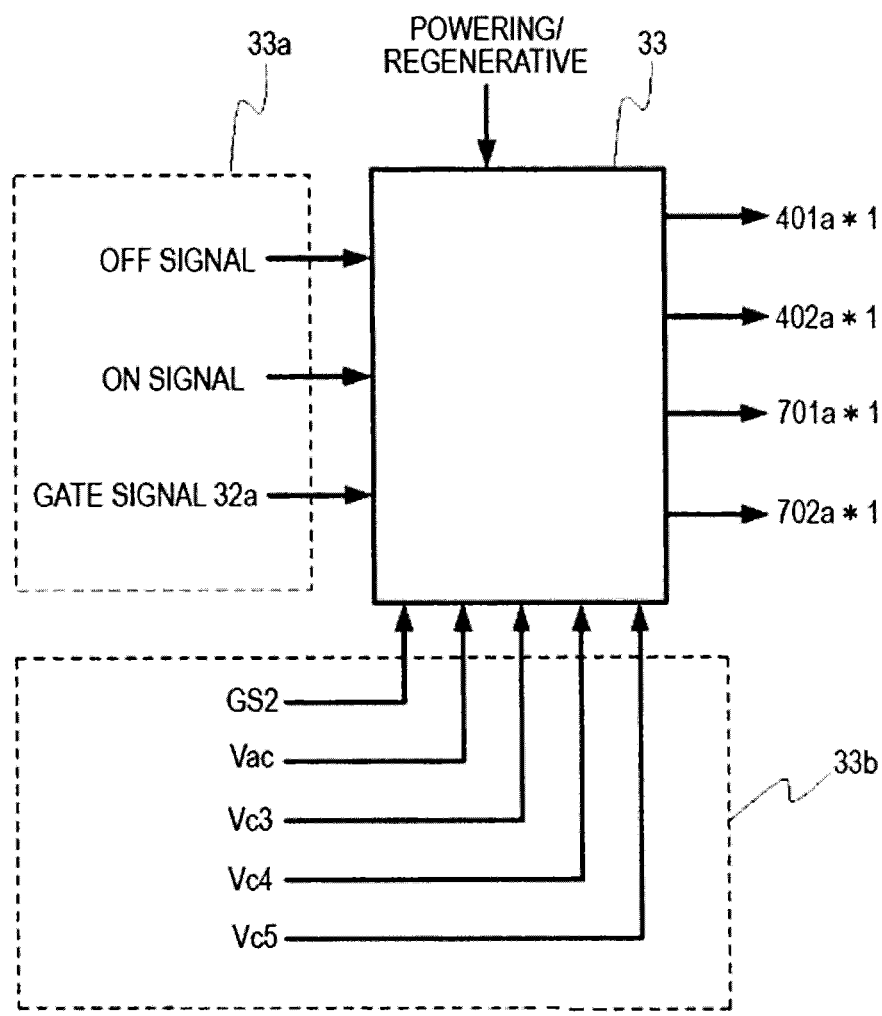
FIG. 34 is a control block diagram illustrating a specific function of a gate signal selector according to Embodiment 3 of the present invention.

After calculation of the gate signal 32a, a gate signal selector 33 selects a gate signal of each of the semiconductor switches 401a, 402a, 701a and 702a of the inverter circuits 400 and 700 according to an operation condition. FIG. 34 is a control block diagram illustrating a specific function of the gate signal selector 33. The gate signal selector 33 selects an appropriate gate signal from among input signals 33a on the basis of a polarity of an input AC voltage and voltage information 33b, and generates a gate signal of each of the semiconductor switches 401a, 402a, 701a and 702a. The input signals 33a to the gate signal selector 33 are three signals including the gate signal 32a which is a PWM signal, an On signal, and an Off signal. The gate signal selector 33 selects the three-pattern signals so as to output a gate signal. The voltage information 33b for selecting a gate signal is information which is required to determine a polarity of the AC voltage Vac and to determine establishment of Expressions (5) to (8), and includes the AC voltage Vac of the AC power supply 1, the DC voltage Vc3 of the smoothing capacitor 10, the DC voltage Vc4 of the DC capacitor 403, the DC voltage Vc5 of the DC capacitor 703, and a gate signal GS2 of the semiconductor switches 601a and 901a. In addition, a powering/regenerative operation command (powering/regenerative) is also input to the gate signal selector 33.

In a case where the polarity of the AC voltage Vac of the AC power supply 1 is positive, the semiconductor switch 601a is in a turned-on state, and the condition of Expression (5) is satisfied, the gate signal 32a which is a PWM signal is selected as agate signal of the semiconductor switches 401a and 402a. In addition, the Off signal is selected as a gate signal of the semiconductor switch 701a regardless of the powering operation and regenerative operation. As a gate signal of the semiconductor switch 702a, the Off signal is selected during the powering operation, and the On signal is selected during the regenerative operation. In a case where the polarity of the AC voltage Vac of the AC power supply 1 is positive, the semiconductor switch 601a is in a turned-on state, and the condition of Expression (5) is not satisfied, the current control is handed over from the inverter circuit 400 to the semiconductor switch 601a. Therefore, the On signal is selected as a gate signal of the semiconductor switch 401a, and the Off signal is selected as a gate signal of the semiconductor switch 402a. In addition, the Off signal is selected as a gate signal of the semiconductor switch 701a regardless of the powering operation and regenerative operation. As a gate signal of the semiconductor switch 702a, the Off signal is selected during the powering operation, and the On signal is selected during the regenerative operation.

In a case where the polarity of the AC voltage Vac of the AC power supply 1 is positive, the semiconductor switch 601a is in a turned-off state, and the condition of Expression (6) is satisfied, the gate signal 32a which is a PWM signal is selected as agate signal of the semiconductor switches 401a and 402a. In addition, the Off signal is selected as a gate signal of the semiconductor switch 701a regardless of the powering operation and regenerative operation. As a gate signal of the semiconductor switch 702a, the Off signal is selected during the powering operation, and the On signal is selected during the regenerative operation. In a case where the polarity of the AC voltage Vac of the AC power supply 1 is positive, the semiconductor switch 601a is in a turned-on state, and the condition of Expression (6) is not satisfied, the current control is handed over from the inverter circuit 400 to the semiconductor switch 601a. Therefore, the On signal is selected as a gate signal of the semiconductor switch 402a, and the Off signal is selected as a gate signal of the semiconductor switch 401a. In addition, the Off signal is selected as a gate signal of the semiconductor switch 701a regardless of the powering operation and regenerative operation. As a gate signal of the semiconductor switch 702a, the Off signal is selected during the powering operation, and the On signal is selected during the regenerative operation.

In a case where the polarity of the AC voltage Vac of the AC power supply 1 is negative, the semiconductor switch 901a is in a turned-on state, and the condition of Expression (7) is satisfied, the gate signal 32a which is a PWM signal is selected as agate signal of the semiconductor switches 701a and 702a. In addition, the Off signal is selected as a gate signal of the semiconductor switch 401a regardless of the powering operation and regenerative operation. As a gate signal of the semiconductor switch 402a, the Off signal is selected during the powering operation, and the On signal is selected during the regenerative operation. In a case where the polarity of the AC voltage Vac of the AC power supply 1 is negative, the semiconductor switch 901a is in a turned-on state, and the condition of Expression (7) is not satisfied, the current control is handed over from the inverter circuit 700 to the semiconductor switch 901a. Therefore, the On signal is selected as a gate signal of the semiconductor switch 701a, and the Off signal is selected as a gate signal of the semiconductor switch 702a. In addition, the Off signal is selected as a gate signal of the semiconductor switch 401a regardless of the powering operation and regenerative operation. As agate signal of the semiconductor switch 402a, the Off signal is selected during the powering operation, and the On signal is selected during the regenerative operation.

In a case where the polarity of the AC voltage Vac of the AC power supply 1 is negative, the semiconductor switch 901a is in a turned-off state, and the condition of Expression (8) is satisfied, the gate signal 32a which is a PWM signal is selected as agate signal of the semiconductor switches 701a and 702a. In addition, the Off signal is selected as a gate signal of the semiconductor switch 401a regardless of the powering operation and regenerative operation. As a gate signal of the semiconductor switch 402a, the Off signal is selected during the powering operation, and the On signal is selected during the regenerative operation. In a case where the polarity of the AC voltage Vac of the AC power supply 1 is negative, the semiconductor switch 901a is in a turned-off state, and the condition of Expression (8) is not satisfied, the current control is handed over from the inverter circuit 700 to the semiconductor switch 901a. Therefore, the On signal is selected as a gate signal of the semiconductor switch 702a, and the Off signal is selected as a gate signal of the semiconductor switch 701a. In addition, the Off signal is selected as a gate signal of the semiconductor switch 401a regardless of the powering operation and regenerative operation. As a gate signal of the semiconductor switch 402a, the Off signal is selected during the powering operation, and the On signal is selected during the regenerative operation.

Figure 35:
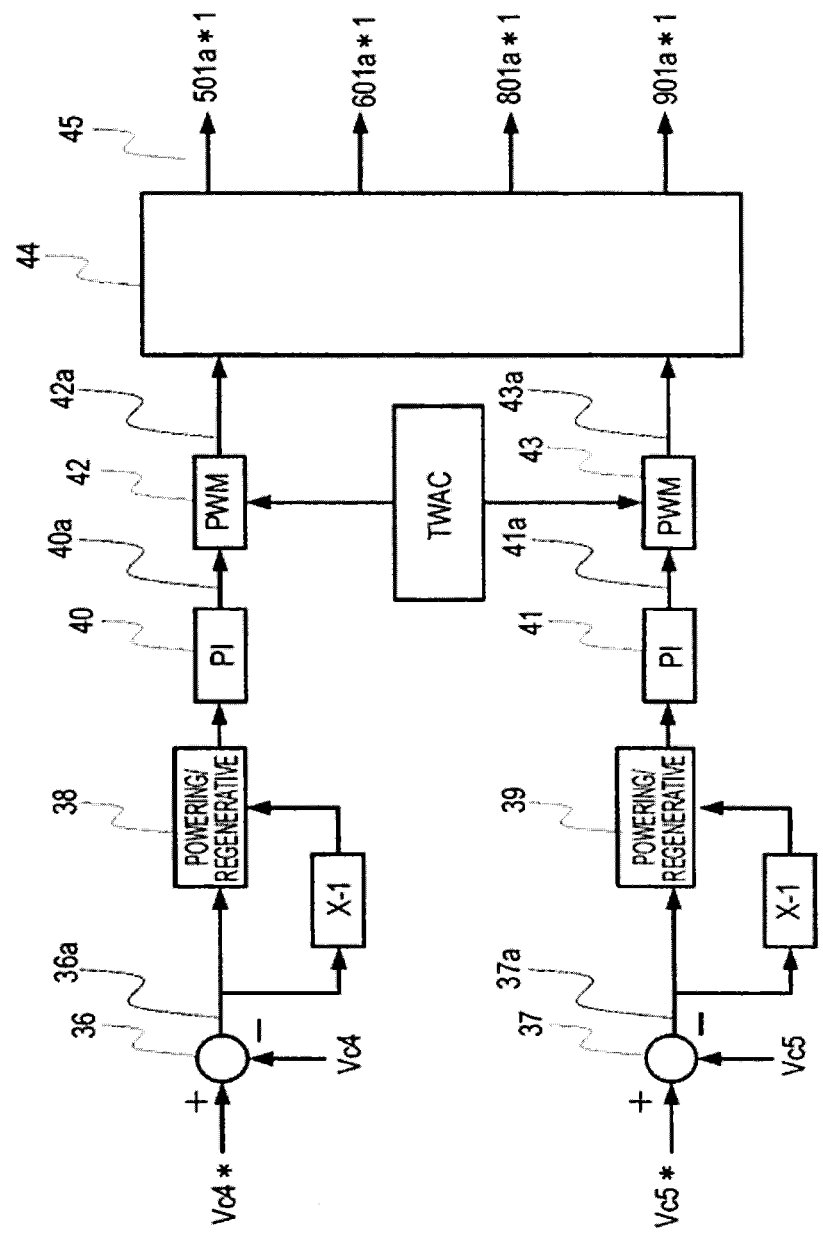
FIG. 35 is a control block diagram illustrating output control on a semiconductor switch according to Embodiment 3 of the present invention.

Next, a description will be made of control which is related to outputs of the semiconductor switches 501a, 601a, 801a and 901a, makes the DC voltage Vc4 of the DC capacitor 403 of the inverter circuit 400 track the command value Vc4*, and makes the voltage Vc5 of the DC capacitor 703 of the inverter circuit 700 track the command value Vc5*. FIG. 35 is a control block diagram illustrating output control on the semiconductor switches 601a and 901a, performed by the control circuit 11.

In FIG. 35, first, a subtractor 36 obtains a difference 36a between the set command value Vc4* and a detected DC voltage Vc4. The difference 36a between the command value Vc4* and the DC voltage Vc4 is input to a powering/regenerative operation selector 38 as a feedback amount. The powering/regenerative operation selector 38 outputs, to a PI controller 40, a feedback amount which is 1 times during a powering operation and a feedback amount which is −1 times during a regenerative operation. An output which is PI-controlled by the PI controller 40 is set as a voltage command 40a. A gate signal generator 42 generates a gate signal 42a of the semiconductor switch 601a, corresponding to PWM control by using the voltage command 40a. Similarly, in relation to given control on the DC voltage Vc5, a gate signal 43a of the semiconductor switch 901a is generated. In the PWM control, a triangular wave (triangular wave of AC power supply cycle TWAC) synchronized with a cycle which is the twice the frequency of the AC power supply 1 is used as a carrier wave, and the gate signals 42a and 43a are generated through comparative calculation. In other words, short-circuit periods of the semiconductor switches 601a and 901a are also controlled by the gate signals 42a and 43a.

Figure 36:
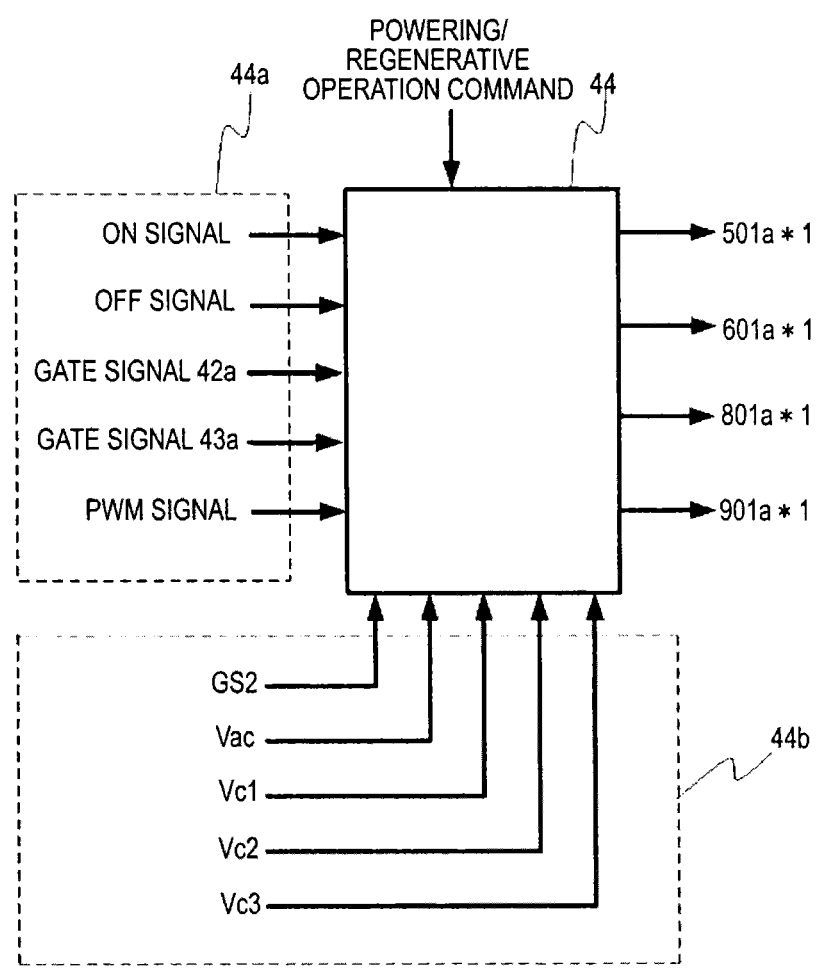
FIG. 36 is a control block diagram illustrating a specific function of the gate signal selector according to Embodiment 3 of the present invention.

Next, a gate signal selector 44 selects a gate signal of each of the semiconductor switches 501a, 601a, 801a and 901a according to an operation condition. FIG. 36 is a control block diagram illustrating a specific function of the gate signal selector 44. The gate signal selector 44 selects an appropriate gate signal from among input signals 44a on the basis of voltage information 44b and a powering/regenerative operation command (powering/regenerative), and generates a gate signal of each of the semiconductor switches 501a, 601a, 801a and 901a.

The input signals 44a are five signals including a current control PWM signal, an On signal, an Off signal, and the gate signals 42a and 43a based on the voltage commands which are calculated for respectively making the DC voltage Vc4 and the DC voltage Vc5 illustrated in FIG. 35 track the command value Vc4* and the command value Vc5*. The voltage information 44b is information which is required to determine a polarity of the AC voltage Vac and to determine establishment of Expressions (5) to (8), and includes a gate signal GS2 of the semiconductor switches 601a and 901a, the AC voltage Vac of the AC power supply 1, the DC voltage Vc4 of the DC capacitor 403, the DC voltage Vc5 of the DC capacitor 703, and the DC voltage Vc3 of the smoothing capacitor 10.

First, a description will be made of a case of the powering operation. During the powering operation, in a case where a polarity of the AC voltage Vac of the AC power supply 1 is positive, and Expression (5) is satisfied, the gate signal 42a which is a PWM signal is selected as a gate signal of the semiconductor switch 501a and the semiconductor switch 601a. In addition, the Off signal is selected as a gate signal of the semiconductor switch 801a, and the Off signal is selected as a gate signal of the semiconductor switch 901a. In a case where Expression (5) is not satisfied, the current control PWM signal is selected as a gate signal of the semiconductor switch 601a; the Off signal is selected as a gate signal of the semiconductor switch 501a; the Off signal is selected as a gate signal of the semiconductor switch 801a; and the Off signal is selected as a gate signal of the semiconductor switch 901a.

In addition, during the powering operation, in a case where a polarity of the AC voltage Vac of the AC power supply 1 is positive, and Expression (6) is satisfied, the gate signal 42a which is a PWM signal is selected as a gate signal of the semiconductor switch 501a and the semiconductor switch 601a. Further, the Off signal is selected as a gate signal of the semiconductor switch 801a, and the Off signal is selected as a gate signal of the semiconductor switch 901a. In a case where Expression (6) is not satisfied, the current control PWM signal is selected as a gate signal of the semiconductor switch 601a; the Off signal is selected as a gate signal of the semiconductor switch 501a; the Off signal is selected as a gate signal of the semiconductor switch 801a; and the Off signal is selected as a gate signal of the semiconductor switch 901a.

In addition, during the powering operation, in a case where a polarity of the AC voltage Vac of the AC power supply 1 is negative, and Expression (7) is satisfied, the gate signal 43a which is a PWM signal is selected as a gate signal of the semiconductor switch 801a and the semiconductor switch 901a. Further, the Off signal is selected as a gate signal of the semiconductor switch 501a, and the Off signal is selected as a gate signal of the semiconductor switch 601a. In a case where Expression (7) is not satisfied, the current control PWM signal is selected as a gate signal of the semiconductor switch 901a; the Off signal is selected as a gate signal of the semiconductor switch 801a; the Off signal is selected as a gate signal of the semiconductor switch 501a; and the Off signal is selected as a gate signal of the semiconductor switch 601a.

In addition, during the powering operation, in a case where a polarity of the AC voltage Vac of the AC power supply 1 is negative, and Expression (8) is satisfied, the gate signal 43a which is a PWM signal is selected as a gate signal of the semiconductor switch 801a and the semiconductor switch 901a. Further, the Off signal is selected as a gate signal of the semiconductor switch 501a, and the Off signal is selected as a gate signal of the semiconductor switch 601a. In a case where Expression (8) is not satisfied, the current control PWM signal is selected as a gate signal of the semiconductor switch 901a; the Off signal is selected as a gate signal of the semiconductor switch 801a; the Off signal is selected as a gate signal of the semiconductor switch 501a; and the Off signal is selected as a gate signal of the semiconductor switch 601a.

Next, a description will be made of a case of the regenerative operation. During the regenerative operation, in a case where a polarity of the AC voltage Vac of the AC power supply 1 is positive, and Expression (5) is satisfied, the gate signal 42a which is a PWM signal is selected as a gate signal of the semiconductor switch 501a and the semiconductor switch 601a. In addition, the Off signal is selected as a gate signal of the semiconductor switch 801a, and the On signal is selected as a gate signal of the semiconductor switch 901a. In a case where Expression (5) is not satisfied, the current control PWM signal is selected as a gate signal of the semiconductor switch 501a and the semiconductor switch 601a (PWM control is performed on the semiconductor switches 501a and 601a through synchronization with each other). Here, the semiconductor switch 501a is operated to have a polarity reverse to that of the semiconductor switch 601a. The Off signal is selected as a gate signal of the semiconductor switch 801a, and the On signal is selected as a gate signal of the semiconductor switch 901a.

In addition, during the regenerative operation, in a case where a polarity of the AC voltage Vac of the AC power supply 1 is positive, and Expression (6) is satisfied, the gate signal 42a which is a PWM signal is selected as a gate signal of the semiconductor switch 501a and the semiconductor switch 601a. Further, the Off signal is selected as a gate signal of the semiconductor switch 801a, and the On signal is selected as a gate signal of the semiconductor switch 901a. In a case where Expression (6) is not satisfied, the current control PWM signal is selected as a gate signal of the semiconductor switch 501a and the semiconductor switch 601a. Also here, the semiconductor switch 501a is operated to have a polarity reverse to that of the semiconductor switch 601a. The Off signal is selected as a gate signal of the semiconductor switch 801a, and the On signal is selected as a gate signal of the semiconductor switch 901a.

In addition, during the regenerative operation, in a case where a polarity of the AC voltage Vac of the AC power supply 1 is negative, and Expression (7) is satisfied, the gate signal 43a which is a PWM signal is selected as a gate signal of the semiconductor switch 801a and the semiconductor switch 901a. Further, the Off signal is selected as a gate signal of the semiconductor switch 501a, and the On signal is selected as a gate signal of the semiconductor switch 601a. In a case where Expression (7) is not satisfied, the current control PWM signal is selected as a gate signal of the semiconductor switch 801a and the semiconductor switch 901a. Also here, the semiconductor switch 801a is operated to have a polarity reverse to that of the semiconductor switch 901a. The Off signal is selected as a gate signal of the semiconductor switch 501a, and the On signal is selected as a gate signal of the semiconductor switch 601a.

In addition, during the regenerative operation, in a case where a polarity of the AC voltage Vac of the AC power supply 1 is negative, and Expression (8) is satisfied, the gate signal 43a which is a PWM signal is selected as a gate signal of the semiconductor switch 801a and the semiconductor switch 901a. Further, the Off signal is selected as a gate signal of the semiconductor switch 501a, and the On signal is selected as a gate signal of the semiconductor switch 601a. In a case where Expression (8) is not satisfied, the current control PWM signal is selected as a gate signal of the semiconductor switch 801a and the semiconductor switch 901a. Also here, the semiconductor switch 801a is operated to have a polarity reverse to that of the semiconductor switch 901a. The Off signal is selected as a gate signal of the semiconductor switch 501a, and the On signal is selected as a gate signal of the semiconductor switch 601a.

In addition, in a case where only the powering operation is performed, the semiconductor switches 501a and 801a connected to the positive side of the smoothing capacitor 10 may be replaced with diodes, and the semiconductor switches 401a and 701a of the positive sides of the inverter circuits 400 and 700 may be replaced with high frequency diodes having losses smaller than those of the diodes during high frequency driving. With this configuration, it is possible to optimize recovery losses and conduction losses of the diodes.

In the present embodiment, since the inverter circuits 400 and 700 are controlled as described above, the DC voltage Vc3 of the smoothing capacitor 10 is made to track the target voltage Vc3*, and the input power factor from the AC power supply 1 is controlled to be improved and be output. In addition, generated voltages of the AC sides of the inverter circuits 400 and 700 are superimposed on the AC voltage Vac which is output from the AC power supply 1.

With the above-described configuration, it is possible to realize a function of converting an AC voltage into a DC voltage and a function of controlling an AC power supply at a high power factor without using a diode rectifying circuit, and thus to realize a regenerative operation in addition to the features of the configuration of Embodiment 1. In addition, since the two inverter circuits 400 and 700 are changed and are controlled depending on a polarity of an AC voltage of the AC power supply 1, it is possible to reduce power load periods of the DC capacitors 403 and 703 by halves and thus to widen a range to which the power conversion device is applied.

Embodiment 4

In Embodiment 1, a single On phase and a single Off phase of the semiconductor switch 601a are provided at a ¼ cycle of the AC voltage Vac of the AC power supply 1. Embodiment 4 is different from Embodiment 1 in that two On phases and two Off phases of the semiconductor switch 601a are provided at the ¼ cycle. In addition, a circuit configuration of Embodiment 4 is the same as that illustrated in FIG. 1 of Embodiment 1, and a relationship between an operation of the power conversion device and a current path is also the same as that illustrated in FIGS. 2 to 5.

Figure 37:
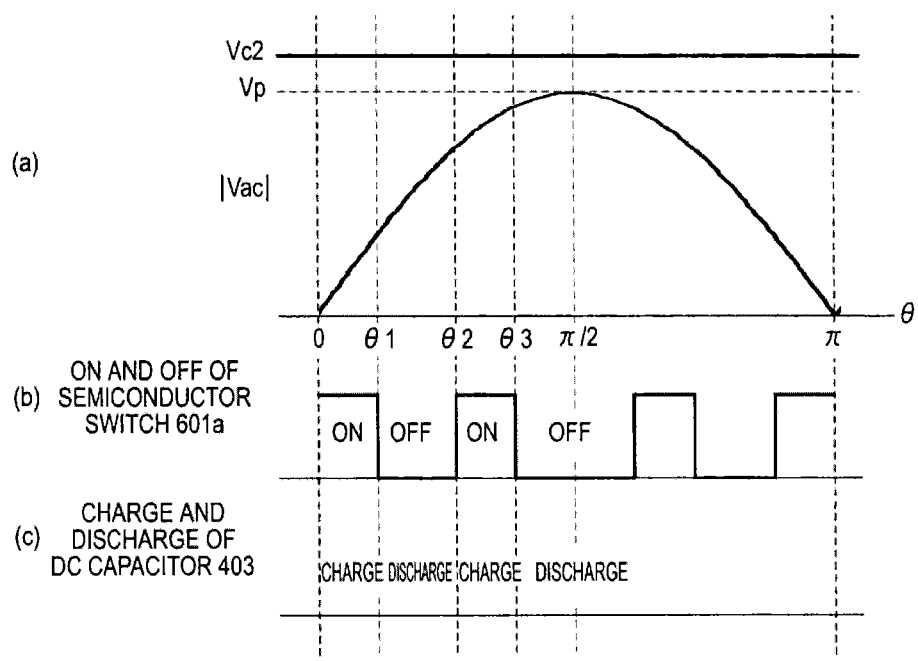
FIG. 37 illustrates waveforms of respective parts and charge and discharge of a DC capacitor of an inverter circuit, for explaining an operation of the power conversion device according to Embodiment 4 of the present invention.

Hereinafter, an operation principle of Embodiment 4 will be described. FIG. 37 illustrates waveforms of the respective parts and charge and discharge of the DC capacitor of the inverter circuit, for explaining an operation of the power conversion device in Embodiment 4. In FIG. 37, FIG. 37(a) illustrates a voltage waveform of the AC voltage Vac; FIG. 37(b) illustrates turned-on and turned-off states of the semiconductor switch 601a; and FIG. 37(c) illustrates charge and discharge states of the DC capacitor 403. In FIG. 37(b), a phase range 0 to θ1 is a first On period; a phase range θ1 to θ2 is a first Off period; a phase range θ2 to θ3 is a second On period; and a phase range θ3 to π/2 is a second Off period. The voltage phases θ1, θ2 and θ3 are set, and thus a length of each of the On period and the Off period is determined.

In the same manner as in Embodiment 1, the DC voltage Vc2 of the smoothing capacitor 7 of the output stage is higher than the peak voltage Vp of the AC voltage Vac of the AC power supply 1, and, FIG. 37 illustrates a state in which the DC voltage Vc2 of the smoothing capacitor 7 is controlled to be a given target voltage Vc2*. In addition, the AC voltage Vac which is output from the AC power supply 1 undergoes full-wave rectification in the diode rectifying circuit 200, and thus operates at a cycle which is twice the AC cycle of the AC power supply 1. The inverter circuit 400 controls and outputs the AC current Iac through PWM control so that an input power factor from the AC power supply 1 becomes about 1, and superimposes a generated voltage of the AC side on the AC voltage Vac which is output from the AC power supply 1. In addition, symmetric operations are performed with respect to the voltage phase π/2 in the phase range 0 to π/2 and the phase range π/2 to π. For this reason, herein, an operation of the power conversion device in the phase range 0 to π/2 will be described. In addition, the voltage phases θ1, θ2 and θ3 have a relationship of θ1<θ2<θ3.

First, a voltage phase of the AC power supply 1 is set to θ, and a description will be made of operations of the four semiconductor switches 401a, 402a, 501a and 601a in a case of 0≤θ<π in which a polarity of the AC voltage Vac is positive. Since full-wave rectification is performed by the diode rectifying circuit 200, also in a case of π<θ≤2π in which a polarity of the AC voltage is negative, the same operation as in a case of the positive polarity range 0≤θ<π is performed.

In a case where the semiconductor switches 402a and 601a are turned on, and the semiconductor switches 401a and 501a are turned off, as illustrated in FIG. 2, the AC current Iac flows so as to bypass the DC capacitor 403. In a case where the semiconductor switches 401a and 601a are turned on, and the semiconductor switches 402a and 501a are turned off, as illustrated in FIG. 3, the AC current Iac flows so as to charge the DC capacitor 403. In addition, in a case where the semiconductor switches 402a and 501a are turned on, and the semiconductor switches 401a and 601a are turned off, as illustrated in FIG. 4, the AC current Iac flows so as to discharge the DC capacitor 403. In a case where the semiconductor switches 401a and 501a are turned on, and the semiconductor switches 402a and 601a are turned off, as illustrated in FIG. 5, the AC current Iac flows so as to bypass the DC capacitor 403.

Through combinations of turning-on control and turning-off control of the four semiconductor switches, the semiconductor switches 401a, 402a, 501a and 601a are controlled so that the inverter circuit 400 is PWM-controlled. Therefore, the DC capacitor 403 is charged and discharged, and thus the current control is performed. In addition, when a current which flows through the semiconductor switches 401a and 501a flows from an emitter to a collector, the semiconductor switch elements may be turned off so that the current flow through the diodes 401b and 501b which are connected inversely in parallel thereto.

As illustrated in FIG. 37, the smoothing capacitor 7 is bypassed when the semiconductor switch 601a is in a turned-on state (fixed to a turned-on state) and the semiconductor switch 501a is in a turned-off state (fixed to a turned-off state) in the phase range ±θ1 centering on the zero-cross phase (θ=0 or π) and the phase range θ2 to θ3 of the AC voltage Vac of the AC power supply 1. The phase range 0 to θ1 and the phase range θ2 to θ3 are set as On phases. At this time, as illustrated in FIG. 2, the AC current Iac from the AC power supply 1 is limited by the reactor 3 so as to be input to the inverter circuit 400, and then returns to the AC power supply 1 through the semiconductor switch 601a. The reactor 3 is excited in the operation mode of FIG. 2, and the excitation of the reactor 3 is reset in the operation mode of FIG. 3. In addition, in a case of the operation mode of FIG. 2, the DC capacitor 403 is bypassed, and in a case of the operation mode of FIG. 3, the DC capacitor 403 is charged. Therefore, the inverter circuit 400 is PWM-controlled through a combination of the operation mode of FIG. 2 and the operation mode of FIG. 3. Thus, the DC capacitor 403 can be charged and the current control can be performed.

Next, as illustrated in FIG. 37, DC power is output to the smoothing capacitor 7 when the semiconductor switch 601a is in a turned-off state and the semiconductor switch 501a is in a turned-on state in the phase range θ1 to θ2 and the phase range θ3 to π/2 of the AC voltage Vac of the AC power supply 1. The phase range θ1 to θ2 and the phase range θ3 to π/2 are set as Off phases. At this time, as illustrated in FIG. 4, the AC current Iac from the AC power supply 1 is limited by the reactor 3 so as to be input to the inverter circuit 400, then charges the smoothing capacitor 7 through the semiconductor switch 501a, and returns to the AC power supply 1. The inverter circuit 400 outputs a voltage (Vc2*−Vac), adds the output voltage (Vc2*−Vac) of the inverter circuit 400 to the AC power supply 1 by repeating the operation mode of FIG. 4 and the operation mode of FIG. 5, and controls the DC voltage Vc2 of the smoothing capacitor 7 to reach the target voltage Vc2* which is higher than the peak voltage of the AC power supply 1.

In the inverter circuit 400, the reactor 3 is excited in the operation mode of FIG. 4, and the excitation of the reactor 3 is reset in the operation mode of FIG. 5. In addition, in a case of the operation mode of FIG. 4, the DC capacitor 403 is discharged, and in a case of the operation mode of FIG. 5, the DC capacitor 403 is bypassed. Therefore, the inverter circuit 400 is PWM-controlled through a combination of the operation mode of FIG. 4 and the operation mode of FIG. 5. Thus, the current control can be performed.

As mentioned above, the control of the semiconductor switches 501a and 601a changes at the voltage phases θ1, θ2 and θ3 of the AC voltage Vac of the AC power supply 1, and the smoothing capacitor 7 is bypassed when the semiconductor switch 601a is in a turned-on state and the semiconductor switch 501a is in a turned-off state only in the phase range 0 to θ1 and the phase range θ2 to θ3. At this time, the control circuit 8 controls the inverter circuit 400 to generate substantially the same voltage as the AC voltage Vac having a reverse polarity, and also controls and outputs the AC current Iac so that the input power factor becomes about 1 to charge the DC capacitor 403.

In addition, the control circuit 8 controls the inverter circuit 400 to maintain the DC voltage Vc2 of the smoothing capacitor 7 to be the target voltage Vc2* when the semiconductor switch 501a is in a turned-on state and the semiconductor switch 601a is in a turned-off state in the phase range θ1 to θ2 and the phase range θ3 to π/2, and controls and outputs the AC current Iac so that the input power factor becomes about 1. At this time, the inverter circuit 400 generates a difference voltage (Vc2*−Vac) between the DC voltage of the smoothing capacitor 7 and the AC power supply, and the DC capacitor 403 is discharged.

In addition, an On period of the semiconductor switch 601a may be set so that energy of charge and energy of discharge of the DC capacitor 403 of the inverter circuit 400 is the same as each other, and an On phase may be determined. The charge energy of the DC capacitor 403 in the On period may be expressed as in Equation (9). The discharge energy of the DC capacitor 403 in the Off period may be expressed as in Equation (10). In addition, if the charge energy and the discharge energy of the DC capacitor 403 of the inverter circuit 400 is the same as each other, a relational expression between the target voltage Vc2* and the peak voltage Vp satisfies Equation (11). Here, Vp indicates a peak voltage of the AC voltage Vac, and Ip indicates a peak current of the AC current Iac.

[Math. 3]

$$P_{in} = \int_0^{\theta_1} V_P \sin\theta \cdot I_P \sin\theta\, d\theta + \int_{\theta_2}^{\theta_3} V_P \sin\theta \cdot I_P \sin\theta\, d\theta \qquad (9)$$

[Math. 4]

$$P_{out} = \int_{\theta_1}^{\theta_2}(V_{dc}-V_P\sin\theta)\cdot I_P \sin\theta\, d\theta + \int_{\theta_3}^{\pi/4}(V_{dc}-V_P\sin\theta)\cdot I_P \sin\theta\, d\theta \qquad (10)$$

[Math. 5]

$$V_{dc} = \frac{\pi V_P}{4(\cos\theta_1 - \cos\theta_2 + \cos\theta_3)} \quad (11)$$

However, a lower limit value of the target voltage Vc2* becomes the peak voltage Vp by the diode rectifying circuit 200, and thus if the voltage phases θ1, θ2 and θ3 are set which cause the target voltage Vc2* to be equal to or lower than the peak voltage Vp, this leads to an inoperable condition. As mentioned above, the target voltage Vc2* of the smoothing capacitor 7 is defined by the voltage phases θ1, θ2 and θ3 and can thus be controlled by changing the phase range 0 to θ1 and the phase range θ2 to θ3 which correspond to On phases. In addition, the DC voltage Vc2 of the smoothing capacitor 7 is controlled to track the target voltage Vc2*.

Further, the DC voltage Vc1 of the DC capacitor 403 of the inverter circuit 400 is set to be equal to or higher than a desired generated voltage of the inverter circuit 400 in each phase range of 0≤θ<θ1, θ1≤θ<θ2, θ2≤θ<θ3, and θ3≤θ<π/2. In this case, the DC voltage Vc2 of the smoothing capacitor 7 can be maintained to be the target voltage Vc2*, and it is possible to perform the current control of the inverter circuit 400 in which the AC current Iac is controlled so that the input power factor becomes about 1 with high reliability in the whole phases of the AC power supply 1. In this case, the DC voltage Vc1 of the DC capacitor 403 is required to be set so as to satisfy Expression (12) in the phase ranges 0≤θ<θ1 and θ2≤θ<θ3 and to satisfy Expression (13) in the phase ranges θ1≤θ<θ2 and θ3≤θ<π/2.

$$Vc1 \geq Vp \cdot \sin\theta_1 \quad (12)$$

$$Vc1 \geq (|Vc2^* - Vp \cdot \sin\theta_1|) \quad (13)$$

In addition, the DC voltage Vc1 of the DC capacitor 403 is set to be equal to or lower than the peak voltage Vp of the AC voltage Vac of the AC power supply 1. Since a loss increases if the DC voltage Vc1 of the DC capacitor 403 increases in the inverter circuit 400 which performs PWM control, the DC voltage Vc1 of the DC capacitor 403 is preferably set to be low in a condition satisfying Expressions (12) and (13).

In addition, since the semiconductor switch 601a is turned on and thus the smoothing capacitor 7 is bypassed only in the phase range 0≤θ<θ1 and the phase range θ2≤θ<θ3 (predetermined phase ranges), the control circuit 8 can control the inverter circuit 400 to control the AC current Iac so that the input power factor becomes about 1 in both periods in which the semiconductor switch 601a is turned on and is turned off, and to output DC power with a desired voltage to the smoothing capacitor 7. In other words, the control circuit 8 can determine the phase range 0 to θ1 and the phase range θ2 to θ3 which correspond to On phases in the predetermined phase ranges of the AC voltage of the AC power supply 1 so as to adjust an On period in which the semiconductor switch 601a is turned on, thereby adjusting the DC voltage Vc1 of the DC capacitor 403 to a predetermined voltage. By performing such control, it is possible to perform a self-sustaining operation without using an external power supply in the DC capacitor 403.

In addition, the semiconductor switch 401a is operated to have a polarity reverse to that of the semiconductor switch 402a. In other words, in a case where the semiconductor switch 402a is turned on, the semiconductor switch 401a is turned off, and in a case where the semiconductor switch 402a is turned off, the semiconductor switch 401a is turned on. However, since, in the semiconductor switch 401a, a current flows from the emitter to the collector at all times, the semiconductor switch 401a may be turned off so that a current flows through the diode 401b which is connected inversely in parallel thereto.

Next, an operation of the control circuit 8 will be described. A description will be made of details of control of the inverter circuit 400 for performing input current power factor control with reference to FIG. 7 described in Embodiment 1. FIG. 7 is a control block diagram illustrating output control on the inverter circuit 400, performed by the control circuit 8. The DC voltage Vc2 of the smoothing capacitor 7 is maintained to be the target voltage Vc2* through the output control on the inverter circuit 400, and the AC current Iac is controlled so that the power factor of the AC power supply 1 becomes about 1. First, a difference 10a between the DC voltage Vc2 and the target voltage Vc2* of the smoothing capacitor 7 is obtained by a subtractor 10. The difference 10a between the DC voltage Vc2 and the target voltage Vc2* is used as a feedback amount, and an output which is PI-controlled by a PI controller 11 is set as an amplitude target value 11a. A sine wave current command (Iac*) 12a which is synchronized with the AC voltage Vac of the AC power supply 1 is generated by a current command generator 12 on the basis of the amplitude target value 11a and a synchronization frequency Fs of the AC power supply 1.

Next, a difference 13a between the set current command (Iac*) 12a and a detected AC current Iac is obtained by a subtractor 13. An output which is PI-controlled by a PI controller 14 with the difference 13a between the current command Iac* and the AC current Iac as a feedback amount is set as a voltage command 14a which is a target value of a voltage generated by the inverter circuit 400. In this case, a feed forward correction voltage ΔV is obtained which is synchronized with the change between first control in which the semiconductor switch 601a is turned on and the semiconductor switch 501a is turned off and second control in which the semiconductor switch 601a is turned off and the semiconductor switch 501a is turned on. An adder 15 adds the feed forward correction voltage ΔV to the voltage command 14a so as to correct the voltage command 14a. In addition, a gate signal generator 16 generates a gate signal 16a of the semiconductor switch 402a of the inverter circuit 400, corresponding to PWM control by using a corrected voltage command 15a, so that the inverter circuit 400 is operated. Further, a gate signal of the semiconductor switch 401a is operated to have a polarity reverse to that of a gate signal of the semiconductor switch 402a.

As mentioned above, the control circuit 8 performs the feed forward control in which the corrected voltage command 15a is generated so as to control output of the inverter circuit 400 so that the AC current Iac flowing through the inverter circuit 400 tracks the current command Iac*, and the feed forward correction voltage ΔV is added to the voltage command 14a only at the time of the change between turning-on and turning-off of the semiconductor switch 601a, which is the time of the change between the first control and the second control. The feed forward correction voltage ΔV is an AC voltage −Vac having a polarity reverse to the AC power supply 1 during the first control, and is a difference voltage (Vc2−Vac) between the DC voltage of the smoothing capacitor 7 and the AC voltage of the AC power supply 1 during the second control.

At the time of the change between the first control and the second control for the semiconductor switch 601a, a voltage command of the inverter circuit 400 is corrected so that an output voltage of the inverter circuit 400 is obtained by adding a difference voltage between the smoothing capacitor 7 and the AC power supply 1 to a voltage of the AC power supply 1. Consequently, it is possible to reliably prevent the control from being delayed as much as a response time of the feedback control. Thus, also at the time of the change between the first control and the second control, the AC current Iac can be controlled so that the input power factor becomes about 1, and thus transient current fluctuation can be minimized with high reliability and the occurrence of harmonic currents can be minimized. Therefore, current controllability is improved.

Figure 38:
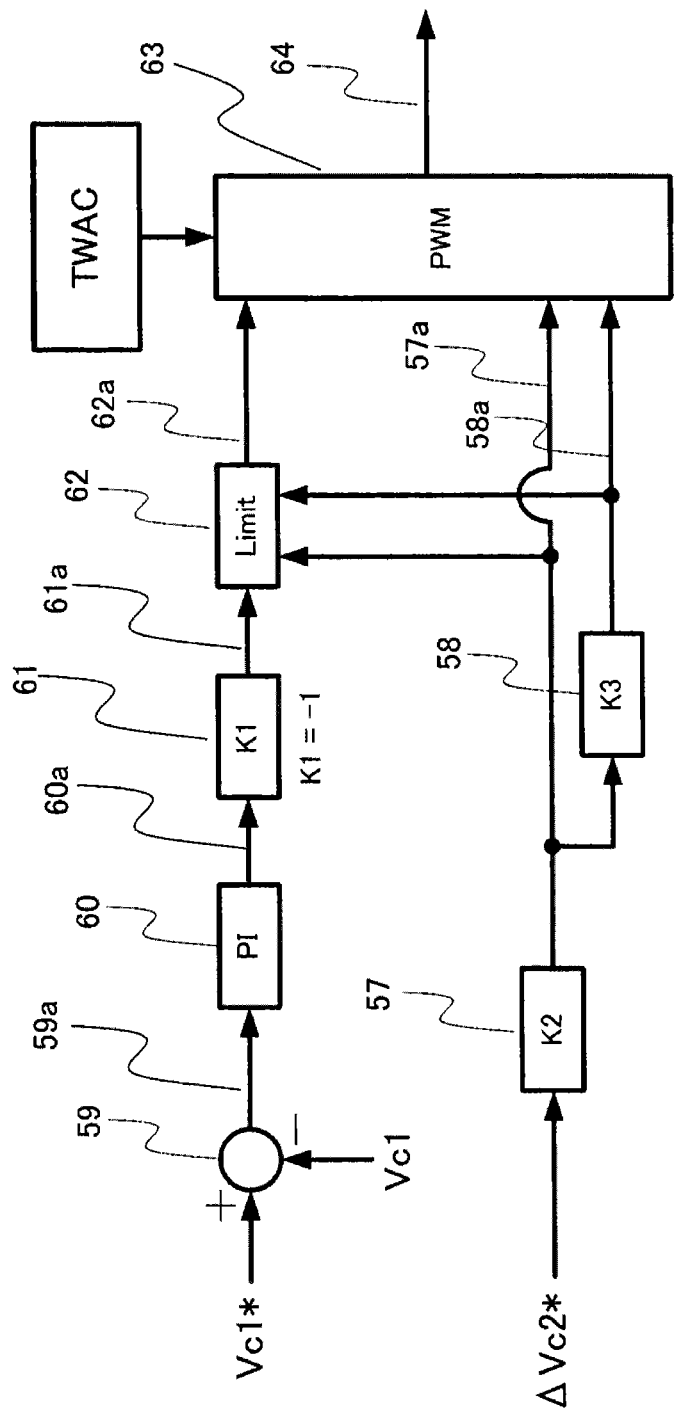
FIG. 38 is a control block diagram illustrating output control on a semiconductor switch according to Embodiment 4 of the present invention.

Next, with reference to FIG. 38, a description will be made of control which is related to outputs of the semiconductor switches 501a and 601a, makes the DC voltage Vc1 of the DC capacitor 403 of the inverter circuit 400 track the command value Vc1*, and makes a ripple voltage ΔVc2 of the smoothing capacitor 7 adjusted to a predetermined target value ΔVc2*. FIG. 38 is a control block diagram illustrating output control on the semiconductor switch 601a, performed by the control circuit 8.

First, a ripple voltage in the phase range 0 to θ1 is expressed as in Equation (14), and a ripple voltage in the phase range θ3 to π/2 is expressed as in Equation (15).

[Math. 6]

$$\frac{\Delta V_{C2}}{2} = \frac{P_{load} \cdot \theta 1 \cdot T}{V_{C1} \cdot C_1 \cdot \pi/2} \tag{14}$$

[Math. 7]

$$\frac{\Delta V_{C2}}{2} = \frac{I_P}{C_{dc}} \cos\theta_3 - \frac{P_{load}}{C_{dc} \cdot V_{dc}} (\pi/2 - \theta 3) \tag{15}$$

In Equation (14), Pload indicates output power. In addition, a gain multiplier 57 calculates a duty signal 57a corresponding to the voltage phase θ1 on the basis of the target ΔVc2*. A constant in the gain multiplier 57 can be obtained from Equation (16).

[Math. 8]

$$K2 = \frac{\Delta V_{C2}^* \cdot C_1 \cdot V_{C1}}{2 \cdot P_{Load} \cdot T/4} \tag{16}$$

In Equation (16), Pload indicates output power, and T/4 indicates a ¼ cycle. In addition, a duty signal 58a corresponding to the voltage phase θ3 is calculated from the duty signal 57a by using a gain multiplier 58 so that a ripple voltage of the smoothing capacitor 7 in the phase range 0 to θ1 is the same as a ripple voltage thereof in the phase range θ3 to π/2. The derivation of the duty signal 58a in the gain multiplier 58 is performed by obtaining the voltage phase θ3 from the relational expression between the voltage phase θ1 and the voltage phase θ3 as expressed in Equation (17), and by dividing the voltage phase θ3 by π/2. In addition, the voltage phase θ1 may be set to a constant value from a target value of the ripple voltage of the smoothing capacitor 7 in the phase range 0 to θ1.

[Math. 9]

$$\frac{P_{Load}}{C_{dc} \cdot V_{dc}} \theta 1 = \frac{I_P}{C_{dc}} \cos\theta 3 - \frac{P_{load}}{C_{dc} \cdot V_{dc}} (\pi/2 - \theta 3) \tag{17}$$

Next, a subtractor 59 obtains a difference 59a between the set command value Vc1* and a detected DC voltage Vc1. The difference 59a between the command value Vc1* and the DC voltage Vc1 is used as a feedback amount, and an output which is PI-controlled by a PI controller 60 is set as a voltage command 60a. In order to reverse increasing and decreasing polarities of the voltage command 60a, an output from a gain multiplier 61 is set as a voltage command 61a. The voltage command 61a is a duty signal corresponding to the voltage phase θ2 and is thus required to satisfy voltage phases θ1<θ2<θ3 at all times. Therefore, a voltage signal 62a is generated by a limiter 62 which sets the duty signal 57a in the voltage command 61a as a lower limit and sets the duty signal 58a therein as an upper limit. A gate signal generator 63 generates a gate signal 64 of the semiconductor switch 601a, corresponding to PWM control by using the three signals 57a, 58a and 62a.

In the PWM control by the gate signal generator 63, a triangular wave (triangular wave of AC power supply cycle TWAC) synchronized with a cycle which is the twice the frequency of the AC power supply 1 is used as a carrier wave, and, through comparative calculation, the duration of 0 to the duty signal 57a is set to the phase range 0 to θ1; the duration of the duty signal 57a to the voltage signal 62a is set to the phase range θ1 to θ2; the duration of the voltage signal 62a to the duty signal 58a is set to the phase range θ2 to θ3; and the duration of the duty signal 58a to 1 is set to the phase range θ3 to π/2. In this case, an On signal is generated as the gate signal 64 in the phase range 0 to θ1 and the phase range θ2 to θ3, and an Off signal is generated as the gate signal 64 in the phase range θ1 to θ2 and the phase range θ3 to π/2. In other words, an On period of the semiconductor switch 601a is also controlled by the gate signal 64.

The semiconductor switch 501a is operated to have a polarity reverse to that of the semiconductor switch 601a. In other words, in a case where the semiconductor switch 601a is turned on, the semiconductor switch 501a is turned off, and in a case where the semiconductor switch 601a is turned off, the semiconductor switch 501a is turned on. However, since, in the semiconductor switch 501a, a current flows from the emitter to the collector at all times, the semiconductor switch 501a may be turned off so that a current flows through the diode 501b which is connected inversely in parallel thereto.

In the present embodiment, since the inverter circuit 400 is controlled by using such a current command, the DC voltage Vc2 of the smoothing capacitor 7 is made to track the target voltage Vc2*, and the input power factor from the AC power supply 1 is controlled to be improved and be output. In addition, a generated voltage on the AC side of the inverter circuit 400 is superimposed on the AC voltage Vac which is output from the AC power supply 1. By performing this control, the semiconductor switches 501a and 601a do not require high frequency switching. Further, the inverter circuit 400 can reduce a level of a voltage in switching of the semiconductor switches even more than a peak voltage of the AC power supply 1. For this reason, a rapid change in a voltage applied to the reactor 3 can be prevented. Thus, it is possible to reduce a switching loss and noise even if the reactor 3 is miniaturized without using a large reactor which is required to limit a current in the related art.

In addition, in a case where the semiconductor switch 601a is in a turned-on state, since the smoothing capacitor 7 is bypassed and the DC capacitor 403 of the inverter circuit 400 can be charged, the AC current Iac can be made to flow through the AC power supply 1 without causing a high voltage to occur in the inverter circuit 400 and can also be used to release accumulated energy toward the smoothing capacitor 7. For this reason, it is possible to further reduce a level of a voltage treated in switching of the semiconductor switches, and to further promote achievement of high efficiency and low noise. In addition, the reactor 3 in this case does not accumulate energy but operates as a current-limiting circuit which limits a current, and thus reliability of current control is improved. Further, the DC voltage Vc1 of the DC capacitor 403 of the inverter circuit 400 is set to be equal to or lower than the peak voltage Vp of the AC voltage Vac, and thus it is possible to reliably achieve effects of high efficiency and low noise.

Further, the inverter circuit 400 is of a half bridge type constituted by the two semiconductor switches 401a and 402a and the DC capacitor 403, the semiconductor switch 501a is connected between the semiconductor switch 401a of the positive side of the inverter circuit 400 and the positive side P2 of the smoothing capacitor 7, and the semiconductor switch 601a is connected between the semiconductor switch 402a of the negative side of the inverter circuit 400 and the negative side N2 of the smoothing capacitor 7. For this reason, it is possible to realize current control with a smaller number of semiconductor switch elements, and thus to realize miniaturization of a power conversion device, a light weight power conversion device, and a reduction in the number of components thereof.

In addition, since the semiconductor switches 501a and 601a are operated only in a specific phase of an input voltage from the AC power supply 1, the power conversion device can be stably controlled, and thus few losses caused by switching of the semiconductor switches occurs. Further, since two On phases are provided at the ¼ cycle so that the phase range 0 to θ1 and the phase range θ3 to π/2 are adjusted, and thus a ripple voltage of the smoothing capacitor 7 is positively adjusted, it is possible to minimize the ripple voltage and thus to widen an operation voltage range of the power conversion device. Furthermore, since the ripple voltage is minimized and thus a necessary capacitor capacitance can be reduced, it is possible to omit necessary capacitors which are connected in parallel and to realize miniaturization of a power conversion device, a light weight power conversion device, and a reduction in the number of components thereof.

In addition, at the time of the change between turning-on and turning-off of the semiconductor switch 601a, the inverter circuit 400 is controlled to change the charge and discharge operations of the DC capacitor 403 due to the feed forward control, and thus it is possible to reliably prevent the control from being delayed as much as a response time of the feedback control and thus to realize high speed control.

In addition, it is possible to realize the above-described current control with a configuration in which the semiconductor switches 401a and 501a are omitted, and only the diodes 401b and 501b are used. A low Vf diode for low frequency deriving may be selected as the diode 501b. A high frequency diode, which has a good recovery characteristic for high frequency driving and has a smaller loss during high frequency driving than a diode for low frequency driving, may be selected as the diode 401b. This configuration is equivalent to a configuration in which the semiconductor switch 501a connected to the positive side of the smoothing capacitor 7 is replaced with a diode, and the semiconductor switch 401a of the positive side of the inverter circuit 400 is replaced with a high frequency diode which has a loss smaller than that of the diode during high frequency driving. In this case, it is possible to optimize recovery losses and conduction losses of the diode 501b which is driven at a low frequency and the diode 401b which is driven at a high frequency, and thus to further reduce losses. Further, by omitting semiconductor switches, reducing the number of driving circuits, and miniaturizing a cooling structure, it is possible to realize miniaturization of a power conversion device, a light weight power conversion device, and a reduction in the number of components thereof.

Further, a MOSFET for high frequency driving may be used as the semiconductor switch 402a, and an IGBT for low frequency driving may be used as the semiconductor switch 601a. In this case, it is possible to further reduce losses of the semiconductor switch 402a which is driven at a high frequency and the semiconductor switch 601a which is driven at a low frequency and to miniaturize a cooling structure. Thus, it is possible to realize miniaturization of a power conversion device, a light weight power conversion device, and a reduction in the number of components thereof. Furthermore, the control circuit 8 may set a driving frequency for turning-on and turning-off control of the semiconductor switches 401a and 402a which constituting the inverter circuit 400 to be higher than a driving frequency for turning-on and turning-off control of the semiconductor switches 501a and 601a which do not constitute the inverter circuit 400, so as to control turning-on and turning-off of each of the semiconductor switches 401a, 402a, 501a and 601a. Also in this case, it is possible to further reduce losses of the semiconductor switches 401a and 402a which are driven at a high frequency and the semiconductor switches 501a and 601a which are driven at a low frequency and to miniaturize a cooling structure. Thus, it is possible to realize miniaturization of a power conversion device, a light weight power conversion device, and a reduction in the number of components thereof.

In addition, in Embodiment 4, the DC voltage Vc1 of the DC capacitor 403 is set to satisfy Expressions (12) and (13), and the inverter circuit 400 performs the overall current control in a state in which the semiconductor switch 601a is turned on only in the On phases. However, the control described in Embodiment 4 may be combined with the control, as described in Embodiment 2, in which the DC voltage Vc1 of the DC capacitor 403 of the inverter circuit 400 is set regardless of the constraints of Expressions (12) and (13), and the current control is performed by the semiconductor switch 601a instead of the inverter circuit 400 only in a case where Expressions (12) and (13) are not satisfied.

Embodiment 5

In Embodiment 4, two On phases and two Off phases of the semiconductor switch 601a are provided at the ¼ cycle, and thus the ripple voltage ΔVc2 of the smoothing capacitor 7 is adjusted. In the present embodiment, two On phases and a single Off phase of the semiconductor switch 601a are provided at the ¼ cycle, and thus a ripple voltage ΔVc1 of the DC capacitor 403 is adjusted. In addition, a circuit configuration in the present embodiment is the same as the circuit configuration of Embodiment 1.

Figure 39:
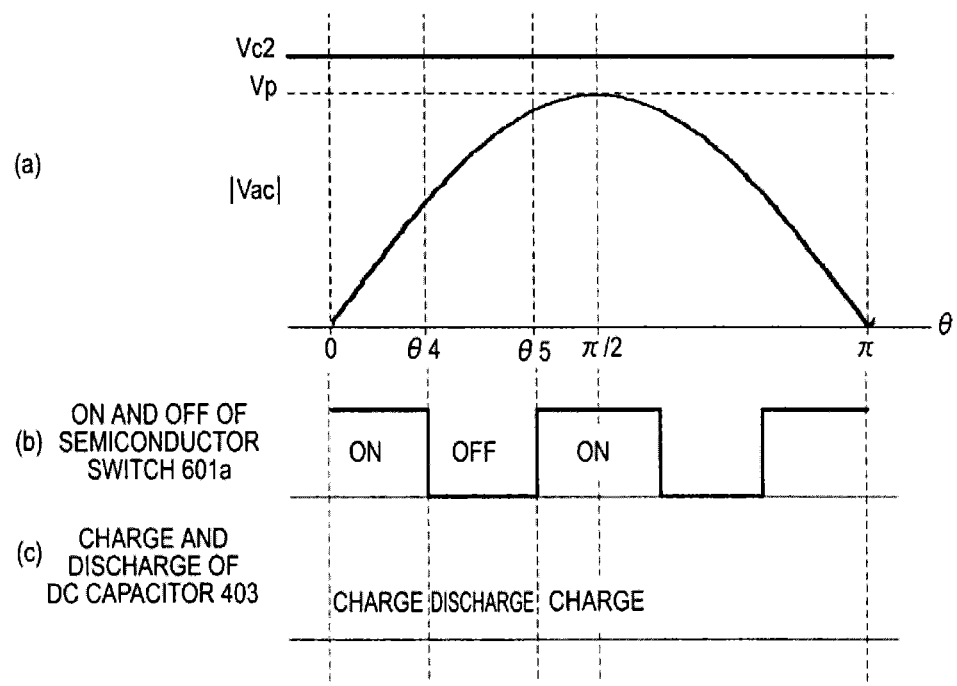
FIG. 39 illustrates waveforms of respective parts and charge and discharge of a DC capacitor of an inverter circuit, for explaining an operation of the power conversion device according to Embodiment 5 of the present invention.

Hereinafter, an operation principle of Embodiment 5 will be described. FIG. 39 illustrates waveforms of the respective parts and charge and discharge of the DC capacitor of the inverter circuit, for explaining an operation of the power conversion device. In FIG. 39, FIG. 39(a) illustrates a voltage waveform of the AC voltage Vac; FIG. 39(b) illustrates turned-on and turned-off states of the semiconductor switch 601a; and FIG. 39(c) illustrates charge and discharge states of the DC capacitor 403. In FIG. 39(b), a phase range 0 to θ4 is a first On period; a phase range θ4 to θ5 is a first Off period; and a phase range θ5 to π/2 is a second On period. The voltage phases θ4 and θ5 are set, and thus a length of each of the On period and the Off period is determined.

In the same manner as in Embodiment 1, the DC voltage Vc2 of the smoothing capacitor 7 of the output stage is higher than the peak voltage Vp of the AC voltage Vac of the AC power supply 1, and, FIG. 39 illustrates a state in which the DC voltage Vc2 of the smoothing capacitor 7 is controlled to be a given target voltage Vc2*. In addition, the AC voltage Vac which is output from the AC power supply 1 undergoes full-wave rectification in the diode rectifying circuit 200, and thus operates at a cycle which is twice the AC cycle of the AC power supply 1. The inverter circuit 400 controls and outputs the AC current Iac through PWM control so that an input power factor from the AC power supply 1 becomes about 1, and superimposes a generated voltage of the AC side on the AC voltage Vac which is output from the AC power supply 1. In addition, symmetric operations are performed with respect to the voltage phase π/2 in the phase range 0 to π/2 and the phase range π/2 to π. For this reason, herein, an operation of the power conversion device in the phase range 0 to π/2 will be described. In addition, the voltage phases θ4 and θ5 have a relationship of θ4<θ5.

First, a voltage phase of the AC power supply 1 is set to θ, and a description will be made of operations of the four semiconductor switches 401a, 402a, 501a and 601a in a case of 0≤θ<π in which a polarity of the AC voltage Vac is positive. Since full-wave rectification is performed by the diode rectifying circuit 200, also in a case of π<θ≤2π in which the polarity of the AC voltage is negative, the same operation as in a case of the positive polarity range 0≤θ<π is performed.

In a case where the semiconductor switches 402a and 601a are turned on, and the semiconductor switches 401a and 501a are turned off, as illustrated in FIG. 2, the AC current Iac flows so as to bypass the DC capacitor 403. In a case where the semiconductor switches 401a and 601a are turned on, and the semiconductor switches 402a and 501a are turned off, as illustrated in FIG. 3, the AC current Iac flows so as to charge the DC capacitor 403. In addition, in a case where the semiconductor switches 402a and 501a are turned on, and the semiconductor switches 401a and 601a are turned off, as illustrated in FIG. 4, the AC current Iac flows so as to discharge the DC capacitor 403. In a case where the semiconductor switches 401a and 501a are turned on, and the semiconductor switches 402a and 601a are turned off, as illustrated in FIG. 5, the AC current Iac flows so as to bypass the DC capacitor 403.

Through combinations of turning-on control and turning-off control of the four semiconductor switches, the semiconductor switches 401a, 402a, 501a and 601a are controlled so that the inverter circuit 400 is PWM-controlled. Therefore, the DC capacitor 403 is charged and discharged, and thus the current control is performed. In addition, when a current which flows through the semiconductor switches 401a and 501a flows from an emitter to a collector, the semiconductor switch elements may be turned off so that the current flow through the diodes 401b and 501b which are connected inversely in parallel thereto.

As illustrated in FIG. 39, the smoothing capacitor 7 is bypassed when the semiconductor switch 601a is in a turned-on state (fixed to a turned-on state) and the semiconductor switch 501a is in a turned-off state (fixed to a turned-off state) in the phase range ±θ4 centering on the zero-cross phase (θ=0 or π) and the phase range θ5 to π/2 of the AC voltage Vac of the AC power supply 1. The phase range 0 to θ4 and the phase range θ5 to π/2 are set as On phases. At this time, as illustrated in FIG. 2, the AC current Iac from the AC power supply 1 is limited by the reactor 3 so as to be input to the inverter circuit 400, and then returns to the AC power supply 1 through the semiconductor switch 601a. The reactor 3 is excited in the operation mode of FIG. 2, and the excitation of the reactor 3 is reset in the operation mode of FIG. 3. In addition, in a case of the operation mode of FIG. 2, the DC capacitor 403 is bypassed, and in a case of the operation mode of FIG. 3, the DC capacitor 403 is charged. Therefore, the inverter circuit 400 is PWM-controlled through a combination of the operation mode of FIG. 2 and the operation mode of FIG. 3. Thus, the DC capacitor 403 can be charged and the current control can be performed.

Next, as illustrated in FIG. 39, DC power is output to the smoothing capacitor 7 when the semiconductor switch 601a is in a turned-off state and the semiconductor switch 501a is in a turned-on state in the phase range θ4 to θ5 of the AC voltage Vac of the AC power supply 1. The phase range θ4 to θ5 is set as an Off phase. At this time, as illustrated in FIG. 4, the AC current Iac from the AC power supply 1 is limited by the reactor 3 so as to be input to the inverter circuit 400, then charges the smoothing capacitor 7 through the semiconductor switch 501a, and returns to the AC power supply 1. The inverter circuit 400 outputs a voltage (Vc2*−Vac), adds the output voltage (Vc2*−Vac) of the inverter circuit 400 to the AC power supply 1 by repeating the operation mode of FIG. 4 and the operation mode of FIG. 5, and controls the DC voltage Vc2 of the smoothing capacitor 7 to reach the target voltage Vc2* which is higher than the peak voltage of the AC power supply 1.

In the inverter circuit 400, the reactor 3 is excited in the operation mode of FIG. 4, and the excitation of the reactor 3 is reset in the operation mode of FIG. 5. In addition, in a case of the operation mode of FIG. 4, the DC capacitor 403 is discharged, and in a case of the operation mode of FIG. 5, the DC capacitor 403 is bypassed. Therefore, the inverter circuit 400 is PWM-controlled through a combination of the operation mode of FIG. 4 and the operation mode of FIG. 5. Thus, the current control can be performed.

As mentioned above, the control of the semiconductor switches 501a and 601a changes at the voltage phases θ4 and θ5 of the AC voltage Vac of the AC power supply 1, and the smoothing capacitor 7 is bypassed when the semiconductor switch 601a is in a turned-on state and the semiconductor switch 501a is in a turned-off state only in the phase range 0 to θ4 and the phase range θ5 to π/2. At this time, the control circuit 8 controls the inverter circuit 400 to generate substantially the same voltage as the AC voltage Vac having a reverse polarity, and also controls and outputs the AC current Iac so that the input power factor becomes about 1 to charge the DC capacitor 403.

In addition, the control circuit 8 controls the inverter circuit 400 to maintain the DC voltage Vc2 of the smoothing capacitor 7 to be the target voltage Vc2* when the semiconductor switch 501a is in a turned-on state and the semiconductor switch 601a is in a turned-off state in the phase range θ4 to θ5, and controls and outputs the AC current Iac so that the input power factor becomes about 1. At this time, the inverter circuit 400 generates a difference voltage (Vc2*−Vac) between the DC voltage of the smoothing capacitor 7 and the AC power supply, and the DC capacitor 403 is discharged.

In addition, an On period of the semiconductor switch 601a may be set so that energy of charge and energy of discharge of the DC capacitor 403 of the inverter circuit 400 are the same as each other, and an On phase may be determined. The charge energy of the DC capacitor 403 in the On period may be expressed as in Equation (18). The discharge energy of the DC capacitor 403 in the Off period may be expressed as in Equation (19). In addition, if the charge energy and the discharge energy of the DC capacitor 403 of the inverter circuit 400 is the same as each other, a relational expression between the target voltage Vc2* and the peak voltage Vp satisfies Equation (20). Here, Vp indicates a peak voltage of the AC voltage Vac, and Ip indicates a peak current of the AC current Iac.

[Math. 10]

$$P_{in} = \int_0^{\theta 4} V_P \sin\theta \cdot I_P \sin\theta d\theta + \int_{\theta 5}^{\pi/2} V_P \sin\theta \cdot I_P \sin\theta d\theta \quad (18)$$

[Math. 11]

$$P_{out} = \int_{\theta 4}^{\theta 5} (V_{dc} - V_P \sin\theta) \cdot I_P \sin\theta d\theta \quad (19)$$

[Math. 12]

$$V_{dc} = \frac{\pi V_P}{4(\cos\theta 4 - \cos\theta 5)} \quad (20)$$

However, a lower limit value of the target voltage Vc2* becomes the peak voltage Vp by the diode rectifying circuit 200, and thus if the voltage phases θ4 and θ5 are set which cause the target voltage Vc2* to be equal to or lower than the peak voltage Vp, this leads to an inoperable condition. As mentioned above, the target voltage Vc2* of the smoothing capacitor 7 is defined by the voltage phases θ4 and θ5 and can thus be controlled by changing the phase range 0 to θ5 and the phase range θ5 to π/2 which correspond to On phases. In addition, the DC voltage Vc2 of the smoothing capacitor 7 is controlled to track the target voltage Vc2*.

Further, the DC voltage Vc1 of the DC capacitor 403 of the inverter circuit 400 is set to be equal to or higher than a desired generated voltage of the inverter circuit 400 in each phase range of 0≤θ<θ4, θ4≤θ<θ5, and θ5≤θ<π/2. In this case, the DC voltage Vc2 of the smoothing capacitor 7 can be maintained to be the target voltage Vc2*, and it is possible to perform the current control of the inverter circuit 400 in which the AC current Iac is controlled so that the input power factor becomes about 1 with high reliability in the whole phases of the AC power supply 1. In this case, the DC voltage Vc1 of the DC capacitor 403 is required to be set so as to satisfy Expression (21) in the phase ranges 0≤θ<θ4 and θ5≤θ<π/2 and to satisfy Expression (22) in the phase ranges θ4≤θ<θ5.

$$Vc1 \geq Vp \cdot \sin\theta 4 \quad (21)$$

$$Vc1 \geq (|Vc2* - Vp \cdot \sin\theta 4|) \quad (22)$$

In addition, the DC voltage Vc1 of the DC capacitor 403 is set to be equal to or lower than the peak voltage Vp of the AC voltage Vac of the AC power supply 1. Since a loss increases if the DC voltage Vc1 of the DC capacitor 403 increases in the inverter circuit 400 which performs PWM control, the DC voltage Vc1 of the DC capacitor 403 is preferably set to be low in a condition satisfying Expressions (21) and (22).

In addition, since the semiconductor switch 601a is turned on and thus the smoothing capacitor 7 is bypassed only in the phase range 0≤θ<θ4 and the phase range θ5≤θ<π/2 (predetermined phase ranges), the control circuit 8 can control the inverter circuit 400 to control the AC current Iac so that the input power factor becomes about 1 in both periods in which the semiconductor switch 601a is turned on and is turned off, and to output DC power with a desired voltage to the smoothing capacitor 7. In other words, the control circuit 8 can determine the phase range 0 to θ4 and the phase range θ5 to π/2 which correspond to On phases in the predetermined phase ranges of the AC voltage of the AC power supply 1 so as to adjust an On period in which the semiconductor switch 601a is turned on, thereby adjusting the DC voltage Vc1 of the DC capacitor 403 to a predetermined voltage. By performing such control, it is possible to perform a self-sustaining operation without using an external power supply in the DC capacitor 403.

In addition, the semiconductor switch 401a is operated to have a polarity reverse to that of the semiconductor switch 402a. In other words, in a case where the semiconductor switch 402a is turned on, the semiconductor switch 401a is turned off, and in a case where the semiconductor switch 402a is turned off, the semiconductor switch 401a is turned on. However, since, in the semiconductor switch 401a, a current flows from the emitter to the collector at all times, the semiconductor switch 401a may be turned off so that a current flows through the diode 401b which is connected inversely in parallel thereto.

Figure 40:
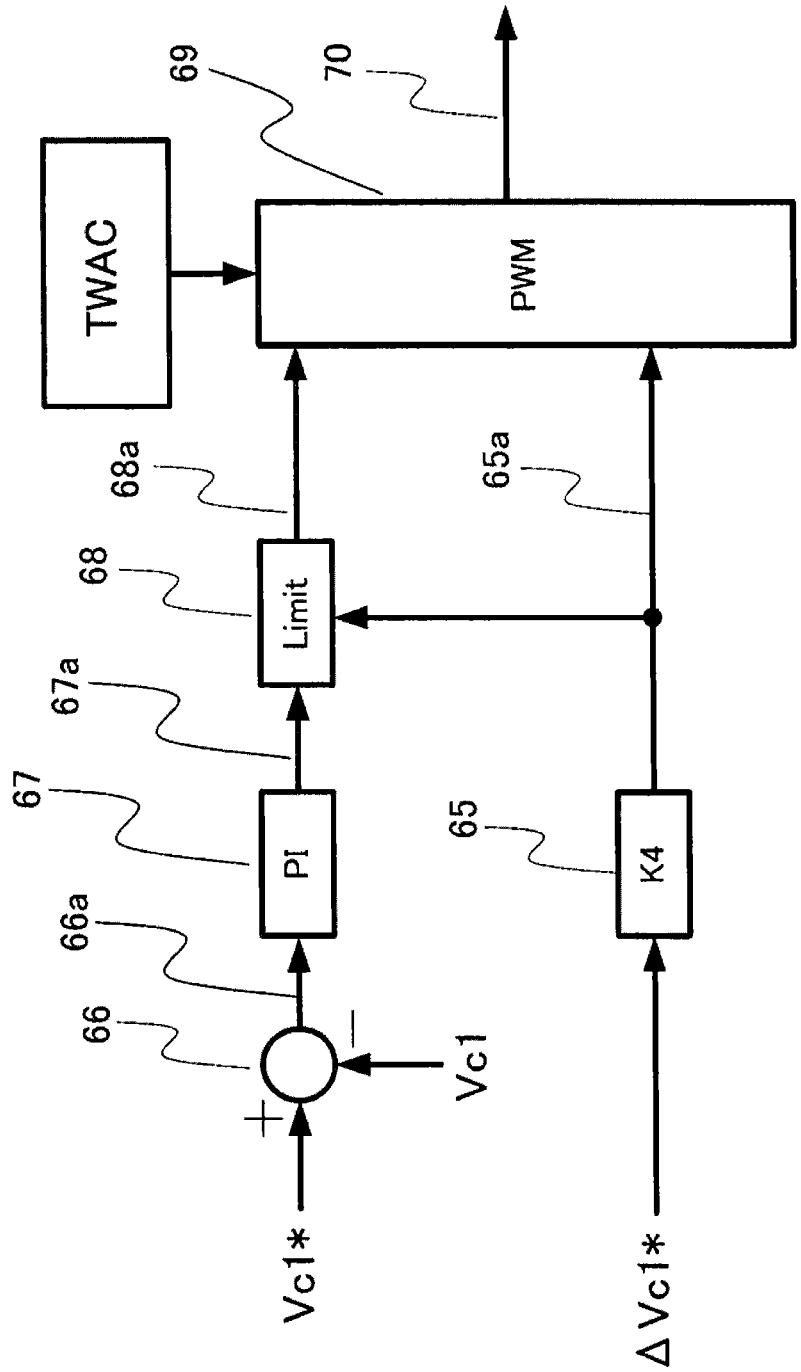
FIG. 40 is a control block diagram illustrating output control on a semiconductor switch according to Embodiment 5 of the present invention.

Next, an operation of the control circuit 8 will be described. Control of the inverter circuit 400 for performing input current power factor control is the same as in Embodiment 4. Herein, with reference to FIG. 40, a description will be made of control which is related to output of the semiconductor switches 501a and 601a, makes the DC voltage Vc1 of the DC capacitor 403 of the inverter circuit 400 track the command value Vc1*, and makes a ripple voltage ΔVc1 of the smoothing capacitor 7 adjusted to a predetermined target value ΔVc1*. FIG. 40 is a control block diagram illustrating output control on the semiconductor switch 601a, performed by the control circuit 8.

First, a ripple voltage in the phase range θ5 to π/2 is expressed as in Equation (23), and thus a gain multiplier 65 calculates a duty signal 65a corresponding to the voltage phase θ5 on the basis of the target ΔVc1*. A constant K4 in the gain multiplier 65 may be expressed as in Equation (24).

[Math. 13]

$$\frac{\Delta V_{C1}}{2} = \frac{I_p}{\omega \cdot C_1} \cos\theta 5 \quad (23)$$

[Math. 14]

$$K_4 = \frac{1}{\omega} \cos^{-1} \frac{\omega \cdot \Delta V_{C1}^* \cdot C_1}{2 \cdot I_P} \quad (24)$$

Next, a subtractor 66 obtains a difference 66a between the set command value Vc1* and a detected DC voltage Vc1. The difference 66a between the command value Vc1* and the DC voltage Vc1 is used as a feedback amount, and an output which is PI-controlled by a PI controller 67 is set as a voltage command 67a. The voltage command 67a is a duty signal corresponding to the voltage phase θ4 and is thus required to satisfy voltage phases 0<θ4<θ5 at all times. Therefore, a voltage signal 68a is generated by a limiter 68 which sets 0 in the voltage command 67a as a lower limit and sets the duty signal 65a therein as an upper limit.

A gate signal generator 69 generates a gate signal 70 of the semiconductor switch 601a, corresponding to PWM control by using the two duty signals 65a and 68a. In the PWM control by the gate signal generator 69, a triangular wave (triangular wave of AC power supply cycle TWAC) synchronized with a cycle which is the twice the frequency of the AC power supply 1 is used as a carrier wave, and, through comparative calculation, the duration of 0 to the duty signal 68a is set to the phase range 0 to θ4; the duration of the duty signal 68a to the duty signal 65a is set to the phase range θ4 to θ5; and the duration of the duty signal 65a to 1 is set to the phase range θ5 to π/2. In this case, an On signal is generated as the gate signal 70 in the phase range 0 to θ4 and the phase range θ5 to π/2, and an Off signal is generated as the gate signal 70 in the phase range θ4 to θ5. In other words, an On period of the semiconductor switch 601a is also controlled by the gate signal 70.

The semiconductor switch 501a is operated to have a polarity reverse to that of the semiconductor switch 601a. In other words, in a case where the semiconductor switch 601a is turned on, the semiconductor switch 501a is turned off, and in a case where the semiconductor switch 601a is turned off, the semiconductor switch 501a is turned on. However, since, in the semiconductor switch 501a, a current flows from the emitter to the collector at all times, the semiconductor switch 501a may be turned off so that a current flows through the diode 501b which is connected inversely in parallel thereto.

In the present embodiment, in addition to the features obtained with the configuration of Embodiment 4, since two On phases of the semiconductor switch 601a are provided at the ¼ cycle so that the phase range θ5 to π/2 which corresponds to an On phase is adjusted, and thus a ripple voltage of the DC capacitor 403 is positively adjusted, it is possible to minimize the ripple voltage of the DC capacitor 403 and thus to widen an operation voltage range of the power conversion device. Furthermore, since the ripple voltage is minimized and thus a necessary capacitor capacitance can be reduced, it is possible to omit the number of necessary capacitors which are connected in parallel and to realize miniaturization of a power conversion device, a light weight power conversion device, and a reduction in the number of components thereof.

In addition, in Embodiment 4, the DC voltage Vc1 of the DC capacitor 403 is set to satisfy Expressions (21) and (22), and the inverter circuit 400 performs the overall current control in a state in which the semiconductor switch 601a is turned on only in the On phases. However, the control described in Embodiment 4 may be combined with the control, as described in Embodiment 2, in which the DC voltage Vc1 of the DC capacitor 403 of the inverter circuit 400 is set regardless of the constraints of Expressions (21) and (22), and the current control is performed by the semiconductor switch 601a instead of the inverter circuit 400 only in a case where Expressions (21) and (22) are not satisfied.

Embodiment 6

In Embodiment 3, a single On phase and a single Off phase of the semiconductor switch 601a are provided at a ¼ cycle of the AC voltage Vac of the AC power supply 1. Embodiment 6 is different from Embodiment 3 in that two On phases and two Off phases of the semiconductor switch 601a are provided at the ¼ cycle. In addition, a circuit configuration of Embodiment 6 is the same as that illustrated in FIG. 14 of Embodiment 3, and a relationship between an operation of the power conversion device and a current path is also the same as that illustrated in FIGS. 15 to 22 and FIGS. 24 to 31.

Figure 41:
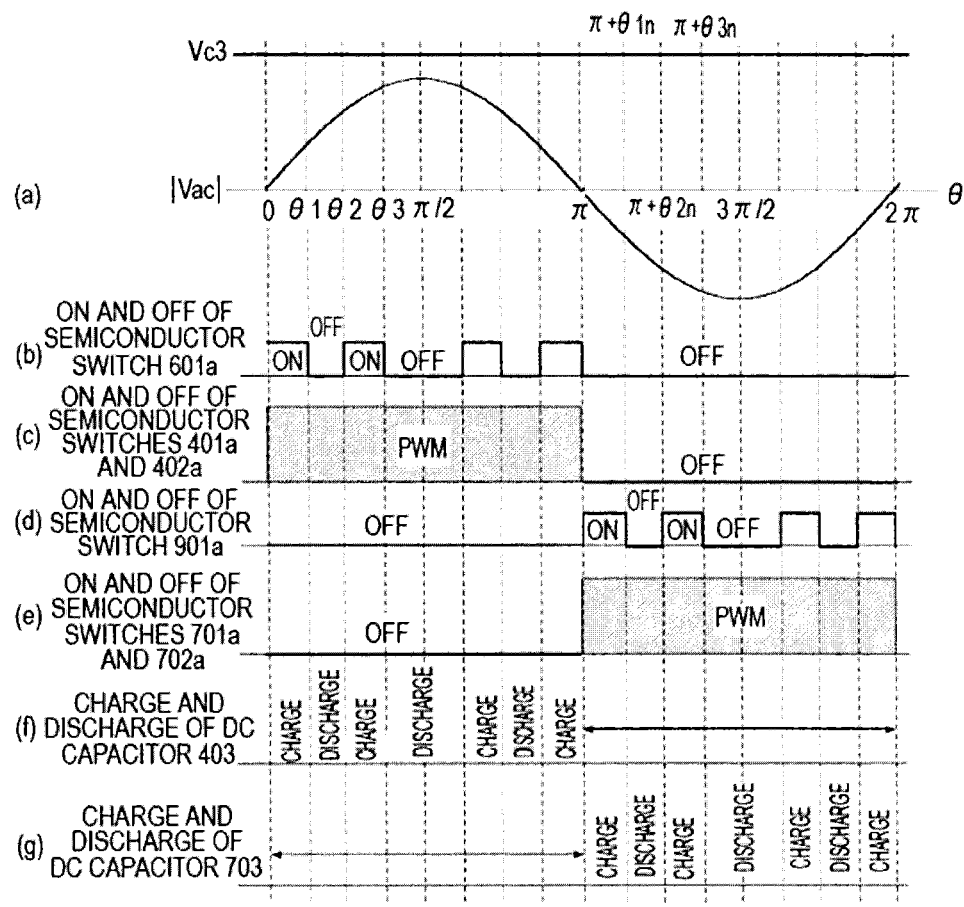
FIG. 41 illustrates waveforms of respective parts and charge and discharge of a DC capacitor of an inverter circuit, for explaining a powering operation of the power conversion device according to Embodiment 6 of the present invention.

First, a description will be made of a powering operation of the power conversion device with this configuration, that is, an operation of outputting DC power to the smoothing capacitor 10. FIG. 41 illustrates waveforms of the respective parts and charge and discharge of the DC capacitors 403 and 703 of the inverter circuits 400 and 700, for explaining a powering operation of the power conversion device. In FIG. 41, FIG. 41(a) illustrates a voltage waveform of the AC voltage Vac; FIG. 41(b) illustrates turned-on and turned-off states of the semiconductor switch 601a; FIG. 41(c) illustrates turned-on and turned-off states of the semiconductor switches 401a and 402a; FIG. 41(d) illustrates turned-on and turned-off states of the semiconductor switch 901a; FIG. 41(e) illustrates turned-on and turned-off states of the semiconductor switches 701a and 702a; FIG. 41(f) illustrates charge and discharge states of the DC capacitor 403; and FIG. 41(g) illustrates charge and discharge states of the DC capacitor 703. In FIGS. 41(f) and 41(g), ranges indicated by arrows are periods in which charge and discharge are not performed. In FIG. 41 (b), a phase range 0 to θ1 is a first On period, a phase range θ1 to θ2 is a first Off period, a phase range θ2 to θ3 is a second On period, and a phase range θ3 to π/2 is a second Off period. The voltage phases θ1, θ2 and θ3 are set, and thus a length of each of the On period and the Off period is determined.

In addition, the DC voltage Vc3 of the smoothing capacitor 10 of the output stage is higher than the peak voltage Vp of the AC voltage Vac of the AC power supply 1, and FIG. 41 illustrates a state in which the DC voltage Vc3 of the smoothing capacitor 10 is controlled to be a given target voltage Vc3*. In the present embodiment, in a case where a polarity of the AC voltage Vac of the AC power supply 1 is positive, output control on the semiconductor switches 501a and 601a and the semiconductor switches 401a and 402a constituting the inverter circuit 400 is performed, so that the semiconductor switches 701a, 702a, 801a and 901a are turned off. In a case where a polarity of the AC voltage Vac of the AC power supply 1 is negative, output control on the semiconductor switches 801a and 901a and the semiconductor switches 701a and 702a constituting the inverter circuit 700 is performed, and the semiconductor switches 401a, 402a, 501a and 601a are turned off.

First, a voltage phase of the AC power supply 1 is set to θ, and a description will be made of operations of the four semiconductor switches 401a, 402a, 501a and 601a and current paths in a case of 0≤θ<π in which a polarity of the AC voltage Vac of the AC power supply 1 is positive. As illustrated in FIG. 15, in a case where the semiconductor switches 402a and 601a are turned on, and the semiconductor switches 401a and 501a are turned off, the AC current Iac flows so as to bypass the DC capacitor 403. As illustrated in FIG. 16, in a case where the semiconductor switches 401a and 601a are turned on, and the semiconductor switches 402a and 501a are turned off, the AC current Iac flows so as to charge the DC capacitor 403. In addition, as illustrated in FIG. 17, in a case where the semiconductor switches 402a and 501a are turned on, and the semiconductor switches 401a and 601a are turned off, the AC current Iac flows so as to discharge the DC capacitor 403. As illustrated in FIG. 18, in a case where the semiconductor switches 401a and 501a are turned on, and the semiconductor switches 402a and 601a are turned off, the AC current Iac flows so as to bypass the DC capacitor 403.

Through combinations of operation modes of the four semiconductor switches, the inverter circuit 400 is PWM-controlled. Therefore, it is possible to perform high power factor control of the AC power supply 1 and charge and discharge control of the DC capacitor 403. In addition, a current which flows through the inverter circuit 700 side flows through the diode 901b and the diode 702b, but may be controlled to flow through the semiconductor switches 901a and 702a by appropriately turning-on and turning-off the semiconductor switches 901a and 702a.

Next, a voltage phase of the AC power supply 1 is set to θ, and a description will be made of operations of the four semiconductor switches 701a, 702a, 801a and 901a and current paths in a case of π≤θ<2π in which a polarity of the AC voltage Vac of the AC power supply 1 is negative. As illustrated in FIG. 19, in a case where the semiconductor switches 702a and 901a are turned on, and the semiconductor switches 701a and 801a are turned off, the AC current Iac flows so as to bypass the DC capacitor 703. As illustrated in FIG. 20, in a case where the semiconductor switches 701a and 901a are turned on, and the semiconductor switches 702a and 801a are turned off, the AC current Iac flows so as to charge the DC capacitor 703. In addition, as illustrated in FIG. 21, in a case where the semiconductor switches 702a and 801a are turned on, and the semiconductor switches 701a and 901a are turned off, the AC current Iac flows so as to discharge the DC capacitor 703. As illustrated in FIG. 22, in a case where the semiconductor switches 701a and 801a are turned on, and the semiconductor switches 702a and 901a are turned off, the AC current Iac flows so as to bypass the DC capacitor 703.

Through combinations of operation modes of the four semiconductor switches, the inverter circuit 700 is PWM-controlled. Therefore, it is possible to perform high power factor control of the AC power supply 1 and charge and discharge control of the DC capacitor 703. In addition, a current which flows through the inverter circuit 400 side flows through the diode 601b and the diode 402b, but may be controlled to flow through the semiconductor switches 601a and 402a by appropriately turning-on and turning-off the semiconductor switches 601a and 402a.

As illustrated in FIG. 41, in a case where a polarity of the AC voltage Vac of the AC power supply 1 is positive, the smoothing capacitor 10 is bypassed in a state in which the semiconductor switch 601a is turned on and the semiconductor switch 501a (not illustrated) is turned off in a phase range of the zero-cross phase to θ1 and a phase range of θ2 to θ3 of the AC voltage Vac of the AC power supply 1, that is, the phase range 0 to θ1 and the phase range θ2 to θ3. In addition, PWM control for alternately turning on and turning off the semiconductor switches 401a and 402a of the inverter circuit 400 is performed (the operation mode of FIG. 15 and the operation mode of FIG. 16 are alternately performed).

With this control, the current from the AC power supply 1 is limited by the positive side reactor 2 and the negative side reactor 3 so as to be input to the inverter circuit 400, and then returns to the AC power supply 1 from the inverter circuit 400 through the diode 901b and the diode 702b (or the semiconductor switches 901a and 702a). At this time, the positive side reactor 2 and the negative side reactor 3 are excited in the operation mode of FIG. 15, and the excitation of the positive side reactor 2 and the negative side reactor 3 is reset in the operation mode of FIG. 16. In addition, the DC capacitor 403 is bypassed in the operation mode of FIG. 15, and the DC capacitor 403 is charged in the operation mode of FIG. 16. Therefore, the inverter circuit 400 is PWM-controlled through a combination of the operation mode of FIG. 15 and the operation mode of FIG. 16. Thus, the DC capacitor 403 can be charged and the high power factor control of the AC power supply 1 can be performed.

Next, as illustrated in FIG. 41, in a case where a polarity of the AC voltage Vac of the AC power supply 1 is positive, DC power is output to the smoothing capacitor 10 in a state in which the semiconductor switch 601a is turned off and the semiconductor switch 501a (not illustrated) is turned on in the phase range θ1 to θ2 and the phase range θ3 to π/2. In addition, PWM control for alternately turning on and turning off the semiconductor switches 401a and 402a of the inverter circuit 400 is performed (the operation mode of FIG. 17 and the operation mode of FIG. 18 are alternately performed).

With this control, the current from the AC power supply 1 is limited by the positive side reactor 2 and the negative side reactor 3 so as to be input to the inverter circuit 400, then charges the smoothing capacitor 10 from the inverter circuit 400 through the semiconductor switch 501a, and then returns to the AC power supply 1 through the diode 901b and the diode 702b (or the semiconductor switches 901a and 702a). At this time, the inverter circuit 400 outputs a voltage (Vc4*−Vac) and repeatedly performs the operation mode of FIG. 17 and the operation mode of FIG. 18 so as to add an output voltage of the inverter circuit 400 to the AC voltage Vac of the AC power supply 1, and controls the voltage Vc3 of the smoothing capacitor 10 so that the target voltage Vc3* higher than the peak voltage of the AC power supply 1 is obtained.

In the inverter circuit 400, the positive side reactor 2 and the negative side reactor 3 are excited in the operation mode of FIG. 17, and the excitation of the positive side reactor 2 and the negative side reactor 3 is reset in the operation mode of FIG. 18. In addition, the DC capacitor 403 is discharged in the operation mode of FIG. 17, and the DC capacitor 403 is bypassed in the operation mode of FIG. 18. Therefore, the inverter circuit 400 is PWM-controlled through a combination of the operation mode of FIG. 17 and the operation mode of FIG. 18. Thus, the DC capacitor 403 can be discharged and the high power factor control of the AC power supply 1 can be performed.

Next, as illustrated in FIG. 41, in a case where a polarity of the AC voltage Vac of the AC power supply 1 is negative, the smoothing capacitor 10 is bypassed in a state in which the semiconductor switch 901a is turned on and the semiconductor switch 801a (not illustrated) is turned off in a phase range of the zero-cross phase to θ1n and a phase range of θ2n to θ3n of the AC voltage Vac of the AC power supply 1, that is, the phase range π to (π+θ1n) and the phase range (π+θ2n) to (π+θ3n). In addition, PWM control for alternately turning on and turning off the semiconductor switches 701a and 702a of the inverter circuit 700 is performed (the operation mode of FIG. 19 and the operation mode of FIG. 20 are alternately performed).

By performing this control, the current from the AC power supply 1 is limited by the positive side reactor 2 and the negative side reactor 3 so as to be input to the inverter circuit 700, and then returns to the AC power supply 1 from the inverter circuit 700 through the diode 601b and the diode 402b (or the semiconductor switches 601a and 402a). At this time, the positive side reactor 2 and the negative side reactor 3 are excited in the operation mode of FIG. 19, and the excitation of the positive side reactor 2 and the negative side reactor 3 is reset in the operation mode of FIG. 20. In addition, the DC capacitor 703 is bypassed in the operation mode of FIG. 19, and the DC capacitor 703 is charged in the operation mode of FIG. 20. Therefore, the inverter circuit 700 is PWM-controlled through a combination of the operation mode of FIG. 19 and the operation mode of FIG. 20. Thus, the DC capacitor 703 can be charged and the high power factor control of the AC power supply 1 can be performed.

Next, as illustrated in FIG. 41, in a case where a polarity of the AC voltage Vac of the AC power supply 1 is negative, DC power is output to the smoothing capacitor 10 in a state in which the semiconductor switch 901a is turned off and the semiconductor switch 801a (not illustrated) is turned on in the phase range $(\pi+\theta 1n)$ to $(\pi+\theta 2n)$ and the phase range $(\pi+\theta 3n)$ to $2\pi$. In addition, PWM control for alternately turning on and turning off the semiconductor switches 701a and 702a of the inverter circuit 700 is performed (the operation mode of FIG. 21 and the operation mode of FIG. 22 are alternately performed).

By performing this control, the current from the AC power supply 1 is limited by the positive side reactor 2 and the negative side reactor 3 so as to be input to the inverter circuit 700, then charges the smoothing capacitor 10 from the inverter circuit 700 through the semiconductor switch 801a, and then returns to the AC power supply 1 through the diode 601b and the diode 402b (or the semiconductor switches 601a and 402a). At this time, the inverter circuit 700 outputs a voltage (Vc5*−Vac) and repeatedly performs the operation mode of FIG. 21 and the operation mode of FIG. 22 so as to add an output voltage of the inverter circuit 700 to the AC voltage Vac of the AC power supply 1, and controls the voltage Vc3 of the smoothing capacitor 10 so that the target voltage Vc3* higher than the peak voltage of the AC power supply 1 is obtained.

In the inverter circuit 700, the positive side reactor 2 and the negative side reactor 3 are excited in the operation mode of FIG. 21, and the excitation of the positive side reactor 2 and the negative side reactor 3 is reset in the operation mode of FIG. 22. In addition, the DC capacitor 703 is discharged in the operation mode of FIG. 21, and the DC capacitor 703 is bypassed in the operation mode of FIG. 22. Therefore, the inverter circuit 700 is PWM-controlled through a combination of the operation mode of FIG. 21 and the operation mode of FIG. 22. Thus, the DC capacitor 703 can be discharged and the high power factor control of the AC power supply 1 can be performed.

Figure 42:
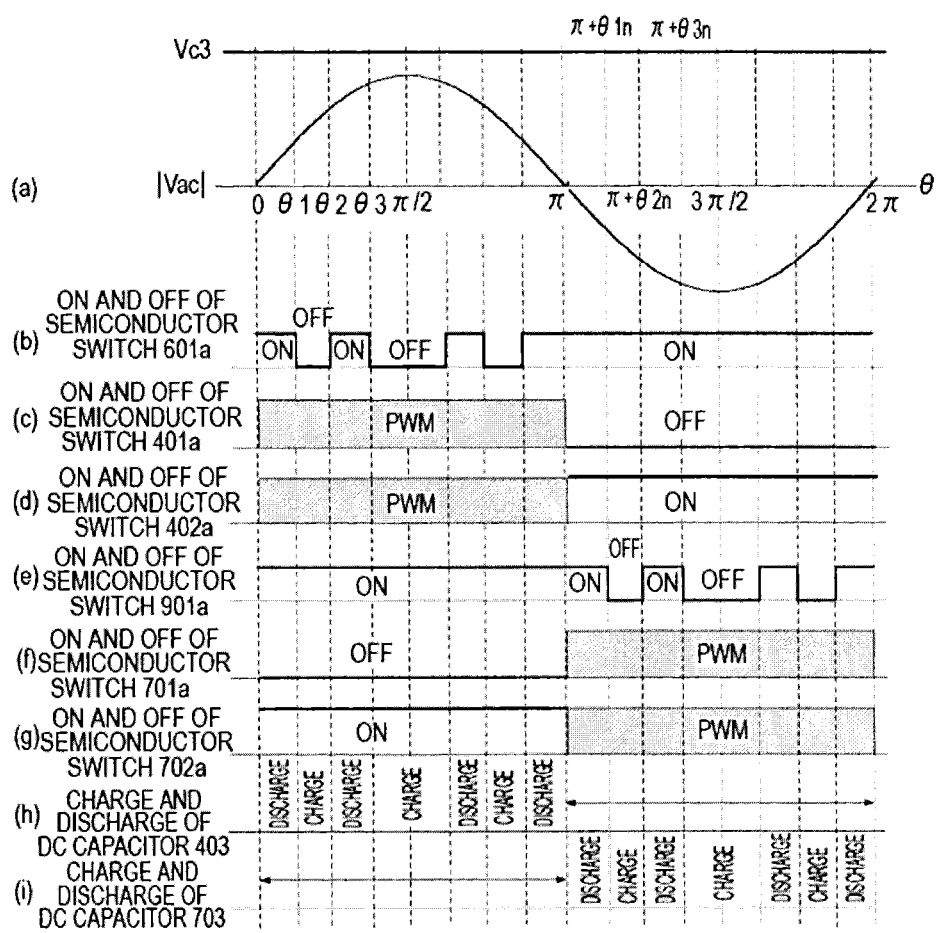
FIG. 42 illustrates waveforms of respective parts and charge and discharge of a DC capacitor of an inverter circuit, for explaining a regenerative operation of the power conversion device according to Embodiment 6 of the present invention.

Next, a description will be made of a regenerative operation of the power conversion device, that is, an operation of outputting AC power to the AC power supply 1. FIG. 42 illustrates waveforms of the respective parts and charge and discharge of the DC capacitors 403 and 703 of the inverter circuits 400 and 700, for explaining a regenerative operation of the power conversion device. In FIG. 42, FIG. 42(a) illustrates a voltage waveform of the AC voltage Vac; FIG. 42 (b) illustrates turned-on and turned-off states of the semiconductor switch 601a; FIG. 42(c) illustrates turned-on and turned-off states of the semiconductor switch 401a; FIG. 42(d) illustrates turned-on and turned-off states of the semiconductor switch 402a; FIG. 42(e) illustrates turned-on and turned-off states of the semiconductor switch 901a; FIG. 42(f) illustrates turned-on and turned-off states of the semiconductor switch 701a; FIG. 42(g) illustrates turned-on and turned-off states of the semiconductor switch 702a; FIG. 42(h) illustrates charge and discharge states of the DC capacitor 403; and FIG. 42(i) illustrates charge and discharge states of the DC capacitor 703. In FIGS. 42(h) and 42(i), ranges indicated by arrows are periods in which charge and discharge are not performed.

In addition, the DC voltage Vc3 of the smoothing capacitor 10 of the output stage is higher than the peak voltage Vp of the AC voltage Vac of the AC power supply 1, and FIG. 42 illustrates a state in which the DC voltage Vc3 of the smoothing capacitor 10 is controlled to be a given target voltage Vc3*. In the present embodiment, in a case where a polarity of the AC voltage Vac of the AC power supply 1 is positive, output control on the semiconductor switches 501a and 601a and the semiconductor switches 401a and 402a constituting the inverter circuit 400 is performed, so that the semiconductor switch 901a, and the semiconductor switch 702a constituting the inverter circuit 700 are turned on, and the semiconductor switch 801a, and the semiconductor switch 701a constituting the inverter circuit 700 are turned off.

In a case where a polarity of the AC voltage Vac of the AC power supply 1 is negative, output control on the semiconductor switches 801a and 901a and the semiconductor switches 701a and 702a constituting the inverter circuit 700 is performed, so that the semiconductor switch 601a, and the semiconductor switch 402a constituting the inverter circuit 400 are turned on, and the semiconductor switch 501a, and the semiconductor switch 401a constituting the inverter circuit 400 are turned off.

First, a voltage phase of the AC power supply 1 is set to θ, and a description will be made of operations of the four semiconductor switches 401a, 402a, 501a and 601a and current paths in a case of $0 \leq \theta < \pi$ in which a polarity of the AC voltage Vac of the AC power supply 1 is positive. As illustrated in FIG. 24, in a case where the semiconductor switches 402a and 601a are turned on, and the semiconductor switches 401a and 501a are turned off, the AC current Iac flows so as to bypass the DC capacitor 403. As illustrated in FIG. 25, in a case where the semiconductor switches 401a and 601a are turned on, and the semiconductor switches 402a and 501a are turned off, the AC current Iac flows so as to discharge the DC capacitor 403. In addition, as illustrated in FIG. 26, in a case where the semiconductor switches 402a and 501a are turned on, and the semiconductor switches 401a and 601a are turned off, the AC current Iac flows so as to charge the DC capacitor 403. As illustrated in FIG. 27, in a case where the semiconductor switches 401a and 501a are turned on, and the semiconductor switches 402a and 601a are turned off, the AC current Iac flows so as to bypass the DC capacitor 403. In the four operation modes, the semiconductor switches 702a and 901a are normally turned on. Through combinations of operation modes of the four semiconductor switches, the inverter circuit 400 is PWM-controlled. Therefore, it is possible to perform high power factor control of the AC power supply 1 and charge and discharge control of the DC capacitor 403.

Next, a voltage phase of the AC power supply 1 is set to θ, and a description will be made of operations of the four semiconductor switches 701a, 702a, 801a and 901a and current paths in a case of $\pi \leq \theta < 2\pi$ in which a polarity of the AC voltage Vac of the AC power supply 1 is negative. As illustrated in FIG. 28, in a case where the semiconductor switches 702a and 901a are turned on, and the semiconductor switches 701a and 801a are turned off, the AC current Iac flows so as to bypass the DC capacitor 703. As illustrated in FIG. 29, in a case where the semiconductor switches 701a and 901a are turned on, and the semiconductor switches 702a and 801a are turned off, the AC current Iac flows so as to discharge the DC capacitor 703. In addition, as illustrated in FIG. 30, in a case where the semiconductor switches 702a and 801a are turned on, and the semiconductor switches 701a and 901a are turned off, the AC current Iac flows so as to charge the DC capacitor 703. As illustrated in FIG. 31, in a case where the semiconductor switches 701a and 801a are turned on, and the semiconductor switches 702a and 901a are turned off, the AC current Iac flows so as to bypass the DC capacitor 703. In the four operation modes, the semiconductor switches 402a and 601a are normally turned on. Through combinations of operation modes of the four semiconductor switches, the inverter circuit 400 is PWM-controlled. Therefore, it is possible to perform high power factor control of the AC power supply 1 and charge and discharge control of the DC capacitor 703.

As illustrated in FIG. 42, in a case where a polarity of the AC voltage Vac of the AC power supply 1 is positive, the smoothing capacitor 10 is bypassed in a state in which the semiconductor switch 601a is turned on and the semiconductor switch 501a (not illustrated) is turned off in a phase range of the zero-cross phase to θ1 and a phase range of θ2 to θ3 of the AC voltage Vac of the AC power supply 1, that is, the phase range 0 to θ1 and the phase range θ2 to θ3. In addition, PWM control for alternately turning on and turning off the semiconductor switches 401a and 402a of the inverter circuit 400 is performed (the operation mode of FIG. 24 and the operation mode of FIG. 25 are alternately performed).

By performing this control, the current from the AC power supply 1 is limited by the positive side reactor 2 and the negative side reactor 3, and is input to the inverter circuit 400 through the semiconductor switches 702a and 901a via the semiconductor switch 601a. At this time, the positive side reactor 2 and the negative side reactor 3 are excited in the operation mode of FIG. 24, and the excitation of the positive side reactor 2 and the negative side reactor 3 is reset in the operation mode of FIG. 25. In addition, the DC capacitor 403 is bypassed in the operation mode of FIG. 24, and the DC capacitor 403 is discharged in the operation mode of FIG. 25. Therefore, the inverter circuit 400 is PWM-controlled through a combination of the operation mode of FIG. 24 and the operation mode of FIG. 25. Thus, the DC capacitor 403 can be discharged and the high power factor control of the AC power supply 1 can be performed.

Next, as illustrated in FIG. 42, in a case where a polarity of the AC voltage Vac of the AC power supply 1 is positive, DC power is output to the smoothing capacitor 10 in a state in which the semiconductor switch 601a is turned off and the semiconductor switch 501a (not illustrated) is turned on in the phase range θ1 to θ2 and the phase range θ3 to π/2. In addition, PWM control for alternately turning on and turning off the semiconductor switches 401a and 402a of the inverter circuit 400 is performed (the operation mode of FIG. 26 and the operation mode of FIG. 27 are alternately performed).

By performing this control, the current from the smoothing capacitor 10 is limited by the positive side reactor 2 and the negative side reactor 3, and is input to the inverter circuit 400 via the semiconductor switch 501a so as to be regenerated in the AC power supply 1. The current from the AC power supply 1 flows toward the smoothing capacitor 10 via the semiconductor switches 702a and 901a. At this time, the inverter circuit 400 outputs a voltage (Vc4*−Vac) and repeatedly performs the operation mode of FIG. 26 and the operation mode of FIG. 27 so as to add an output voltage of the inverter circuit 400 to the AC power supply 1, and controls the voltage Vc3 of the smoothing capacitor 10 so that the target voltage Vc3* higher than the peak voltage of the AC power supply 1 is obtained.

In the inverter circuit 400, the positive side reactor 2 and the negative side reactor 3 are excited in the operation mode of FIG. 26, and the excitation of the positive side reactor 2 and the negative side reactor 3 is reset in the operation mode of FIG. 27. In addition, the DC capacitor 403 is charged in the operation mode of FIG. 26, and the DC capacitor 403 is bypassed in the operation mode of FIG. 27. Therefore, the inverter circuit 400 is PWM-controlled through a combination of the operation mode of FIG. 26 and the operation mode of FIG. 27. Thus, the DC capacitor 403 can be charged and the high power factor control of the AC power supply 1 can be performed.

Next, as illustrated in FIG. 42, in a case where a polarity of the AC voltage Vac of the AC power supply 1 is negative, the smoothing capacitor 10 is bypassed in a state in which the semiconductor switch 901a is turned on and the semiconductor switch 801a (not illustrated) is turned off in a phase range of the zero-cross phase to θ1n and a phase range of θ2n to θ3n of the AC voltage Vac of the AC power supply 1, that is, the phase range π to (π+θ1n) and the phase range (π+θ2n) to (π+θ3n). In addition, PWM control for alternately turning on and turning off the semiconductor switches 701a and 702a of the inverter circuit 700 is performed (the operation mode of FIG. 28 and the operation mode of FIG. 29 are alternately performed).

By performing this control, the current from the smoothing capacitor 10 is limited by the positive side reactor 2 and the negative side reactor 3, and is input to the inverter circuit 700 so as to return to the AC power supply 1. At this time, the positive side reactor 2 and the negative side reactor 3 are excited in the operation mode of FIG. 28, and the excitation of the positive side reactor 2 and the negative side reactor 3 is reset in the operation mode of FIG. 29. In addition, the DC capacitor 703 is bypassed in the operation mode of FIG. 28, and the DC capacitor 703 is discharged in the operation mode of FIG. 29. Therefore, the inverter circuit 700 is PWM-controlled through a combination of the operation mode of FIG. 28 and the operation mode of FIG. 29. Thus, the DC capacitor 703 can be discharged and the high power factor control of the AC power supply 1 can be performed.

Next, as illustrated in FIG. 42, in a case where a polarity of the AC voltage Vac of the AC power supply 1 is negative, DC power is output to the smoothing capacitor 10 in a state in which the semiconductor switch 901a is turned off and the semiconductor switch 801a (not illustrated) is turned on in the phase range (π+θ1n) to (π+θ2n) and the phase range (π+θ3n) to 3π/2. In addition, PWM control for alternately turning on and turning off the semiconductor switches 701a and 702a of the inverter circuit 700 is performed (the operation mode of FIG. 30 and the operation mode of FIG. 31 are alternately performed).

By performing this control, the current from the smoothing capacitor 10 is limited by the positive side reactor 2 and the negative side reactor 3 so as to be input to the inverter circuit 700, and then returns to the AC power supply 1 from the inverter circuit 700. At this time, the inverter circuit 700 outputs a voltage (Vc5*−Vac) and repeatedly performs the operation mode of FIG. 30 and the operation mode of FIG. 31 so as to add an output voltage of the inverter circuit 700 to the AC voltage Vac of the AC power supply 1, and controls the voltage Vc3 of the smoothing capacitor 10 so that the target voltage Vc3* higher than the peak voltage of the AC power supply 1 is obtained.

In the inverter circuit 700, the positive side reactor 2 and the negative side reactor 3 are excited in the operation mode of FIG. 30, and the excitation of the positive side reactor 2 and the negative side reactor 3 is reset in the operation mode of FIG. 31. In addition, the DC capacitor 703 is charged in the operation mode of FIG. 30, and the DC capacitor 703 is bypassed in the operation mode of FIG. 31. Therefore, the inverter circuit 700 is PWM-controlled through a combination of the operation mode of FIG. 30 and the operation mode of FIG. 31. Thus, the DC capacitor 703 can be charged and the high power factor control of the AC power supply 1 can be performed.

Regardless of the powering operation or the regenerative operation of the power conversion device, an On period of the semiconductor switch 601a is adjusted in a case where a polarity of the AC voltage Vac of the AC power supply 1 is positive, and thus the DC voltage Vc4 of the DC capacitor 403 of the inverter circuit 400 can be maintained to be a constant voltage. In addition, an On period of the semiconductor switch 901a is adjusted in a case where a polarity of the AC voltage Vac of the AC power supply 1 is negative, and thus the DC voltage Vc5 of the DC capacitor 703 of the inverter circuit 700 can be maintained to be a constant voltage.

In the driving method, a relationship between the AC voltage Vac of the AC power supply 1 and the DC voltage Vc3 of the smoothing capacitor 10 is expressed as in Equation (1) in the same manner as in Embodiment 1. However, the target voltage Vc2* of Equation (1) is required to be replaced with the target voltage Vc3*. In addition, in relation to an establishment condition of current control, Expressions (5) and (6) described in Embodiment 3 are required to be satisfied in a case where current control is performed by the inverter circuit 400, and Expressions (7) and (8) described in Embodiment 3 are required to be satisfied in a case where current control is performed by the inverter circuit 700.

In the above-described driving method, in a case where the establishment conditions (Expressions (5) to (8)) of the current control are not satisfied, the current control can be continuously performed by changing the current control by the inverter circuits 400 and 700 to that by the semiconductor switches 601a and 901a in the same manner as in the control method described in Embodiment 2.

In addition, current control by the semiconductor switches 601a and 901a in a powering operation and current control performed by turning-on and turning-off the semiconductor switches 501a, 601a, 801a and 901a in a regenerative operation are the same as described in Embodiment 3. Further, output control on the inverter circuits 400 and 700 is the same as described in Embodiment 3.

Figure 43:
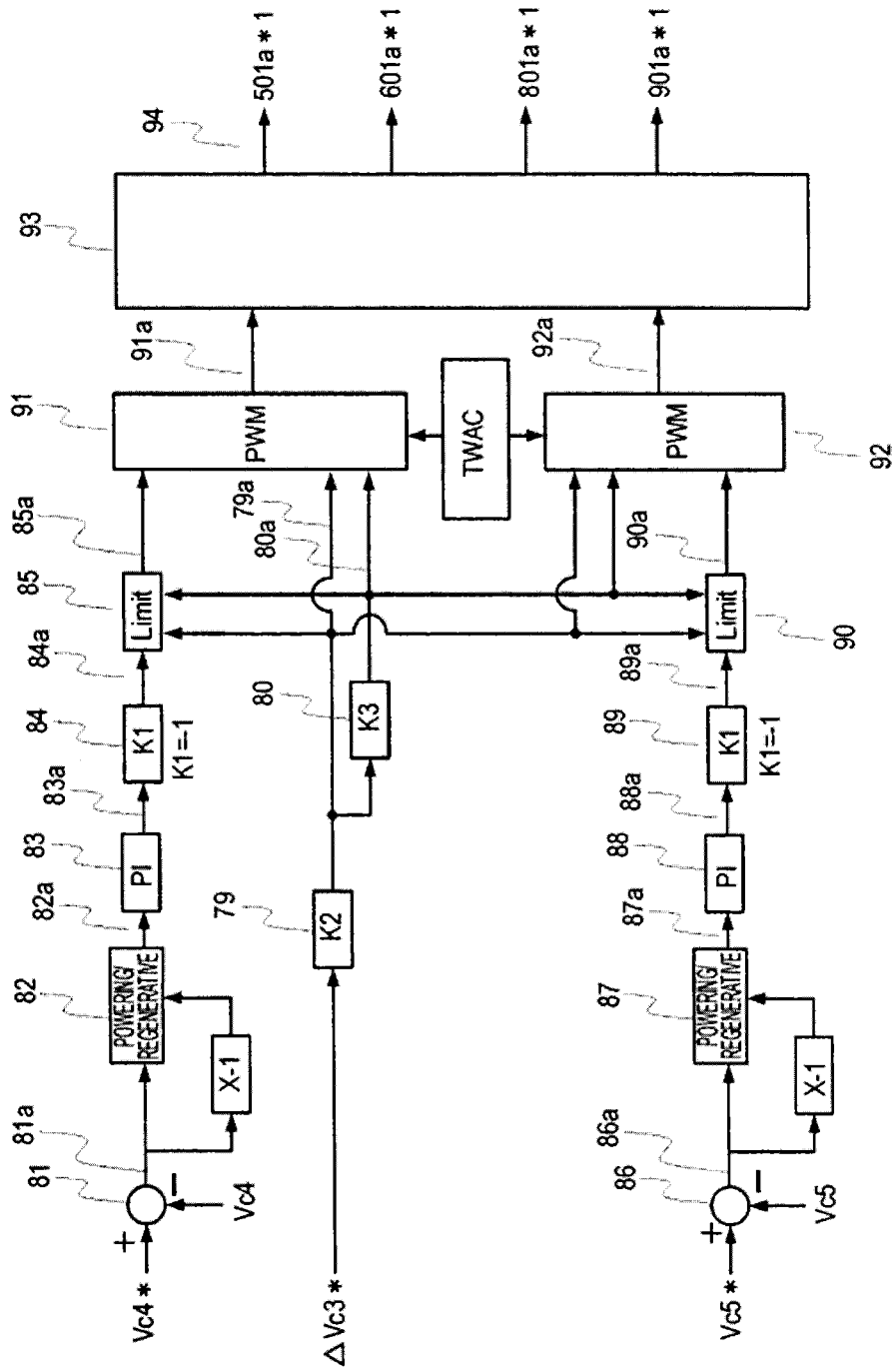
FIG. 43 is a control block diagram illustrating output control on a semiconductor switch according to Embodiment 6 of the present invention.

Next, a description will be made of control which is related to output of the semiconductor switches 501a, 601a, 801a and 901a, makes the DC voltage Vc4 of the DC capacitor 403 of the inverter circuit 400 track the command value Vc4*, makes the DC voltage Vc5 of the DC capacitor 703 of the inverter circuit 700 track the command value Vc5*, and makes a ripple voltage ΔVc3 of the smoothing capacitor 10 adjusted to a predetermined target value ΔVc3*. FIG. 43 is a control block diagram illustrating output control on the semiconductor switches 501a, 601a, 801a and 901a, performed by the control circuit 11.

First, a ripple voltage in the phase range 0 to θ1 is expressed as in Equation (25), and a ripple voltage in the phase range θ3 to π/2 is expressed as in Equation (26).

[Math. 15]
$$\Delta V_{C4\_DOWN} = \frac{P_{load} \cdot \theta 1 \cdot T}{V_{C1} \cdot C_1 \cdot \pi/2} \quad (25)$$

[Math. 16]
$$\Delta V_{C4\_UP} = \frac{I_P}{C_{dc}}\cos\theta 3 - \frac{P_{load}}{C_{dc} \cdot V_{dc}}(\pi/2 - \theta 3) \quad (26)$$

In Equation (25), Pload indicates output power. In addition, a gain multiplier 79 calculates a duty signal 79a corresponding to the voltage phase θ1 on the basis of the target ΔVc3*. A constant in the gain multiplier 79 can be obtained from Equation (27).

[Math. 17]
$$K2 = \frac{\Delta V_{C4}^* \cdot C_1 \cdot V_{C1}}{2 \cdot P_{Load} \cdot T/4} \quad (27)$$

In Equation (27), Pload indicates output power, and T/4 indicates a ¼ cycle. In addition, a duty signal 80a corresponding to the voltage phase θ3 is calculated from the duty signal 79a by using a gain multiplier 80 so that a ripple voltage of the smoothing capacitor 7 in the phase range 0 to θ1 is the same as a ripple voltage thereof in the phase range θ3 to π/2. The derivation of the duty signal 80a in the gain multiplier 58 is performed by obtaining the voltage phase θ3 from the relational expression between the voltage phase θ1 and the voltage phase θ3 as expressed in Equation (28), and by dividing the voltage phase θ3 by π/2. In addition, the voltage phase θ1 may be set to a constant value from a target value of the ripple voltage of the smoothing capacitor 7 in the phase range 0 to θ1.

[Math. 18]
$$\frac{P_{Load}}{C_{dc} \cdot V_{dc}}\theta 1 = \frac{I_P}{C_{dc}}\cos\theta 3 - \frac{P_{load}}{C_{dc} \cdot V_{dc}}(\pi/2 - \theta 3) \quad (28)$$

Next, a subtractor 81 obtains a difference 81a between the set command value Vc4* and a detected DC voltage Vc4. The difference 81a between the command value Vc4* and the DC voltage Vc4 is used as a feedback amount, and a polarity of the difference 81a between the command value Vc4* and the DC voltage Vc4 is determined by a powering/regenerative operation selector 82. The difference 81a is multiplied by 1 during a powering operation, and the difference 81a is multiplied by −1 during a regenerative operation. A feedback amount 82a whose polarity is determined is PI-controlled by a PI controller 83, and output thereof is set as a voltage command 83a. In order to reverse increasing and decreasing polarities of the voltage command 83a, an output from a gain multiplier 84 is set as a voltage command 84a. The voltage command 84a is a duty signal corresponding to the voltage phase θ2 and is thus required to satisfy voltage phases θ1<θ2<θ3 at all times. Therefore, a voltage signal 85a is generated by a limiter 85 which sets the duty signal 79a in the voltage command 84a as a lower limit and sets the duty signal 80a therein as an upper limit. A gate signal generator 91 generates a gate signal 91a of the semiconductor switch 601a, corresponding to PWM control by using the three signals 79a, 80a and 85a.

In the PWM control by the gate signal generator 91, a triangular wave (triangular wave of AC power supply cycle TWAC) synchronized with a cycle which is the twice the frequency of the AC power supply 1 is used as a carrier wave, and, through comparative calculation, the duration of 0 to the duty signal 79a is set to the phase range 0 to θ1; the duration of the duty signal 79a to the voltage signal 85a is set to the phase range θ1 to θ2; the duration of the voltage signal 85a to the duty signal 80a is set to the phase range θ2 to θ3; and the duration of the duty signal 80a to 1 is set to the phase range θ3 to π/2. In this case, an On signal is generated as the gate signal 91a in the phase range 0 to θ1 and the phase range θ2 to θ3, and an Off signal is generated as the gate signal 91a in the phase range θ1 to θ2 and the phase range θ3 to π/2.

Next, a subtractor 86 obtains a difference 86a between the set command value Vc5* and a detected DC voltage Vc5. The difference 86a between the command value Vc5* and the DC voltage Vc5 is used as a feedback amount, and a polarity of the difference 86a between the command value Vc5* and the DC voltage Vc5 is determined by a powering/regenerative operation selector 87. The difference 86a is multiplied by 1 during a powering operation, and the difference 86a is multiplied by −1 during a regenerative operation. A feedback amount 87a whose polarity is determined is PI-controlled by a PI controller 88, and output thereof is set as a voltage command 88a. In order to reverse increasing and decreasing polarities of the voltage command 88a, an output from a gain multiplier 89 is set as a voltage command 89a. The voltage command 89a is a duty signal corresponding to the voltage phase θ2 and is thus required to satisfy voltage phases θ1<θ2<θ3 at all times. Therefore, a voltage signal 90a is generated by a limiter 90 which sets the duty signal 79a in the voltage command 89a as a lower limit and sets the duty signal 80a therein as an upper limit. A gate signal generator 92 generates a gate signal 92a of the semiconductor switch 901a, corresponding to PWM control by using the three signals 79a, 80a and 90a.

In the PWM control by the gate signal generator 92, a triangular wave (triangular wave of AC power supply cycle TWAC) synchronized with a cycle which is the twice the frequency of the AC power supply 1 is used as a carrier wave, and, through comparative calculation, the duration of 0 to the duty signal 79a is set to the phase range π to θ1n; the duration of the duty signal 79a to the voltage signal 90a is set to the phase range θ1n to θ2n; the duration of the voltage signal 90a to the duty signal 80a is set to the phase range θ2n to θ3n; and the duration of the duty signal 80a to 1 is set to the phase range θ3n to 3π/2. In this case, an On signal is generated as the gate signal 92a in the phase range π to θ1n and the phase range θ2n to θ3n, and an Off signal is generated as the gate signal 92a in the phase range θ1n to θ2n and the phase range θ3n to 3π/2.

The semiconductor switch 501a is operated to have a polarity reverse to that of the semiconductor switch 601a. In other words, in a case where the semiconductor switch 601a is turned on, the semiconductor switch 501a is turned off, and in a case where the semiconductor switch 601a is turned off, the semiconductor switch 501a is turned on. However, since, in the semiconductor switch 501a, a current flows from the emitter to the collector at all times, the semiconductor switch 501a may be turned off so that a current flows through the diode 501b which is connected inversely in parallel thereto. Similarly, the semiconductor switch 801a is operated to have a polarity reverse to that of the semiconductor switch 901a. In other words, in a case where the semiconductor switch 901a is turned on, the semiconductor switch 801a is turned off, and in a case where the semiconductor switch 901a is turned off, the semiconductor switch 801a is turned on. However, since, in the semiconductor switch 801a, a current flows from the emitter to the collector at all times, the semiconductor switch 801a may be turned off so that a current flows through the diode 801b which is connected inversely in parallel thereto.

Figure 44:
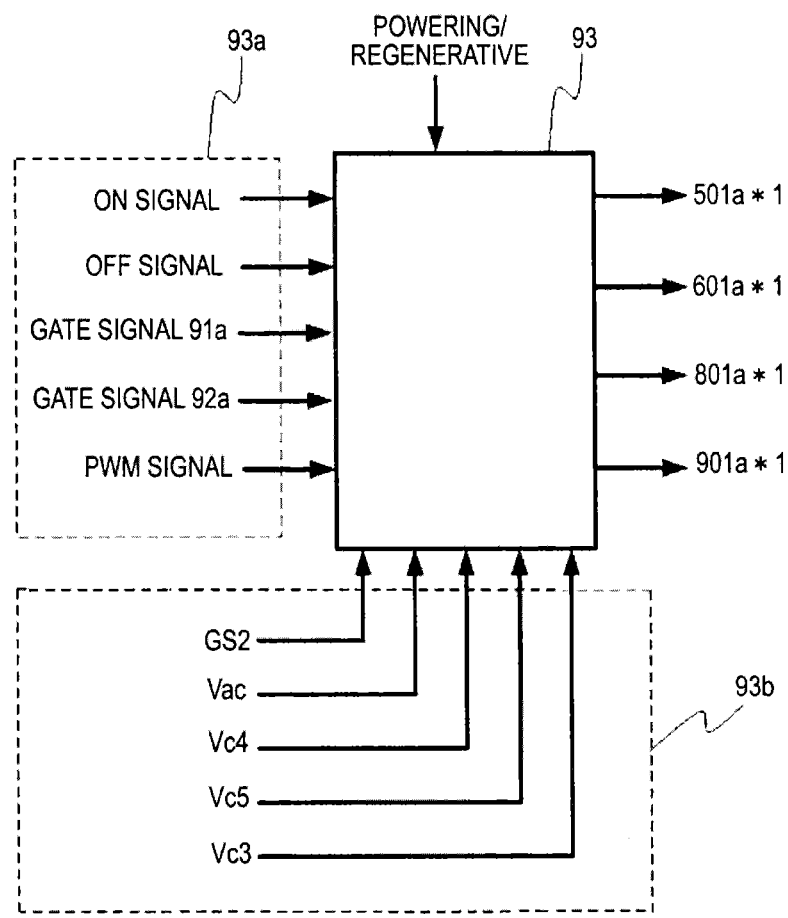
FIG. 44 is a control block diagram illustrating a specific function of a gate signal selector according to Embodiment 6 of the present invention.

Next, a gate signal selector 93 selects a gate signal of each of the semiconductor switches 501a, 601a, 801a and 901a according to an operation condition. FIG. 44 is a control block diagram illustrating a specific function of the gate signal selector 93. The gate signal selector 93 selects an appropriate gate signal from among input signals 93a on the basis of voltage information 93b and a powering/regenerative operation command (powering/regenerative), and generates a gate signal of each of the semiconductor switches 501a, 601a, 801a and 901a.

The input signals 93a are five signals including a current control PWM signal, an On signal, an Off signal, and the gate signals 91a and 92a based on the voltage commands which are calculated for respectively making the DC voltage Vc4 and the DC voltage Vc5 illustrated in FIG. 43 track the command value Vc4* and the command value Vc5*. The voltage information 93b is information which is required to determine a polarity of the AC voltage and to determine establishment of Expressions (5) to (8), and includes a gate signal GS2 of the semiconductor switches 601a and 901a, the AC voltage Vac of the AC power supply 1, the DC voltage Vc4 of the DC capacitor 403, the DC voltage Vc5 of the DC capacitor 703, and the DC voltage Vc3 of the smoothing capacitor 10.

First, a description will be made of a case of the powering operation. During the powering operation, in a case where a polarity of the AC voltage Vac of the AC power supply 1 is positive, and Expression (5) is satisfied, the gate signal 91a which is a PWM signal is selected as a gate signal of the semiconductor switch 501a and the semiconductor switch 601a. In addition, the Off signal is selected as a gate signal of the semiconductor switch 801a, and the Off signal is selected as a gate signal of the semiconductor switch 901a. In a case where Expression (5) is not satisfied, the current control PWM signal is selected as a gate signal of the semiconductor switch 601a; the Off signal is selected as a gate signal of the semiconductor switch 501a; the Off signal is selected as a gate signal of the semiconductor switch 801a; and the Off signal is selected as a gate signal of the semiconductor switch 901a.

In addition, during the powering operation, in a case where a polarity of the AC voltage Vac of the AC power supply 1 is positive, and Expression (6) is satisfied, the gate signal 61a which is a PWM signal is selected as a gate signal of the semiconductor switch 501a and the semiconductor switch 601a. Further, the Off signal is selected as a gate signal of the semiconductor switch 801a, and the Off signal is selected as a gate signal of the semiconductor switch 901a. In a case where Expression (6) is not satisfied, the current control PWM signal is selected as a gate signal of the semiconductor switch 601a; the Off signal is selected as a gate signal of the semiconductor switch 501a; the Off signal is selected as a gate signal of the semiconductor switch 801a; and the Off signal is selected as a gate signal of the semiconductor switch 901a.

In addition, during the powering operation, in a case where a polarity of the AC voltage Vac of the AC power supply 1 is negative, and Expression (7) is satisfied, the gate signal 92a which is a PWM signal is selected as a gate signal of the semiconductor switch 801a and the semiconductor switch 901a. Further, the Off signal is selected as a gate signal of the semiconductor switch 501a, and the Off signal is selected as a gate signal of the semiconductor switch 601a. In a case where Expression (7) is not satisfied, the current control PWM signal is selected as a gate signal of the semiconductor switch 901a; the Off signal is selected as a gate signal of the semiconductor switch 801a; the Off signal is selected as a gate signal of the semiconductor switch 501a; and the Off signal is selected as a gate signal of the semiconductor switch 601a.

In addition, during the powering operation, in a case where a polarity of the AC voltage Vac of the AC power supply 1 is negative, and Expression (8) is satisfied, the gate signal 92a which is a PWM signal is selected as a gate signal of the semiconductor switch 801a and the semiconductor switch 901a. Further, the Off signal is selected as a gate signal of the semiconductor switch 501a, and the Off signal is selected as a gate signal of the semiconductor switch 601a. In a case where Expression (8) is not satisfied, the current control PWM signal is selected as a gate signal of the semiconductor switch 901a; the Off signal is selected as a gate signal of the semiconductor switch 801a; the Off signal is selected as a gate signal of the semiconductor switch 501a; and the Off signal is selected as a gate signal of the semiconductor switch 601a.

Next, a description will be made of a case of the regenerative operation. During the regenerative operation, in a case where a polarity of the AC voltage Vac of the AC power supply 1 is positive, and Expression (5) is satisfied, the gate signal 91a which is a PWM signal is selected as a gate signal of the semiconductor switch 501a and the semiconductor switch 601a. In addition, the Off signal is selected as a gate signal of the semiconductor switch 801a, and the On signal is selected as a gate signal of the semiconductor switch 901a. In a case where Expression (5) is not satisfied, the current control PWM signal is selected for the semiconductor switch 501a and the semiconductor switch 601a (PWM control is performed on the semiconductor switches 501a and 601a through synchronization with each other). Here, the semiconductor switch 501a is operated to have a polarity reverse to that of the semiconductor switch 601a. The Off signal is selected as a gate signal of the semiconductor switch 801a, and the On signal is selected as a gate signal of the semiconductor switch 901a.

In addition, during the regenerative operation, in a case where a polarity of the AC voltage Vac of the AC power supply 1 is positive, and Expression (6) is satisfied, the gate signal 61a which is a PWM signal is selected as a gate signal of the semiconductor switch 501a and the semiconductor switch 601a. Further, the Off signal is selected as a gate signal of the semiconductor switch 801a, and the On signal is selected as a gate signal of the semiconductor switch 901a. In a case where Expression (6) is not satisfied, the current control PWM signal is selected for the semiconductor switch 501a and the semiconductor switch 601a. Also here, the semiconductor switch 501a is operated to have a polarity reverse to that of the semiconductor switch 601a. The Off signal is selected as a gate signal of the semiconductor switch 801a, and the On signal is selected as a gate signal of the semiconductor switch 901a.

In addition, during the regenerative operation, in a case where a polarity of the AC voltage Vac of the AC power supply 1 is negative, and Expression (7) is satisfied, the gate signal 92a which is a PWM signal is selected as a gate signal of the semiconductor switch 801a and the semiconductor switch 901a. Further, the Off signal is selected as a gate signal of the semiconductor switch 501a, and the On signal is selected as a gate signal of the semiconductor switch 601a. In a case where Expression (7) is not satisfied, the current control PWM signal is selected for the semiconductor switch 801a and the semiconductor switch 901a. Also here, the semiconductor switch 801a is operated to have a polarity reverse to that of the semiconductor switch 901a. The Off signal is selected as a gate signal of the semiconductor switch 501a, and the On signal is selected as a gate signal of the semiconductor switch 601a.

In addition, during the regenerative operation, in a case where a polarity of the AC voltage Vac of the AC power supply 1 is negative, and Expression (8) is satisfied, the gate signal 62a which is a PWM signal is selected as a gate signal of the semiconductor switch 801a and the semiconductor switch 901a. Further, the Off signal is selected as a gate signal of the semiconductor switch 501a, and the On signal is selected as agate signal of the semiconductor switch 601a. In a case where Expression (8) is not satisfied, the current control PWM signal is selected for the semiconductor switch 801a and the semiconductor switch 901a. Also here, the semiconductor switch 801a is operated to have a polarity reverse to that of the semiconductor switch 901a. The Off signal is selected as a gate signal of the semiconductor switch 501a, and the On signal is selected as a gate signal of the semiconductor switch 601a.

In addition, in a case where only the powering operation is performed, the semiconductor switches 501a and 801a connected to the positive side of the smoothing capacitor 10 may be replaced with diodes, and the semiconductor switches 401a and 701a of the positive sides of the inverter circuits 400 and 700 may be replaced with high frequency diodes having losses smaller than those of the diodes during high frequency driving. With this configuration, it is possible to optimize recovery losses and conduction losses of the diodes.

In the present embodiment, since the inverter circuits 400 and 700 are controlled as described above, the DC voltage Vc3 of the smoothing capacitor 10 is made to track the target voltage Vc3*, the ripple voltage ΔVc3 of the smoothing capacitor 10 is adjusted to the target voltage ΔVc3*, and the input power factor from the AC power supply 1 is controlled to be improved and be output. In addition, generated voltages of the AC sides of the inverter circuits 400 and 700 are superimposed on the AC voltage Vac which is output from the AC power supply 1.

With the above-described configuration, it is possible to realize a function of converting an AC voltage into a DC voltage and a function of controlling an AC power supply at a high power factor without using a diode rectifying circuit, and thus to realize a regenerative operation in addition to the features of the configuration of Embodiments 4 and 5. In addition, since the two inverter circuits 400 and 700 are changed and are controlled according to a polarity of an AC voltage of the AC power supply 1, it is possible to reduce power load periods of the DC capacitors 403 and 703 by halves and thus to widen a range to which the power conversion device is applied.

Embodiment 7

In Embodiment 6, two On phases and two Off phases of the semiconductor switches 601a and 901a are provided at the ¼ cycle, and thus the ripple voltage ΔVc3 of the smoothing capacitor 10 is adjusted. In the present embodiment, two On phases and a single Off phase of the semiconductor switches 601a and 901a are provided at the ¼ cycle, and thus a ripple voltage ΔVc2 of the DC capacitor 403 of the inverter circuit 400 and a ripple voltage ΔVc3 of the DC capacitor 703 of the inverter circuit 700 are adjusted. In addition, a circuit configuration in the present embodiment is the same as the circuit configuration of Embodiment 4.

Figure 45:
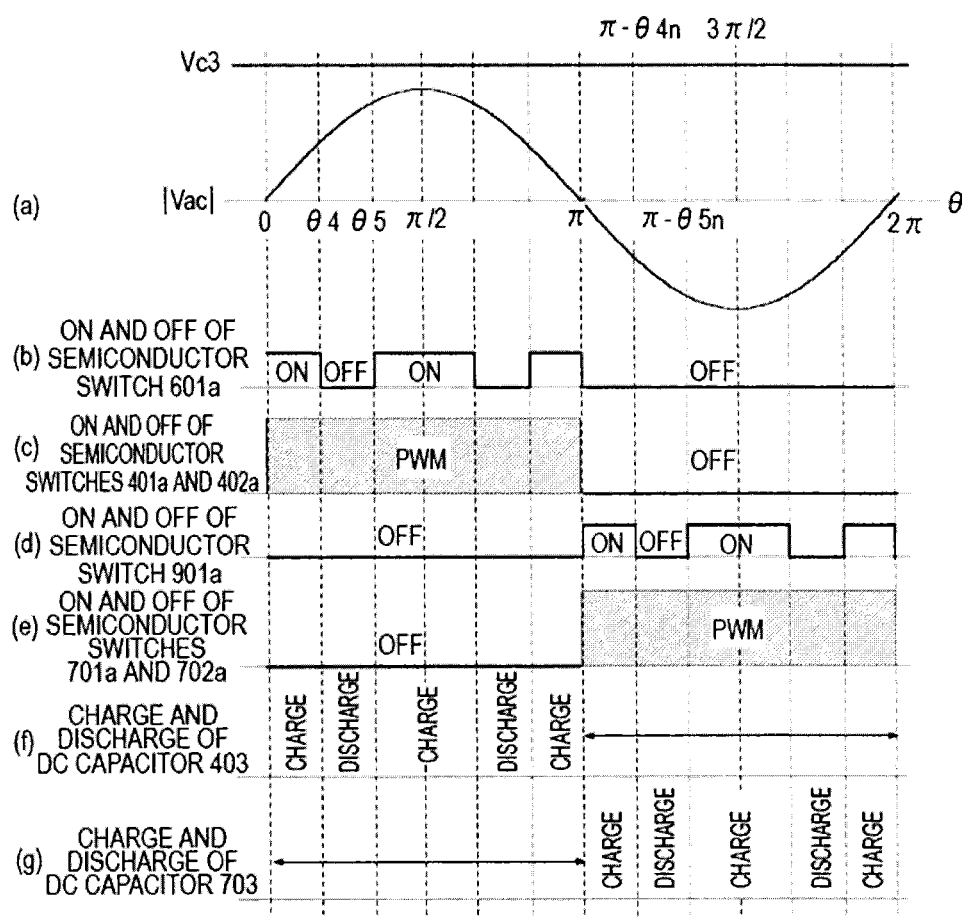
FIG. 45 illustrates waveforms of respective parts and charge and discharge of a DC capacitor of an inverter circuit, for explaining a powering operation of the power conversion device according to Embodiment 7 of the present invention.

First, a description will be made of a powering operation of the power conversion device with this configuration, that is, an operation of outputting DC power to the smoothing capacitor 10. FIG. 45 illustrates waveforms of the respective parts and charge and discharge of the DC capacitors 403 and 703 of the inverter circuits 400 and 700, for explaining a powering operation of the power conversion device. In FIG. 45, FIG. 45(a) illustrates a voltage waveform of the AC voltage Vac; FIG. 45(b) illustrates turned-on and turned-off states of the semiconductor switch 601a; FIG. 45(c) illustrates turned-on and turned-off states of the semiconductor switches 401a and 402a; FIG. 45(d) illustrates turned-on and turned-off states of the semiconductor switch 901a; FIG. 45(e) illustrates turned-on and turned-off states of the semiconductor switches 701a and 702a; FIG. 45(f) illustrates charge and discharge states of the DC capacitor 403; and FIG. 45(g) illustrates charge and discharge states of the DC capacitor 703. In FIGS. 45(f) and 45 (g), ranges indicated by arrows are periods in which charge and discharge are not performed. In FIG. 45 (b), a phase range 0 to θ4 is a first On period, a phase range θ4 to θ5 is a first Off period, and a phase range θ5 to π/2 is a second On period. The voltage phases θ4 and θ5 are set, and thus a length of each of the On period and the Off period is determined.

In addition, the DC voltage Vc3 of the smoothing capacitor 10 of the output stage is higher than the peak voltage Vp of the AC voltage Vac of the AC power supply 1, and FIG. 45 illustrates a state in which the DC voltage Vc3 of the smoothing capacitor 10 is controlled to be a given target voltage Vc3*. In the present embodiment, in the same manner as in Embodiment 6, in a case where a polarity of the AC voltage Vac of the AC power supply 1 is positive, output control on the semiconductor switches 501a and 601a and the semiconductor switches 401a and 402a constituting the inverter circuit 400 is performed, so that the semiconductor switches 701a, 702a, 801a and 901a are turned off. In a case where a polarity of the AC voltage Vac of the AC power supply 1 is negative, output control on the semiconductor switches 801a and 901a and the semiconductor switches 701a and 702a constituting the inverter circuit 700 is performed, so that the semiconductor switches 401a, 402a, 501a and 601a are turned off.

In the same manner as in Embodiment 6, when a voltage phase of the AC power supply 1 is set to 0, and in a case of 0≤θ<π in which a polarity of the AC voltage Vac of the AC power supply 1 is positive, the inverter circuit 400 is PWM-controlled through combinations of four operation modes illustrated in FIGS. 15 to 18. Therefore, it is possible to perform high power factor control of the AC power supply 1 and charge and discharge control of the DC capacitor 403. In addition, a current which flows through the inverter circuit 700 side flows through the diode 901b and the diode 702b, but may be controlled to flow through the semiconductor switches 901a and 702a by appropriately turning-on and turning-off the semiconductor switches 901a and 702a.

In addition, in the same manner as in Embodiment 6, when a voltage phase of the AC power supply 1 is set to 0, and in a case of π≤θ<2π in which a polarity of the AC voltage Vac of the AC power supply 1 is negative, the inverter circuit 400 is PWM-controlled through combinations of four operation modes illustrated in FIGS. 19 to 22. Therefore, it is possible to perform high power factor control of the AC power supply 1 and charge and discharge control of the DC capacitor 403. In addition, a current which flows through the inverter circuit 400 side flows through the diode 601b and the diode 402b, but may be controlled to flow through the semiconductor switches 601a and 402a by appropriately turning-on and turning-off the semiconductor switches 601a and 402a.

As illustrated in FIG. 45, in a case where a polarity of the AC voltage Vac of the AC power supply 1 is positive, the smoothing capacitor 10 is bypassed in a state in which the semiconductor switch 601a is turned on and the semiconductor switch 501a (not illustrated) is turned off in a phase range of the zero-cross phase to θ4 and a phase range of θ5 to π/2 of the AC voltage Vac of the AC power supply 1, that is, the phase range 0 to θ4 and the phase range θ5 to π/2. In addition, PWM control for alternately turning on and turning off the semiconductor switches 401a and 402a of the inverter circuit 400 is performed (the operation mode of FIG. 15 and the operation mode of FIG. 16 are alternately performed).

By performing this control, the current from the AC power supply 1 is limited by the positive side reactor 2 and the negative side reactor 3 so as to be input to the inverter circuit 400, and then returns to the AC power supply 1 from the inverter circuit 400 through the diode 901b and the diode 702b (or the semiconductor switches 901a and 702a). At this time, the positive side reactor 2 and the negative side reactor 3 are excited in the operation mode of FIG. 15, and the excitation of the positive side reactor 2 and the negative side reactor 3 is reset in the operation mode of FIG. 16. In addition, the DC capacitor 403 is bypassed in the operation mode of FIG. 15, and the DC capacitor 403 is charged in the operation mode of FIG. 16. Therefore, the inverter circuit 400 is PWM-controlled through a combination of the operation mode of FIG. 15 and the operation mode of FIG. 16. Thus, the DC capacitor 403 can be charged and the high power factor control of the AC power supply 1 can be performed.

Next, as illustrated in FIG. 45, in a case where a polarity of the AC voltage Vac of the AC power supply 1 is positive, DC power is output to the smoothing capacitor 10 in a state in which the semiconductor switch 601a is turned off and the semiconductor switch 501a (not illustrated) is turned on in the phase range θ4 to θ5. In addition, PWM control for alternately turning on and turning off the semiconductor switches 401a and 402a of the inverter circuit 400 is performed (the operation mode of FIG. 17 and the operation mode of FIG. 18 are alternately performed).

By performing this control, the current from the AC power supply 1 is limited by the positive side reactor 2 and the negative side reactor 3 so as to be input to the inverter circuit 400, then charges the smoothing capacitor 10 from the inverter circuit 400 through the semiconductor switch 501a, and then returns to the AC power supply 1 through the diode 901b and the diode 702b (or the semiconductor switches 901a and 702a). At this time, the inverter circuit 400 outputs a voltage (Vc4*−Vac) and repeatedly performs the operation mode of FIG. 17 and the operation mode of FIG. 18 so as to add an output voltage of the inverter circuit 400 to the AC voltage Vac of the AC power supply 1, and controls the voltage Vc3 of the smoothing capacitor 10 so that the target voltage Vc3* higher than the peak voltage of the AC power supply 1 is obtained.

In the inverter circuit 400, the positive side reactor 2 and the negative side reactor 3 are excited in the operation mode of FIG. 17, and the excitation of the positive side reactor 2 and the negative side reactor 3 is reset in the operation mode of FIG. 18. In addition, the DC capacitor 403 is discharged in the operation mode of FIG. 17, and the DC capacitor 403 is bypassed in the operation mode of FIG. 18. Therefore, the inverter circuit 400 is PWM-controlled through a combination of the operation mode of FIG. 17 and the operation mode of FIG. 18. Thus, the DC capacitor 403 can be discharged and the high power factor control of the AC power supply 1 can be performed.

Next, as illustrated in FIG. 45, in a case where a polarity of the AC voltage Vac of the AC power supply 1 is negative, the smoothing capacitor 10 is bypassed in a state in which the semiconductor switch 901a is turned on and the semiconductor switch 801a (not illustrated) is turned off in a phase range of the zero-cross phase to θ4n of the AC voltage Vac of the AC power supply 1, that is, the phase range π to (π+θ4n). In addition, PWM control for alternately turning on and turning off the semiconductor switches 701a and 702a of the inverter circuit 700 is performed (the operation mode of FIG. 19 and the operation mode of FIG. 20 are alternately performed).

By performing this control, the current from the AC power supply 1 is limited by the positive side reactor 2 and the negative side reactor 3 so as to be input to the inverter circuit 700, and then returns to the AC power supply 1 from the inverter circuit 700 through the diode 601b and the diode 402b (or the semiconductor switches 601a and 402a). At this time, the positive side reactor 2 and the negative side reactor 3 are excited in the operation mode of FIG. 19, and the excitation of the positive side reactor 2 and the negative side reactor 3 is reset in the operation mode of FIG. 20. In addition, the DC capacitor 703 is bypassed in the operation mode of FIG. 19, and the DC capacitor 703 is charged in the operation mode of FIG. 20. Therefore, the inverter circuit 700 is PWM-controlled through a combination of the operation mode of FIG. 19 and the operation mode of FIG. 20. Thus, the DC capacitor 703 can be charged and the high power factor control of the AC power supply 1 can be performed.

Next, as illustrated in FIG. 45, in a case where a polarity of the AC voltage Vac of the AC power supply 1 is negative, DC power is output to the smoothing capacitor 10 in a state in which the semiconductor switch 901a is turned off and the semiconductor switch 801a (not illustrated) is turned on in the phase range (π+θ4n) to (π+θ5n). In addition, PWM control for alternately turning on and turning off the semiconductor switches 701a and 702a of the inverter circuit 700 is performed (the operation mode of FIG. 21 and the operation mode of FIG. 22 are alternately performed).

By performing this control, the current from the AC power supply 1 is limited by the positive side reactor 2 and the negative side reactor 3 so as to be input to the inverter circuit 700, then charges the smoothing capacitor 10 from the inverter circuit 700 through the semiconductor switch 801a, and then returns to the AC power supply 1 through the diode 601b and the diode 402b (or the semiconductor switches 601a and 402a). At this time, the inverter circuit 700 outputs a voltage (Vc5*−Vac) and repeatedly performs the operation mode of FIG. 21 and the operation mode of FIG. 22 so as to add an output voltage of the inverter circuit 700 to the AC voltage Vac of the AC power supply 1, and controls the voltage Vc3 of the smoothing capacitor 10 so that the target voltage Vc3* higher than the peak voltage of the AC power supply 1 is obtained.

In the inverter circuit 700, the positive side reactor 2 and the negative side reactor 3 are excited in the operation mode of FIG. 21, and the excitation of the positive side reactor 2 and the negative side reactor 3 is reset in the operation mode of FIG. 22. In addition, the DC capacitor 703 is discharged in the operation mode of FIG. 21, and the DC capacitor 703 is bypassed in the operation mode of FIG. 22. Therefore, the inverter circuit 700 is PWM-controlled through a combination of the operation mode of FIG. 21 and the operation mode of FIG. 22. Thus, the DC capacitor 703 can be discharged and the high power factor control of the AC power supply 1 can be performed.

Figure 46:
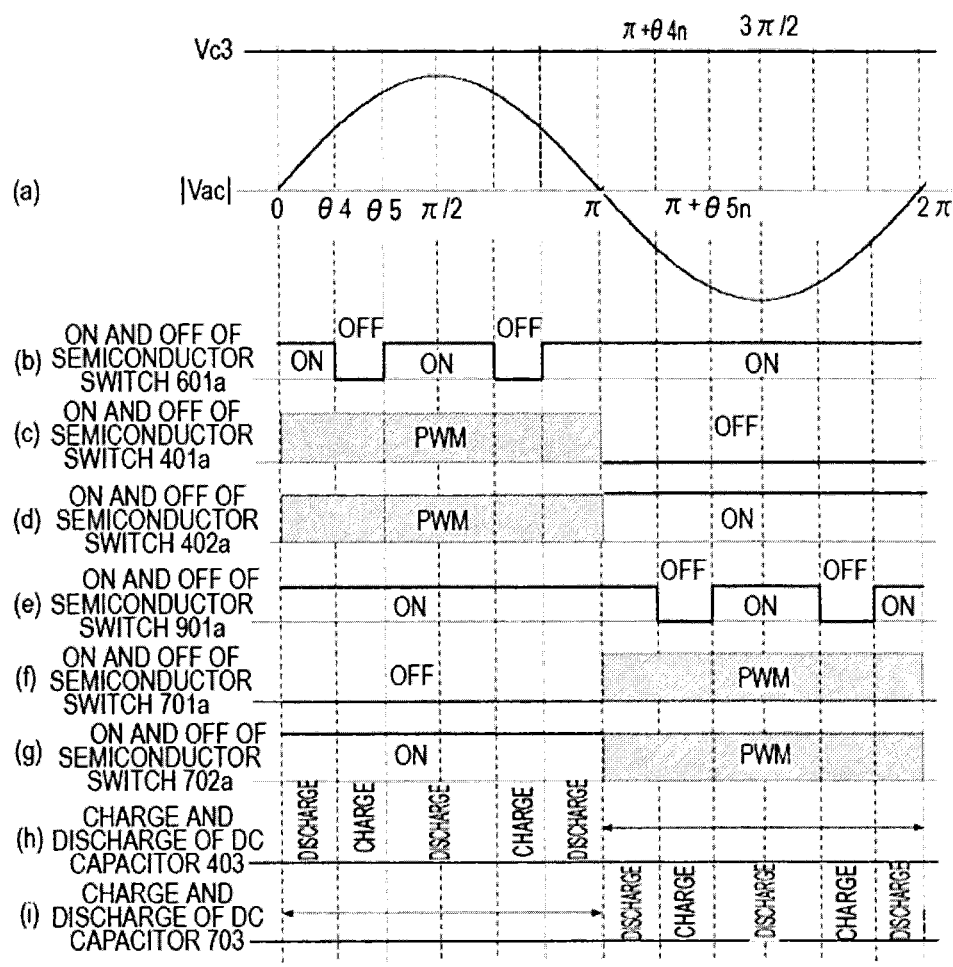
FIG. 46 illustrates waveforms of respective parts and charge and discharge of a DC capacitor of an inverter circuit, for explaining a regenerative operation of the power conversion device according to Embodiment 7 of the present invention.

Next, a description will be made of a regenerative operation of the power conversion device, that is, an operation of outputting AC power to the AC power supply 1. FIG. 46 illustrates waveforms of the respective parts and charge and discharge of the DC capacitors 403 and 703 of the inverter circuits 400 and 700, for explaining a regenerative operation of the power conversion device. In FIG. 46, FIG. 46(a) illustrates a voltage waveform of the AC voltage Vac; FIG. 46(b) illustrates turned-on and turned-off states of the semiconductor switch 601a; FIG. 46(c) illustrates turned-on and turned-off states of the semiconductor switch 401a; FIG. 46(d) illustrates turned-on and turned-off states of the semiconductor switch 402a; FIG. 46(e) illustrates turned-on and turned-off states of the semiconductor switch 901a; FIG. 46(f) illustrates turned-on and turned-off states of the semiconductor switch 701a; FIG. 46(g) illustrates turned-on and turned-off states of the semiconductor switch 702a; FIG. 46(h) illustrates charge and discharge states of the DC capacitor 403; and FIG. 46(i) illustrates charge and discharge states of the DC capacitor 703. In FIGS. 46(h) and 46(i), ranges indicated by arrows are periods in which charge and discharge are not performed.

In addition, the DC voltage Vc3 of the smoothing capacitor 10 of the output stage is higher than the peak voltage Vp of the AC voltage Vac of the AC power supply 1, and FIG. 46 illustrates a state in which the DC voltage Vc3 of the smoothing capacitor 10 is controlled to be a given target voltage Vc3*. In the present embodiment, in a case where a polarity of the AC voltage Vac of the AC power supply 1 is positive, output control on the semiconductor switches 501a and 601a and the semiconductor switches 401a and 402a constituting the inverter circuit 400 is performed, so that the semiconductor switch 901a, and the semiconductor switch 702a constituting the inverter circuit 700 are turned on, and the semiconductor switch 801a, and the semiconductor switch 701a constituting the inverter circuit 700 are turned off.

In a case where a polarity of the AC voltage Vac of the AC power supply 1 is negative, output control on the semiconductor switches 801a and 901a and the semiconductor switches 701a and 702a constituting the inverter circuit 700 is performed, so that the semiconductor switch 601a, and the semiconductor switch 402a constituting the inverter circuit 400 are turned on, and the semiconductor switch 501a, and the semiconductor switch 401a constituting the inverter circuit 400 are turned off.

First, a voltage phase of the AC power supply 1 is set to θ, and a description will be made of operations of the four semiconductor switches 401a, 402a, 501a and 601a and current paths in a case of $0 \leq \theta < \pi$ in which a polarity of the AC voltage Vac of the AC power supply 1 is positive. In addition, in the same manner as in Embodiment 6, in a case of $0 \leq \theta < \pi$ in which a polarity of the AC voltage Vac of the AC power supply 1 is positive, the inverter circuit 400 is PWM-controlled through combinations of four operation modes illustrated in FIGS. 24 to 27. Therefore, it is possible to perform high power factor control of the AC power supply 1 and charge and discharge control of the DC capacitor 403. Further, in a case of $\pi \leq \theta < 2\pi$ in which a polarity of the AC voltage Vac of the AC power supply 1 is negative, the inverter circuit 700 is PWM-controlled through combinations of four operation modes illustrated in FIGS. 28 to 31. Therefore, it is possible to perform high power factor control of the AC power supply 1 and charge and discharge control of the DC capacitor 703.

As illustrated in FIG. 46, in a case where a polarity of the AC voltage Vac of the AC power supply 1 is positive, the smoothing capacitor 10 is bypassed in a state in which the semiconductor switch 601a is turned on and the semiconductor switch 501a (not illustrated) is turned off in a phase range of the zero-cross phase to θ4 and a phase range of θ5 to π/2 of the AC voltage Vac of the AC power supply 1, that is, the phase range 0 to θ4 and the phase range θ5 to π/2. In addition, PWM control for alternately turning on and turning off the semiconductor switches 401a and 402a of the inverter circuit 400 is performed (the operation mode of FIG. 24 and the operation mode of FIG. 25 are alternately performed).

By performing this control, the current from the AC power supply 1 is limited by the positive side reactor 2 and the negative side reactor 3, and is input to the inverter circuit 400 through the semiconductor switches 702a and 901a via the semiconductor switch 601a. At this time, the positive side reactor 2 and the negative side reactor 3 are excited in the operation mode of FIG. 24, and the excitation of the positive side reactor 2 and the negative side reactor 3 is reset in the operation mode of FIG. 25. In addition, the DC capacitor 403 is bypassed in the operation mode of FIG. 24, and the DC capacitor 403 is discharged in the operation mode of FIG. 25. Therefore, the inverter circuit 400 is PWM-controlled through a combination of the operation mode of FIG. 24 and the operation mode of FIG. 25. Thus, the DC capacitor 403 can be discharged and the high power factor control of the AC power supply 1 can be performed.

Next, as illustrated in FIG. 46, in a case where a polarity of the AC voltage Vac of the AC power supply 1 is positive, DC power is output to the smoothing capacitor 10 in a state in which the semiconductor switch 601a is turned off and the semiconductor switch 501a (not illustrated) is turned on in the phase range θ4 to θ5. In addition, PWM control for alternately turning on and turning off the semiconductor switches 401a and 402a of the inverter circuit 400 is performed (the operation mode of FIG. 26 and the operation mode of FIG. 27 are alternately performed).

By performing this control, the current from the smoothing capacitor 10 is limited by the positive side reactor 2 and the negative side reactor 3, and is input to the inverter circuit 400 via the semiconductor switch 501a so as to be regenerated in the AC power supply 1. The current from the AC power supply 1 flows toward the smoothing capacitor 10 via the semiconductor switches 702a and 901a. At this time, the inverter circuit 400 outputs a voltage (Vc4*−Vac) and repeatedly performs the operation mode of FIG. 26 and the operation mode of FIG. 27 so as to add an output voltage of the inverter circuit 400 to the AC power supply 1, and controls the voltage Vc3 of the smoothing capacitor 10 so that the target voltage Vc3* higher than the peak voltage of the AC power supply 1 is obtained.

In the inverter circuit 400, the positive side reactor 2 and the negative side reactor 3 are excited in the operation mode of FIG. 26, and the excitation of the positive side reactor 2 and the negative side reactor 3 is reset in the operation mode of FIG. 27. In addition, the DC capacitor 403 is charged in the operation mode of FIG. 26, and the DC capacitor 403 is bypassed in the operation mode of FIG. 27. Therefore, the inverter circuit 400 is PWM-controlled through a combination of the operation mode of FIG. 26 and the operation mode of FIG. 27. Thus, the DC capacitor 403 can be charged and the high power factor control of the AC power supply 1 can be performed.

Next, as illustrated in FIG. 46, in a case where a polarity of the AC voltage Vac of the AC power supply 1 is negative, the smoothing capacitor 10 is bypassed in a state in which the semiconductor switch 901a is turned on and the semiconductor switch 801a (not illustrated) is turned off in a phase range of the zero-cross phase to θ4n and a phase range of θ5n to 3π/2 of the AC voltage Vac of the AC power supply 1, that is, the phase range π to (π+θ4n) and the phase range (π+θ5n) to 3π/2. In addition, PWM control for alternately turning on and turning off the semiconductor switches 701a and 702a of the inverter circuit 700 is performed (the operation mode of FIG. 28 and the operation mode of FIG. 29 are alternately performed).

By performing this control, the current from the smoothing capacitor 10 is limited by the positive side reactor 2 and the negative side reactor 3, and is input to the inverter circuit 700 so as to return to the AC power supply 1. At this time, the positive side reactor 2 and the negative side reactor 3 are excited in the operation mode of FIG. 28, and the excitation of the positive side reactor 2 and the negative side reactor 3 is reset in the operation mode of FIG. 29. In addition, the DC capacitor 703 is bypassed in the operation mode of FIG. 28, and the DC capacitor 703 is discharged in the operation mode of FIG. 29. Therefore, the inverter circuit 700 is PWM-controlled through a combination of the operation mode of FIG. 28 and the operation mode of FIG. 29. Thus, the DC capacitor 703 can be discharged and the high power factor control of the AC power supply 1 can be performed.

Next, as illustrated in FIG. 46, in a case where a polarity of the AC voltage Vac of the AC power supply 1 is negative, DC power is output to the smoothing capacitor 10 in a state in which the semiconductor switch 901a is turned off and the semiconductor switch 801a (not illustrated) is turned on in the phase range (π+θ4n) to (π+θ5n). In addition, PWM control for alternately turning on and turning off the semiconductor switches 701a and 702a of the inverter circuit 700 is performed (the operation mode of FIG. 30 and the operation mode of FIG. 31 are alternately performed).

By performing this control, the current from the smoothing capacitor 10 is limited by the positive side reactor 2 and the negative side reactor 3 so as to be input to the inverter circuit 700, and then returns to the AC power supply 1 from the inverter circuit 700. At this time, the inverter circuit 700 outputs a voltage (Vc5*−Vac) and repeatedly performs the operation mode of FIG. 30 and the operation mode of FIG. 31 so as to add an output voltage of the inverter circuit 700 to the AC voltage Vac of the AC power supply 1, and controls the voltage Vc3 of the smoothing capacitor 10 so that the target voltage Vc3* higher than the peak voltage of the AC power supply 1 is obtained.

In the inverter circuit 700, the positive side reactor 2 and the negative side reactor 3 are excited in the operation mode of FIG. 30, and the excitation of the positive side reactor 2 and the negative side reactor 3 is reset in the operation mode of FIG. 31. In addition, the DC capacitor 703 is charged in the operation mode of FIG. 30, and the DC capacitor 703 is bypassed in the operation mode of FIG. 31. Therefore, the inverter circuit 700 is PWM-controlled through a combination of the operation mode of FIG. 30 and the operation mode of FIG. 31. Thus, the DC capacitor 703 can be charged and the high power factor control of the AC power supply 1 can be performed.

Regardless of the powering operation or the regenerative operation of the power conversion device, an On period of the semiconductor switch 601a is adjusted in a case where a polarity of the AC voltage Vac of the AC power supply 1 is positive, and thus the DC voltage Vc4 of the DC capacitor 403 of the inverter circuit 400 can be maintained to be a constant voltage. In addition, an On period of the semiconductor switch 901a is adjusted in a case where a polarity of the AC voltage Vac of the AC power supply 1 is negative, and thus the DC voltage Vc5 of the DC capacitor 703 of the inverter circuit 700 can be maintained to be a constant voltage.

Further, since On periods of the semiconductor switches 601a and 901a are newly provided at the peak phases ($\pi/2$ and $3\pi/2$) of the AC voltage Vac, new charge periods can be provided in the DC capacitor 403 of the inverter circuit 400 and the DC capacitor 703 of the inverter circuit 700 at phase conditions in which power is greatest, and thus it is possible to reduce the ripple voltage $\Delta$Vc2 of the DC capacitor 403 and the ripple voltage $\Delta$Vc3 of the DC capacitor 703. Furthermore, by adjusting On duration of the semiconductor switches 601a and 901a at the peat phases of the AC voltage Vac, it is possible to adjust the ripple voltage $\Delta$Vc2 of the DC capacitor 403 and the ripple voltage $\Delta$Vc3 of the DC capacitor 703.

In the driving method, a relationship between the AC voltage Vac of the AC power supply 1 and the DC voltage Vc3 of the smoothing capacitor 10 is expressed as in Equation (1) in the same manner as in Embodiment 1. However, the target voltage Vc2* of Equation (1) is required to be replaced with the target voltage Vc3*. In addition, in relation to an establishment condition of current control, Expressions (5) and (6) described in Embodiment 3 are required to be satisfied in a case where current control is performed by the inverter circuit 400, and Expressions (7) and (8) described in Embodiment 3 are required to be satisfied in a case where current control is performed by the inverter circuit 700.

In the above-described driving method, in a case where the establishment conditions (Expressions (5) to (8)) of the current control are not satisfied, the current control can be continuously performed by changing the current control by the inverter circuits 400 and 700 to that by the semiconductor switches 601a and 901a in the same manner as in the control method described in Embodiment 2.

The control of the inverter circuits 400 and 700 is the same as in Embodiment 6, and the DC voltage Vc3 of the smoothing capacitor 10 is maintained to be the target voltage Vc3* by performing output control on the semiconductor switches 401a, 402a, 701a and 702a constituting the inverter circuits. In addition, the AC current Iac is controlled so that a power factor becomes 1 during a powering operation and becomes (−1) during a regenerative operation.

Figure 47:
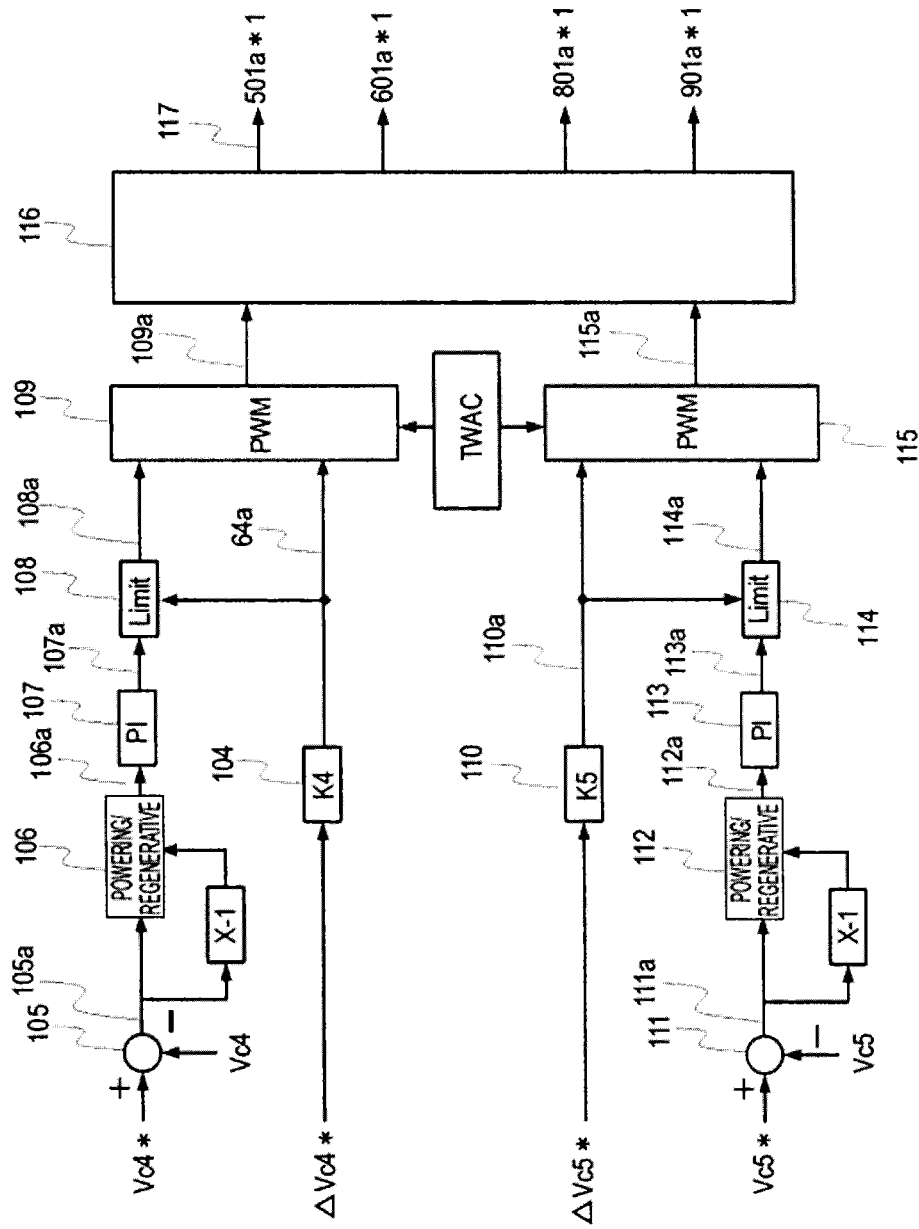
FIG. 47 is a control block diagram illustrating output control on a semiconductor switch according to Embodiment 7 of the present invention.

Next, a description will be made of control which is related to output of the semiconductor switches 501a, 601a, 801a and 901a, makes the DC voltage Vc4 of the DC capacitor 403 of the inverter circuit 400 track the command value Vc4*, makes a ripple voltage $\Delta$Vc4 of the DC capacitor 403 of the inverter circuit 400 adjusted to a predetermined target value $\Delta$Vc4*, makes the DC voltage Vc5 of the DC capacitor 703 of the inverter circuit 700 track the command value Vc5*, and makes a ripple voltage $\Delta$Vc5 of the DC capacitor 703 of the inverter circuit 700 adjusted to a predetermined target value $\Delta$Vc5*. FIG. 47 is a control block diagram illustrating output control on the semiconductor switches 501a, 601a, 801a and 901a, performed by the control circuit 11.

First, a ripple voltage in the phase range $\theta5$ to $\pi/2$ is expressed as in Equation (29).

[Math. 19]

$$\frac{\Delta V_{C4}^*}{2} = \frac{I_P}{\omega \cdot C_4} \cos\theta5 \tag{29}$$

In addition, a gain multiplier 104 calculates a duty signal 104a corresponding to the voltage phase $\theta5$ on the basis of the predetermined target value $\Delta$Vc5*. A constant in the gain multiplier 104 can be uniquely obtained from Equation (30).

[Math. 20]

$$\theta5 = \cos^{-1}\left(\frac{\omega \cdot C_4 \cdot \Delta V_{C4}^*}{2 \cdot I_P}\right) \tag{30}$$

Next, a subtractor 105 obtains a difference 105a between the set command value Vc4* and a detected DC voltage Vc4. The difference 105a between the command value Vc4* and the DC voltage Vc4 is used as a feedback amount, and a polarity of the difference 105a between the command value Vc4* and the DC voltage Vc4 is determined by a powering/regenerative operation selector 106. The difference 105a is multiplied by 1 during a powering operation, and the difference 105a is multiplied by (−1) during a regenerative operation. A feedback amount 106a whose polarity is determined is PI-controlled by a PI controller 107, and output thereof is set as a voltage command 107a. The voltage command 107a is a duty signal corresponding to the voltage phase $\theta4$ and is thus required to satisfy voltage phases $\theta4<\theta5$ at all times. Therefore, a voltage signal 108a is generated by a limiter 108 which sets the duty signal 104a in the voltage command 107a as an upper limit. A gate signal generator 109 generates a gate signal 109a of the semiconductor switch 601a, corresponding to PWM control by using the two signals 104a and 108a.

In the PWM control by the gate signal generator 109, a triangular wave (triangular wave of AC power supply cycle TWAC) synchronized with a cycle which is the twice the frequency of the AC power supply 1 is used as a carrier wave, and, through comparative calculation, the duration of 0 to the voltage signal 108a is set to the phase range 0 to $\theta4$; the duration of the voltage signal 108a to the duty signal 104a is set to the phase range $\theta4$ to $\theta5$; and the duration of the duty signal 104a to 1 is set to the phase range $\theta5$ to $\pi/2$. In addition, as the gate signal 109a, an On signal is generated in the phase range 0 to $\theta4$ and the phase range $\theta5$ to $\pi/2$, and an Off signal is generated in the phase range $\theta4$ to $\theta5$.

In addition, a ripple voltage in the phase range ($\pi+\theta5n$) to $\pi/2$ is expressed as in Equation (31).

[Math. 21]

$$\frac{\Delta V_{C5}^*}{2} = \frac{I_P}{\omega \cdot C_5} \cos\theta5n \tag{31}$$

In addition, a gain multiplier 110 calculates a duty signal 110a corresponding to the voltage phase $\theta5n$ on the basis of the predetermined target value $\Delta$Vc5*. A constant in the gain multiplier 110 can be uniquely obtained from Equation (32).

[Math. 22]

$$\theta 5n = \cos^{-1}\left(\frac{\omega \cdot C_5 \cdot \Delta V_{C5}^*}{2 \cdot I_P}\right) \quad (32)$$

Next, a subtractor 111 obtains a difference 111a between the set command value Vc5* and a detected DC voltage Vc5. The difference 111a between the command value Vc5* and the DC voltage Vc5 is used as a feedback amount, and a polarity of the difference 111a between the command value Vc5* and the DC voltage Vc5 is determined by a powering/regenerative operation selector 112. The difference 111a is multiplied by 1 during a powering operation, and the difference 111a is multiplied by (−1) during a regenerative operation. A feedback amount 112a whose polarity is determined is PI-controlled by a PI controller 113, and output thereof is set as a voltage command 113a. The voltage command 113a is a duty signal corresponding to the voltage phase θ4n and is thus required to satisfy voltage phases θ4n<θ5n at all times. Therefore, a voltage signal 114a is generated by a limiter 114 which sets the duty signal 110a in the voltage command 113a as an upper limit. A gate signal generator 115 generates a gate signal 115a of the semiconductor switch 901a, corresponding to PWM control by using the two signals 110a and 114a.

In the PWM control by the gate signal generator 115, a triangular wave (triangular wave of AC power supply cycle TWAC) synchronized with a cycle which is the twice the frequency of the AC power supply 1 is used as a carrier wave, and, through comparative calculation, the duration of 0 to the duty signal 114a is set to the phase range π to (π+θ4n); the duration of the duty signal 114a to the duty signal 110a is set to the phase range (π+θ4n) to (π+θ5n); and the duration of the duty signal 110a to 1 is set to the phase range (π+θ5n) to 3π/2. In addition, as the gate signal 75a, an On signal is generated in the phase range π to (π+θ4n) and the phase range (π+θ5n) to 3π/2, and an Off signal is generated in the phase range (π+θ4n) to (π+θ5n).

The semiconductor switch 501a is operated to have a polarity reverse to that of the semiconductor switch 601a. In other words, in a case where the semiconductor switch 601a is turned on, the semiconductor switch 501a is turned off, and in a case where the semiconductor switch 601a is turned off, the semiconductor switch 501a is turned on. However, since, in the semiconductor switch 501a, a current flows from the emitter to the collector at all times, the semiconductor switch 501a may be turned off so that a current flows through the diode 501b which is connected inversely in parallel thereto. Similarly, the semiconductor switch 801a is operated to have a polarity reverse to that of the semiconductor switch 901a. In other words, in a case where the semiconductor switch 901a is turned on, the semiconductor switch 801a is turned off, and in a case where the semiconductor switch 901a is turned off, the semiconductor switch 801a is turned on. However, since, in the semiconductor switch 801a, a current flows from the emitter to the collector at all times, the semiconductor switch 801a may be turned off so that a current flows through the diode 801b which is connected inversely in parallel thereto.

Figure 48:
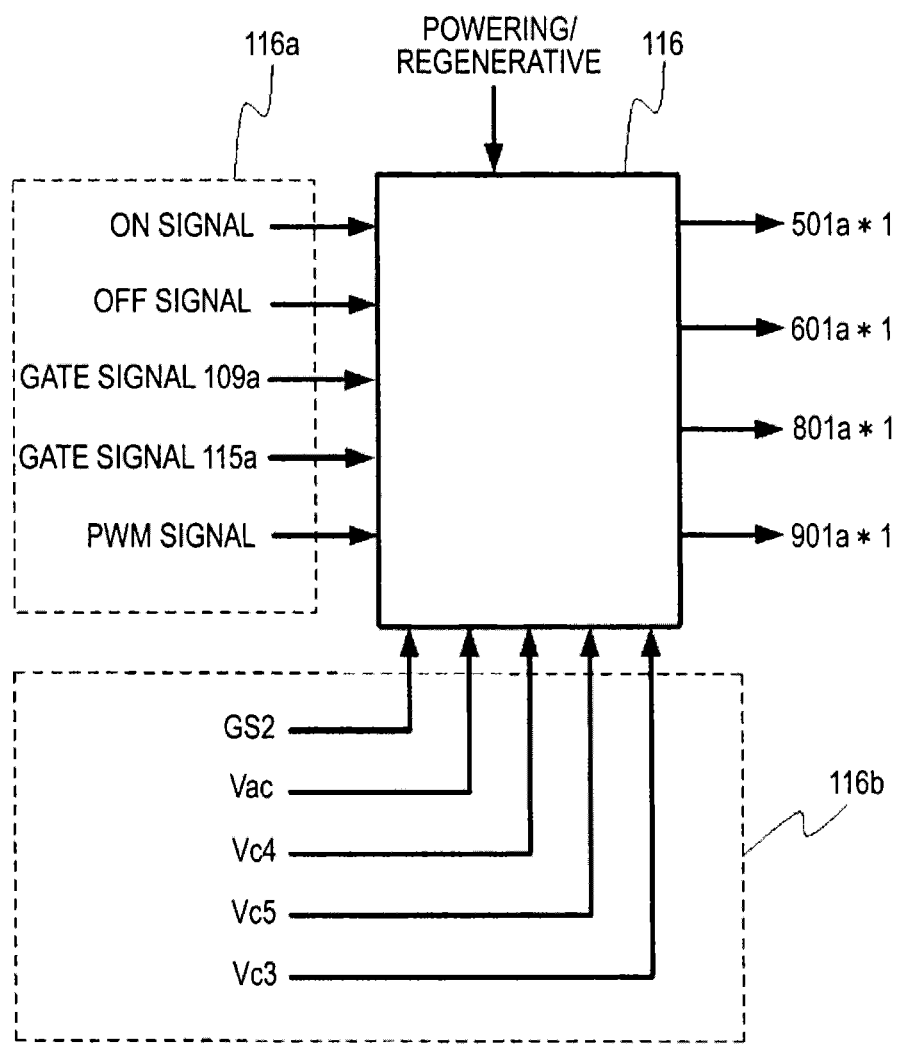
FIG. 48 is a control block diagram illustrating a specific function of a gate signal selector according to Embodiment 7 of the present invention.

Next, a gate signal selector 116 selects a gate signal of each of the semiconductor switches 501a, 601a, 801a and 901a according to an operation condition. FIG. 48 is a control block diagram illustrating a specific function of the gate signal selector 116. The gate signal selector 116 selects an appropriate gate signal from among input signals 116a on the basis of voltage information 116b and a powering/regenerative operation command (powering/regenerative), and generates a gate signal of each of the semiconductor switches 501a, 601a, 801a and 901a.

The input signals 116a are five signals including a current control PWM signal, an On signal, an Off signal, and the gate signals 109a and 115a based on the voltage commands which are calculated for respectively making the DC voltage Vc4 and the DC voltage Vc5 illustrated in FIG. 43 track the command value Vc4* and the command value Vc5*. The voltage information 116b is information which is required to determine a polarity of the AC voltage and to determine establishment of Expressions (5) to (8), and includes a gate signal GS2 of the semiconductor switches 601a and 901a, the AC voltage Vac of the AC power supply 1, the DC voltage Vc4 of the DC capacitor 403, the DC voltage Vc5 of the DC capacitor 703, and the DC voltage Vc3 of the smoothing capacitor 10.

First, a description will be made of a case of the powering operation. During the powering operation, in a case where a polarity of the AC voltage Vac of the AC power supply 1 is positive, and Expression (5) is satisfied, the gate signal 109a which is a PWM signal is selected as a gate signal of the semiconductor switch 501a and the semiconductor switch 601a. In addition, the Off signal is selected as a gate signal of the semiconductor switch 801a, and the Off signal is selected as a gate signal of the semiconductor switch 901a. In a case where Expression (5) is not satisfied, the current control PWM signal is selected as a gate signal of the semiconductor switch 601a; the Off signal is selected as a gate signal of the semiconductor switch 501a; the Off signal is selected as a gate signal of the semiconductor switch 801a; and the Off signal is selected as a gate signal of the semiconductor switch 901a.

In addition, during the powering operation, in a case where a polarity of the AC voltage Vac of the AC power supply 1 is positive, and Expression (6) is satisfied, the gate signal 109a which is a PWM signal is selected as a gate signal of the semiconductor switch 501a and the semiconductor switch 601a. Further, the Off signal is selected as a gate signal of the semiconductor switch 801a, and the Off signal is selected as a gate signal of the semiconductor switch 901a. In a case where Expression (6) is not satisfied, the current control PWM signal is selected as a gate signal of the semiconductor switch 601a; the Off signal is selected as a gate signal of the semiconductor switch 501a; the Off signal is selected as a gate signal of the semiconductor switch 801a; and the Off signal is selected as a gate signal of the semiconductor switch 901a.

In addition, during the powering operation, in a case where a polarity of the AC voltage Vac of the AC power supply 1 is negative, and Expression (7) is satisfied, the gate signal 115a which is a PWM signal is selected as a gate signal of the semiconductor switch 801a and the semiconductor switch 901a. Further, the Off signal is selected as a gate signal of the semiconductor switch 501a, and the Off signal is selected as a gate signal of the semiconductor switch 601a. In a case where Expression (7) is not satisfied, the current control PWM signal is selected as a gate signal of the semiconductor switch 901a; the Off signal is selected as a gate signal of the semiconductor switch 801a; the Off signal is selected as a gate signal of the semiconductor switch 501a; and the Off signal is selected as a gate signal of the semiconductor switch 601a.

In addition, during the powering operation, in a case where a polarity of the AC voltage Vac of the AC power supply 1 is negative, and Expression (8) is satisfied, the gate signal 115a which is a PWM signal is selected as a gate signal of the semiconductor switch 801a and the semiconductor switch 901a. Further, the Off signal is selected as a gate signal of the semiconductor switch 501a, and the Off signal is selected as a gate signal of the semiconductor switch 601a. In a case where Expression (8) is not satisfied, the current control PWM signal is selected as a gate signal of the semiconductor switch 901a; the Off signal is selected as a gate signal of the semiconductor switch 801a; the Off signal is selected as a gate signal of the semiconductor switch 501a; and the Off signal is selected as a gate signal of the semiconductor switch 601a.

Next, a description will be made of a case of the regenerative operation. During the regenerative operation, in a case where a polarity of the AC voltage Vac of the AC power supply 1 is positive, and Expression (5) is satisfied, the gate signal 109a which is a PWM signal is selected as a gate signal of the semiconductor switch 501a and the semiconductor switch 601a. In addition, the Off signal is selected as a gate signal of the semiconductor switch 801a, and the On signal is selected as a gate signal of the semiconductor switch 901a. In a case where Expression (5) is not satisfied, the current control PWM signal is selected for the semiconductor switch 501a and the semiconductor switch 601a (PWM control is performed on the semiconductor switches 501a and 601a through synchronization with each other). Here, the semiconductor switch 501a is operated to have a polarity reverse to that of the semiconductor switch 601a. The Off signal is selected as a gate signal of the semiconductor switch 801a, and the On signal is selected as a gate signal of the semiconductor switch 901a.

In addition, during the regenerative operation, in a case where a polarity of the AC voltage Vac of the AC power supply 1 is positive, and Expression (6) is satisfied, the gate signal 109a which is a PWM signal is selected as a gate signal of the semiconductor switch 501a and the semiconductor switch 601a. Further, the Off signal is selected as a gate signal of the semiconductor switch 801a, and the On signal is selected as a gate signal of the semiconductor switch 901a. In a case where Expression (6) is not satisfied, the current control PWM signal is selected for the semiconductor switch 501a and the semiconductor switch 601a. Also here, the semiconductor switch 501a is operated to have a polarity reverse to that of the semiconductor switch 601a. The Off signal is selected as a gate signal of the semiconductor switch 801a, and the On signal is selected as a gate signal of the semiconductor switch 901a.

In addition, during the regenerative operation, in a case where a polarity of the AC voltage Vac of the AC power supply 1 is negative, and Expression (7) is satisfied, the gate signal 115a which is a PWM signal is selected as a gate signal of the semiconductor switch 801a and the semiconductor switch 901a. Further, the Off signal is selected as a gate signal of the semiconductor switch 501a, and the On signal is selected as a gate signal of the semiconductor switch 601a. In a case where Expression (7) is not satisfied, the current control PWM signal is selected for the semiconductor switch 801a and the semiconductor switch 901a. Also here, the semiconductor switch 801a is operated to have a polarity reverse to that of the semiconductor switch 901a. The Off signal is selected as a gate signal of the semiconductor switch 501a, and the On signal is selected as a gate signal of the semiconductor switch 601a.

In addition, during the regenerative operation, in a case where a polarity of the AC voltage Vac of the AC power supply 1 is negative, and Expression (8) is satisfied, the gate signal 115a which is a PWM signal is selected as a gate signal of the semiconductor switch 801a and the semiconductor switch 901a. Further, the Off signal is selected as a gate signal of the semiconductor switch 501a, and the On signal is selected as a gate signal of the semiconductor switch 601a. In a case where Expression (8) is not satisfied, the current control PWM signal is selected for the semiconductor switch 801a and the semiconductor switch 901a. Also here, the semiconductor switch 801a is operated to have a polarity reverse to that of the semiconductor switch 901a. The Off signal is selected as a gate signal of the semiconductor switch 501a, and the On signal is selected as a gate signal of the semiconductor switch 601a.

In addition, in a case where only the powering operation is performed, the semiconductor switches 501a and 801a connected to the positive side of the smoothing capacitor 10 may be replaced with diodes, and the semiconductor switches 401a and 701a of the positive sides of the inverter circuits 400 and 700 may be replaced with high frequency diodes having losses smaller than those of the diodes during high frequency driving. With this configuration, it is possible to optimize recovery losses and conduction losses of the diodes.

In the present embodiment, in addition to the features obtained with the configuration of Embodiment 3, since the ripple voltage $\Delta Vc4$ of the DC capacitor 403 of the inverter circuit 400 and the ripple voltage $\Delta Vc5$ of the DC capacitor 703 of the inverter circuit 700 can be adjusted, it is possible to widen an operation voltage range of the power conversion device. Further, it is possible to lengthen the life of a capacitor by increasing a frequency of a ripple current which flows into the capacitor. Furthermore, since the ripple voltages $\Delta Vc4$ and $\Delta Vc5$ are reduced and thus a necessary capacitor capacitance and the number of necessary capacitors which are connected in parallel can be reduced, it is possible to achieve miniaturization of a power conversion device.

In addition, in all the embodiments, MOSFETs for high frequency driving may be used as the positive side semiconductor switches 401a and 701a constituting the inverter circuits 400 and 700, and IGBTs for low frequency driving may be used as the semiconductor switches 501a and 801a which are connected between the semiconductor switches 401a and 701a of the positive sides of the inverter circuits 400 and 700 and the positive sides P2 of the smoothing capacitors 7 and 10. With this configuration, it is possible to optimize switching losses and conduction losses of the semiconductor switches 401a and 701a and the semiconductor switches 501a and 801a.

In this case, the IGBT for low frequency driving may be made of silicon, and the MOSFET for high frequency driving may be made of a wide band gap semiconductor which has a band gap wider than that of silicon. In addition, a diode for low frequency driving may be made of silicon, and a high frequency diode for high frequency driving may be made of a wide band gap semiconductor which has a band gap wider than that of silicon. The wide band gap semiconductor includes, for example, silicon carbide, a gallium nitride-based material, or a diamond.

Since a semiconductor switch made of such a wide band gap semiconductor has a low power loss during high frequency driving, it is possible to increase efficiency of the MOSFET for high frequency driving. On the other hand, since high frequency driving is not performed on the IGBT for low frequency driving, even if the IGBT is made of silicon, this does not exert a great influence on the power less of the power conversion device as a whole. Generally, although a semiconductor switch made of a wide band gap semiconductor is more expensive than a semiconductor switch made of silicon, a semiconductor switch which increases a power loss is preferentially made of a wide band gap semiconductor as described above, and thus it is possible to minimize an increase in a price of the power conversion device.

In addition, since the semiconductor switch made of a wide band gap semiconductor has high withstand voltage property and also high allowable current density, the semiconductor switch can be miniaturized, and a semiconductor module into which such an element is incorporated can be miniaturized by using the miniaturized semiconductor switch. Further, since the semiconductor switch also has high heat resistance, heat dissipation fins of a heat sink can be miniaturized, or a water-cooled part can be replaced with an air-cooled part. Thus, it is possible to further miniaturize a semiconductor module.

DESCRIPTION OF THE REFERENCE NUMERALS

1: AC POWER SUPPLY
2, 3: MAIN CIRCUIT REACTOR
7, 10: SMOOTHING CAPACITOR
8, 11: CONTROL CIRCUIT
101, 102, 200: DIODE RECTIFYING CIRCUIT
400, 700: INVERTER CIRCUIT
401a, 402a, 501a, 601a, 701a, 702a, 801a, 901a: SEMICONDUCTOR SWITCH
401b, 402b, 501b, 601b, 701b, 702b, 801b, 901b: DIODE
403, 703: DC CAPACITOR

The invention claimed is:

1. A power conversion device comprising:
a rectifying circuit that rectifies an input from an AC power supply;
a half bridge type inverter circuit that includes a first semiconductor element, a second semiconductor element, and a DC capacitor, in which a connection point between the first semiconductor element and the second semiconductor element is connected to a bus of the AC power supply;
a smoothing capacitor that smooths an output voltage;
a third semiconductor element that is connected between the first semiconductor element of a positive side of the inverter circuit and a positive side of the smoothing capacitor;
a fourth semiconductor element that is connected between the second semiconductor element of a negative side of the inverter circuit and a negative side of the smoothing capacitor; and
a control circuit that controls the first to fourth semiconductor elements,
wherein the control circuit controls turning-on and turning-off of the fourth semiconductor element so that a DC voltage of the DC capacitor tracks a target voltage of the DC capacitor, and controls turning-on and turning-off of the second semiconductor element so that a DC voltage of the smoothing capacitor tracks a target voltage of the smoothing capacitor and thus an input power factor from the AC power supply is adjusted, and sets a driving frequency for turning-on and turning-off control of the second semiconductor element to be higher than a driving frequency for turning-on and turning-off control of the fourth semiconductor element.

2. The power conversion device according to claim 1, wherein the control circuit controls turning on and turning off of the first semiconductor element and the second semiconductor element so that a DC voltage of the smoothing capacitor tracks the target voltage of the smoothing capacitor and thus the input power factor from the AC power supply is adjusted.

3. The power conversion device according to claim 1, including:
the rectifying circuit that rectifies the input from the AC power supply;
the half bridge type inverter circuit that includes the first semiconductor element, the second semiconductor element, and the DC capacitor, in which the connection point between the first semiconductor element and the second semiconductor element is connected to the bus of the AC power supply;
the smoothing capacitor that smoothes the output voltage;
the third semiconductor element that is connected between the first semiconductor element of the positive side of the inverter circuit and the positive side of the smoothing capacitor;
the fourth semiconductor element that is connected between the second semiconductor element of the negative side of the inverter circuit and the negative side of the smoothing capacitor; and
the control circuit that controls the first semiconductor element, the second semiconductor element, the third semiconductor element, and the fourth semiconductor element,
wherein the control circuit performs control for changing turning-on and turning-off of the fourth semiconductor switch which is connected to the negative side of the smoothing capacitor, once at a ¼ cycle of an AC voltage of the AC power supply.

4. The power conversion device according to claim 1, wherein the control circuit performs control for changing turning-on and turning-off of the fourth semiconductor element which is connected to the negative side of the smoothing capacitor, multiple times at a ¼ cycle of an AC voltage of the AC power supply.

5. The power conversion device according to claim 4, wherein the control circuit sets a first On period, a first Off period, a second On period, and a second Off period for the fourth semiconductor element which is connected to the negative side of the smoothing capacitor at the ¼ cycle of the AC voltage of the AC power supply, sets the first Off period and the second On period so that a DC voltage of the DC capacitor tracks the target voltage of the DC capacitor, and sets the first On period and the second Off period so that a ripple voltage of the smoothing capacitor tracks a target value.

6. The power conversion device according to claim 5, wherein the control circuit sets a length of the first On period on the basis of the target value of ripple voltage of the smoothing capacitor, and sets a length of the second Off period so that a ripple voltage of the smoothing capacitor in the first On period is the same as a ripple voltage of the smoothing capacitor in the second Off period.

7. The power conversion device according to claim 4, wherein the control circuit sets a first On period, a first Off period, and a second On period for the fourth semiconductor element which is connected to the negative side of the smoothing capacitor at the ¼ cycle of the AC voltage of the AC power supply, sets the first On period and the first Off period so that a DC voltage of the DC capacitor tracks the target voltage of the DC capacitor, and sets the second On period so that a ripple voltage of the smoothing capacitor tracks a target value.

8. The power conversion device according to claim 7, wherein the control circuit sets a length of the second On period on the basis of the target value of ripple voltage of the smoothing capacitor.

9. The power conversion device according to claim 1, wherein the control circuit controls turning-on and turning-off of the fourth semiconductor element which is connected to the negative side of the smoothing capacitor so that the fourth semiconductor element is turned on only in a scheduled phase range including a zero-cross phase of the AC voltage of the AC power supply, and thus the smoothing capacitor is bypassed and the DC capacitor is charged.

10. The power conversion device according to claim 1, wherein the control circuit sets a length of an On period in which the fourth semiconductor element connected to the negative side of the smoothing capacitor is turned on in a scheduled phase range of the AC voltage of the AC power supply, so that the DC capacitor is adjusted to have a scheduled voltage.

11. The power conversion device according to claim 1, wherein the control circuit uses a voltage having a polarity reverse to a polarity of an AC voltage of the AC power supply as a correction voltage in a case where the fourth semiconductor element connected to the negative side of the smoothing capacitor is turned on, uses a difference voltage between the DC voltage of the smoothing capacitor and the AC voltage of the AC power supply as a correction voltage in a case where the fourth semiconductor element connected to the negative side of the smoothing capacitor is turned off, and controls turning-on and turning-off of the second semiconductor element constituting the inverter circuit by performing feed forward control for adding the correction voltage to a voltage command of the inverter circuit.

12. The power conversion device according to claim 1, wherein the control circuit sets the target voltage of the DC voltage of the smoothing capacitor to be higher than the DC voltage of the DC capacitor at all times.

13. The power conversion device according to claim 1, wherein, in a case where the AC voltage of the AC power supply is higher than the DC voltage of the DC capacitor within a period in which the fourth semiconductor element connected to the negative side of the smoothing capacitor is set to be turned on, the control circuit fixes the second semiconductor element of the negative side of the inverter circuit to a turned-off state, and controls the fourth semiconductor element connected to the negative side of the smoothing capacitor with PWM control, so that the DC voltage of the smoothing capacitor tracks the target voltage of the smoothing capacitor and thus the input power factor from the AC power supply is adjusted.

14. The power conversion device according to claim 1, wherein, in a case where the difference voltage between the DC voltage of the smoothing capacitor and the AC voltage of the AC power supply is higher than the DC voltage of the DC capacitor within a period in which the fourth semiconductor element connected to the negative side of the smoothing capacitor is set to be turned off, the control circuit fixes the second semiconductor switch of the negative side of the inverter circuit to a turned-on state, and controls the fourth semiconductor element connected to the negative side of the smoothing capacitor with PWM control, so that the DC voltage of the smoothing capacitor tracks the target voltage of the smoothing capacitor and thus the input power factor from the AC power supply is adjusted.

15. The power conversion device according to claim 1, wherein, in a case where the AC voltage of the AC power supply is higher than the DC voltage of the DC capacitor within a period in which the fourth semiconductor element connected to the negative side of the smoothing capacitor is set to be turned on, or in a case where the difference voltage between the DC voltage of the smoothing capacitor and the AC voltage of the AC power supply is higher than the DC voltage of the DC capacitor within a period in which the fourth semiconductor element connected to the negative side of the smoothing capacitor is set to be turned off, the control circuit controls the fourth semiconductor element connected to the negative side of the smoothing capacitor and the second semiconductor element connected to the negative side of the inverter circuit with PWM control through synchronization with each other, so that the DC voltage of the smoothing capacitor tracks the target voltage of the smoothing capacitor and thus the input power factor from the AC power supply is adjusted.

16. A power conversion device comprising:
a positive side reactor that is inserted into a positive side bus of an AC power supply;
a negative side reactor that is inserted into a negative side bus of the AC power supply;
a half bridge type first inverter circuit that includes a first semiconductor element, a second semiconductor element, and a first DC capacitor, in which a connection point between the first semiconductor element and the second semiconductor element is connected to the positive side reactor;
a half bridge type second inverter circuit that includes a fifth semiconductor element, a sixth semiconductor element, and a second DC capacitor, in which a connection point between the fifth semiconductor element and the sixth semiconductor element is connected to the negative side reactor;
a smoothing capacitor that smooths an output voltage;
a third semiconductor element that is connected between the first semiconductor element of a positive side of the first inverter circuit and a positive side of the smoothing capacitor;
a fourth semiconductor element that is connected between the second semiconductor element of a negative side of the first inverter circuit and a negative side of the smoothing capacitor;
a seventh semiconductor element that is connected between the fifth semiconductor element of a positive side of the second inverter circuit and the positive side of the smoothing capacitor;
an eighth semiconductor element that is connected between the sixth semiconductor element of a negative side of the second inverter circuit and the negative side of the smoothing capacitor; and
a control circuit that controls the first to eighth semiconductor elements,
wherein the control circuit controls turning-on and turning-off of the fourth semiconductor element and the eighth semiconductor element so that each DC voltage of the first DC capacitor and the second DC capacitor tracks each target voltage thereof, and controls turning-on and turning-off of the first semiconductor element, the second semiconductor element, the fifth semiconductor element, and the sixth semiconductor element so that a DC voltage of the smoothing capacitor tracks a target voltage of the smoothing capacitor and thus an input power factor from the AC power supply is adjusted.

17. The power conversion device according to claim 16, wherein the control circuit changes control for turning-on and turning-off of the first semiconductor element and the second semiconductor element of the first inverter circuit and control for turning-on and turning-off of the fifth semiconductor element and the sixth semiconductor element of the second inverter circuit depending on polarities of an AC voltage of the AC power supply, so that a DC voltage of the smoothing capacitor tracks the target voltage of the smoothing capacitor and thus an input power factor from the AC power supply is adjusted.

18. The power conversion device according to claim 16, wherein the control circuit performs control for regenerating power of the smoothing capacitor in the AC power supply.

19. The power conversion device according to claim 18, wherein the control circuit controls turning-on and turning-off of the first to eighth semiconductor elements so as to charge the DC capacitors during a powering operation, and controls turning-on and turning-off of the first to eighth semiconductor elements so as to discharge the DC capacitors during a regenerative operation.

* * * * *